July 26, 1960 D. A. HARRISON 2,946,986

COMMUNICATIONS SYSTEM

Filed April 17, 1956 31 Sheets-Sheet 1

INVENTOR
DONALD A. HARRISON

BY Theodore C. Wood

AGENT

July 26, 1960 D. A. HARRISON 2,946,986

COMMUNICATIONS SYSTEM

Filed April 17, 1956 31 Sheets-Sheet 2

ARRAY READ IN CONTROL

July 26, 1960 D. A. HARRISON 2,946,986
COMMUNICATIONS SYSTEM
Filed April 17, 1956 31 Sheets-Sheet 8

INVENTOR.

BY

INVENTOR.

BY

July 26, 1960 D. A. HARRISON 2,946,986

COMMUNICATIONS SYSTEM

Filed April 17, 1956 31 Sheets-Sheet 11

July 26, 1960 D. A. HARRISON 2,946,986

COMMUNICATIONS SYSTEM

Filed April 17, 1956 31 Sheets-Sheet 12

PARITY GENERATOR

July 26, 1960 D. A. HARRISON 2,946,986

COMMUNICATIONS SYSTEM

Filed April 17, 1956 31 Sheets-Sheet 16

July 26, 1960 D. A. HARRISON 2,946,986

COMMUNICATIONS SYSTEM

Filed April 17, 1956 31 Sheets-Sheet 17

July 26, 1960 D. A. HARRISON 2,946,986

COMMUNICATIONS SYSTEM

Filed April 17, 1956 31 Sheets-Sheet 19

July 26, 1960 D. A. HARRISON 2,946,986

COMMUNICATIONS SYSTEM

Filed April 17, 1956 31 Sheets-Sheet 26

FIG. 26
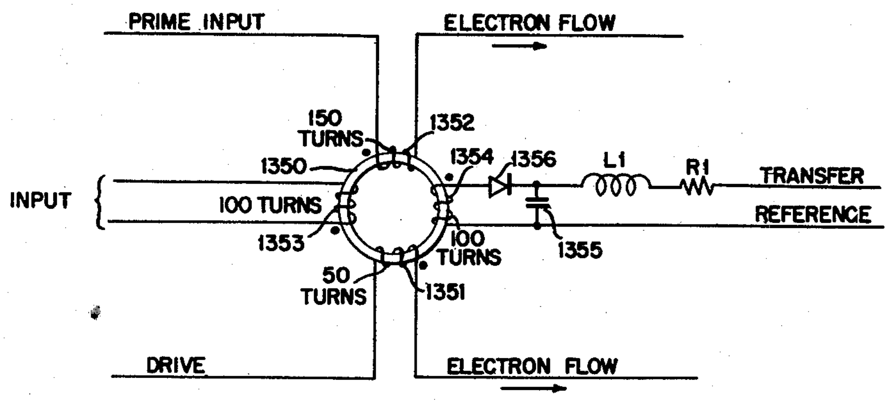
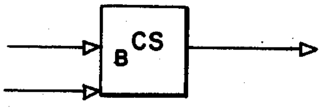
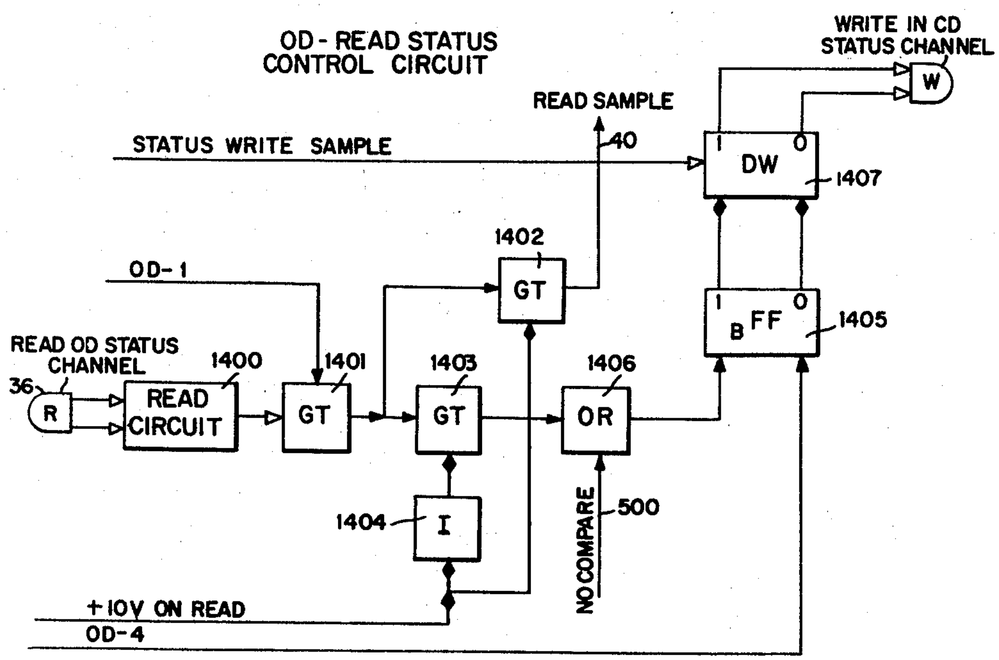
FIG. 29

United States Patent Office 2,946,986
Patented July 26, 1960

2,946,986

COMMUNICATIONS SYSTEM

Donald A. Harrison, Poughkeepsie, N.Y., assignor to International Business Machines Corporation, New York, N.Y., a corporation of New York Filed Apr. 17, 1956, Ser. No. 578,689

11 Claims. (Cl. 340—174)

This invention relates to communications systems and more particularly to communications systems of the digital data type.

In many transmission systems it is desirable, in order to more efficiently utilize a transmission channel, to employ a "party line" system, that is, to transmit information to several receivers on the same transmission channel; however, only the identified receiver should actually accept the information. It is also sometimes desirable to permit the transmitted information to be accepted by all receivers when the nature of the message so requires it.

In accordance with one of the principles of this invention a digital data transmission system is provided which permits "party line" system of operation by including in each message a binary code identifying which one of several receivers is to accept the message. Each receiving equipment compares this binary code with the "code" identifying the receiver so that when the comparison is successful, the message is accepted and when the comparison is not successful, the message is rejected.

In accordance with another feature of this invention, when the nature of the message is such that it is desirable that all receivers of a message on a transmission channel accept that message, a signal is transmitted with the message which indicates this fact and the receipt of such a signal causes all receivers to accept the message.

It is an object of this invention to provide a party line system of operation in a digital data transmission system.

It is another object of this invention to provide an improved digital data transmission system wherein information signals together with signals representative of an address code are transmitted in serial digital form by way of a transmission channel to each of several receiving equipments and the receiving equipments compare the received address code with their assigned code and reject the message if the comparison is not successful.

It is a further object of this invention to provide an improved digital data transmission system wherein information signals together with signals representative of an address code are transmitted in serial digital form by way of a transmission channel to each of several receiving equipments which include bistable storage devices, the serial signals representative of the address code being applied to the complement input of the bistable storage devices and serial signals representative of the unique assigned code of a receiver are applied to an input of each of the bistable storage devices which causes the device to assume a predetermined stable state and the bistable storage device is periodically examined to see if a particular bit of the address code has caused the bistable device to assume said predetermined state.

It is still another object of this invention to provide a party line system of operation in a digital data system wherein information signals together with signals representative of an address code are transmitted in serial digital form by way of a transmission channel to each of several receiving equipments and the receiving equipments compare the received address code with their assigned code and reject the message if the comparison is not successful; however, if the address code indicates that all receiving equipments are to receive the message then the receipt of such a signal causes the receiving equipment to accept the message even though the address code does not compare.

It is a still further object of this invention to provide a party line system of operation in a digital data transmission system wherein during normal operation only those receiving equipments which are intended to receive a message actually accept the message; however, when it is desired that all receiving equipments accept a message then a signal is transmitted indicating this fact and the receipt of this signal at each of the receiving equipments causes those equipments to accept the message.

Other objects of the invention will be pointed out in the following description and claims and illustrated in the accompanying drawings, which disclose, by way of example, the principles of the invention and the best mode, which has been contemplated, of applying those principles.

Figure 3A:
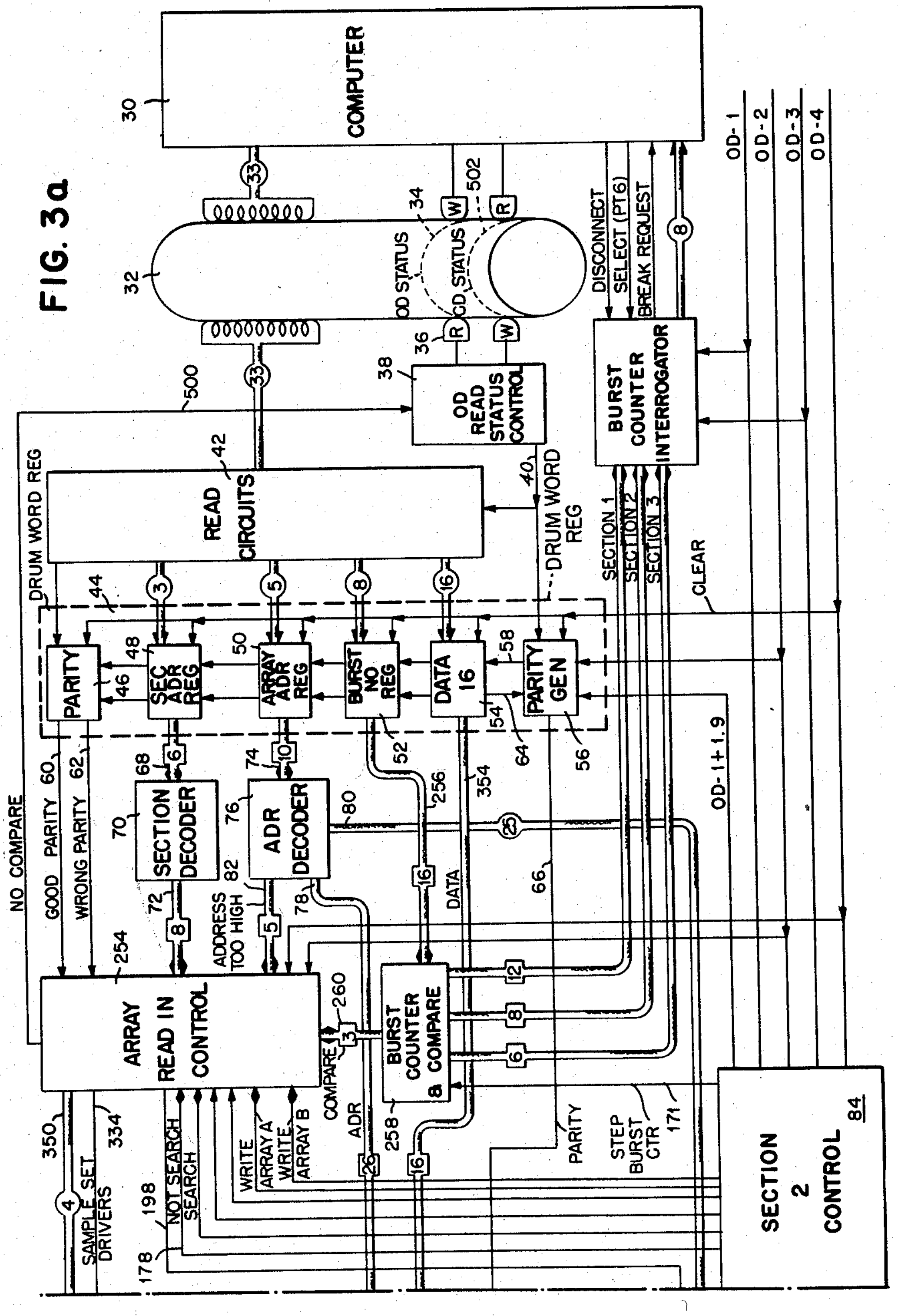
Figure 3B:
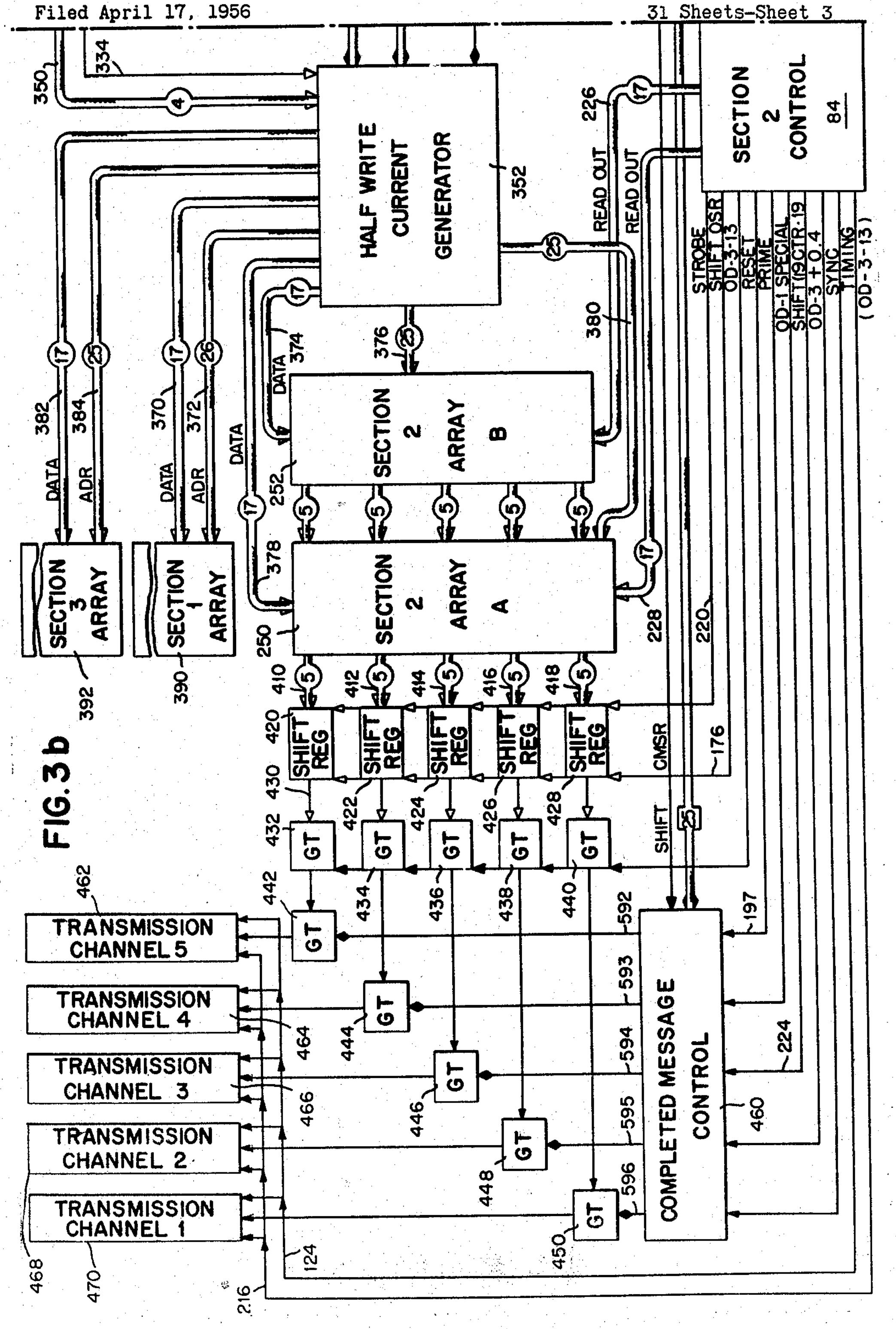

Figs. 3*a* and 3*b* when arranged end to end, illustrate in simplified logical block form a computer and its output system for transmission of messages to five transmission channels.

Figure 4A:
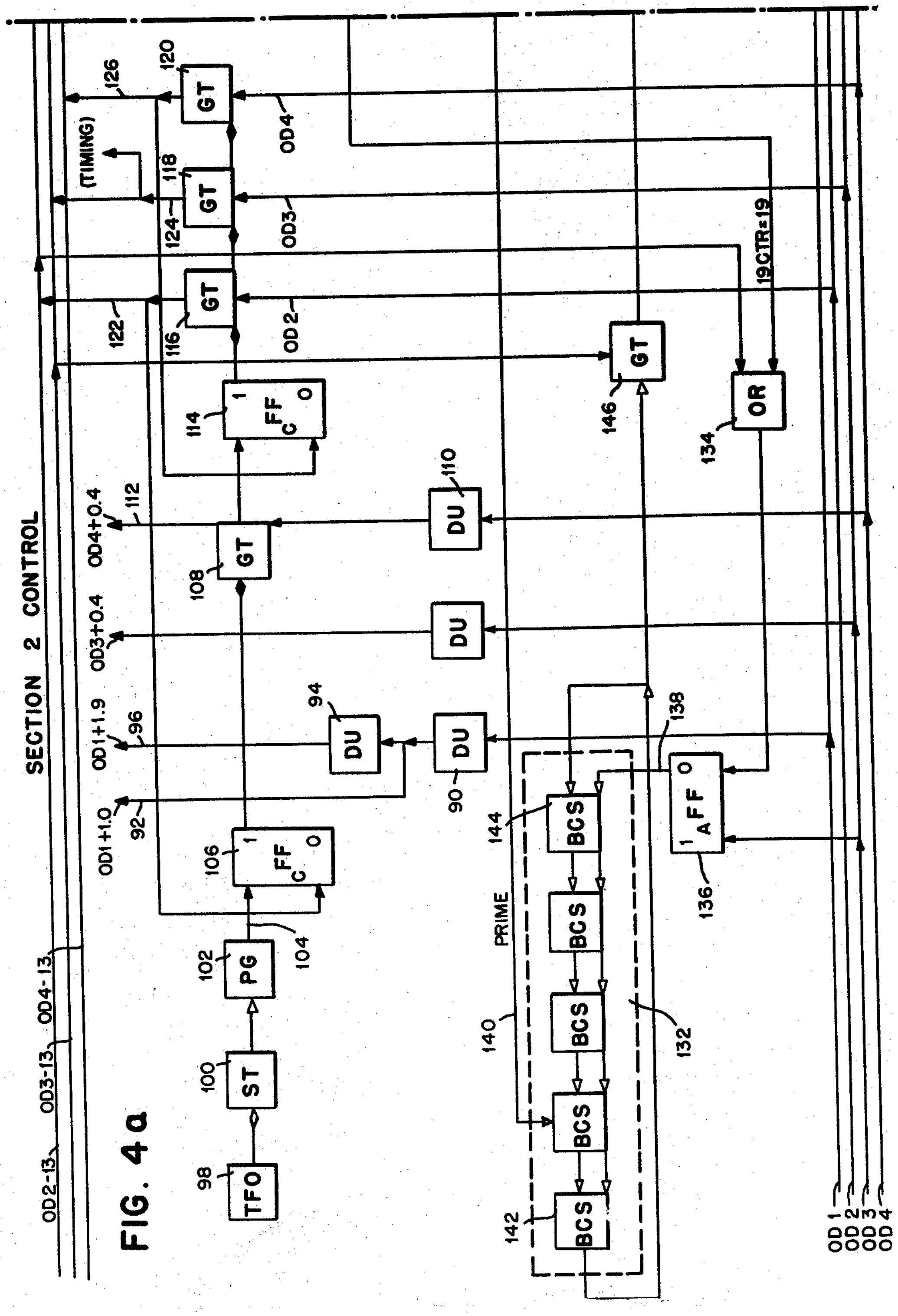
Figure 4B:
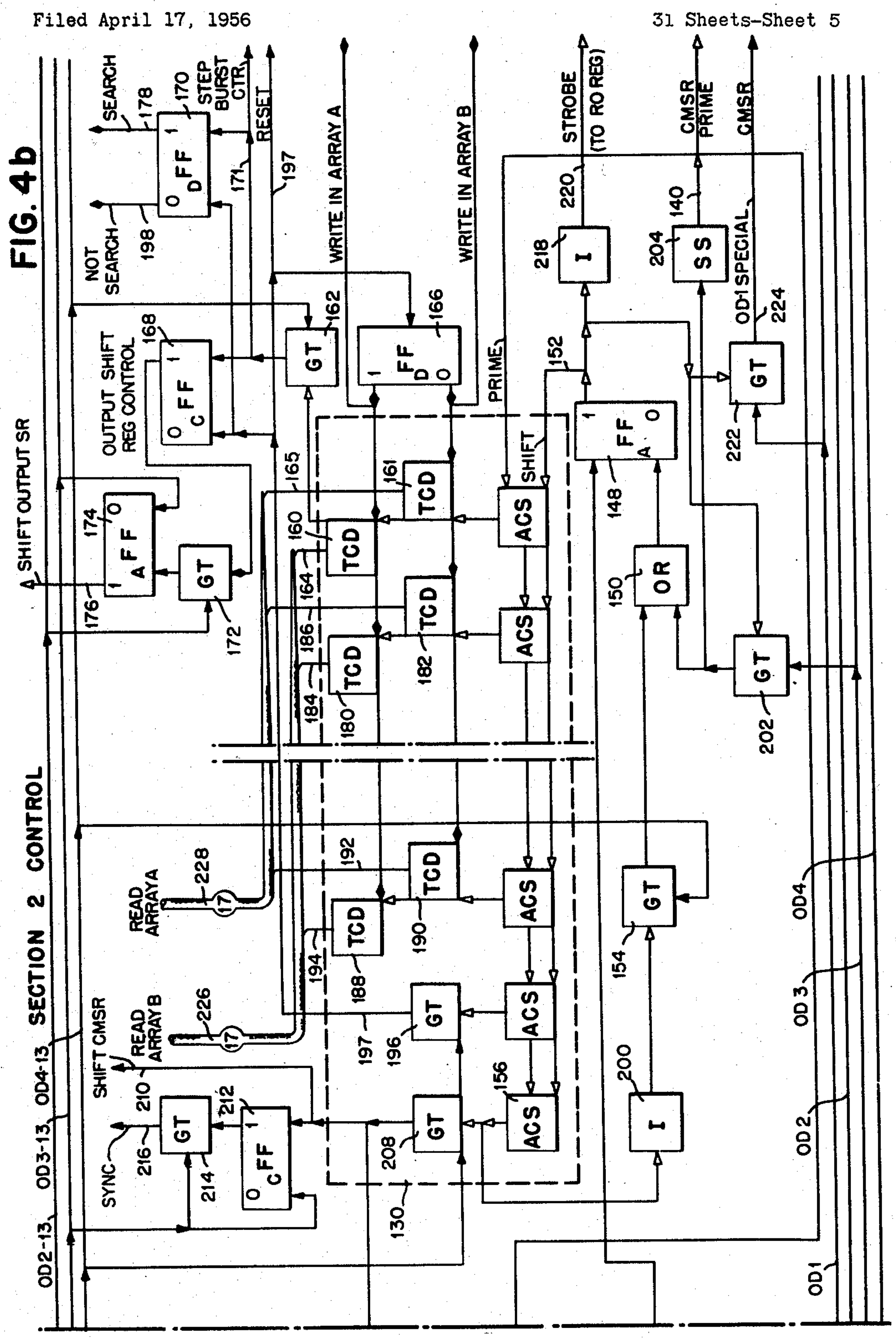

Figs. 4*a* and 4*b* when arranged end to end illustrate in logical block diagram form the Section 2 control circuit shown as block 84 in Figs. 3*a* and 3*b*.

Figure 5A:
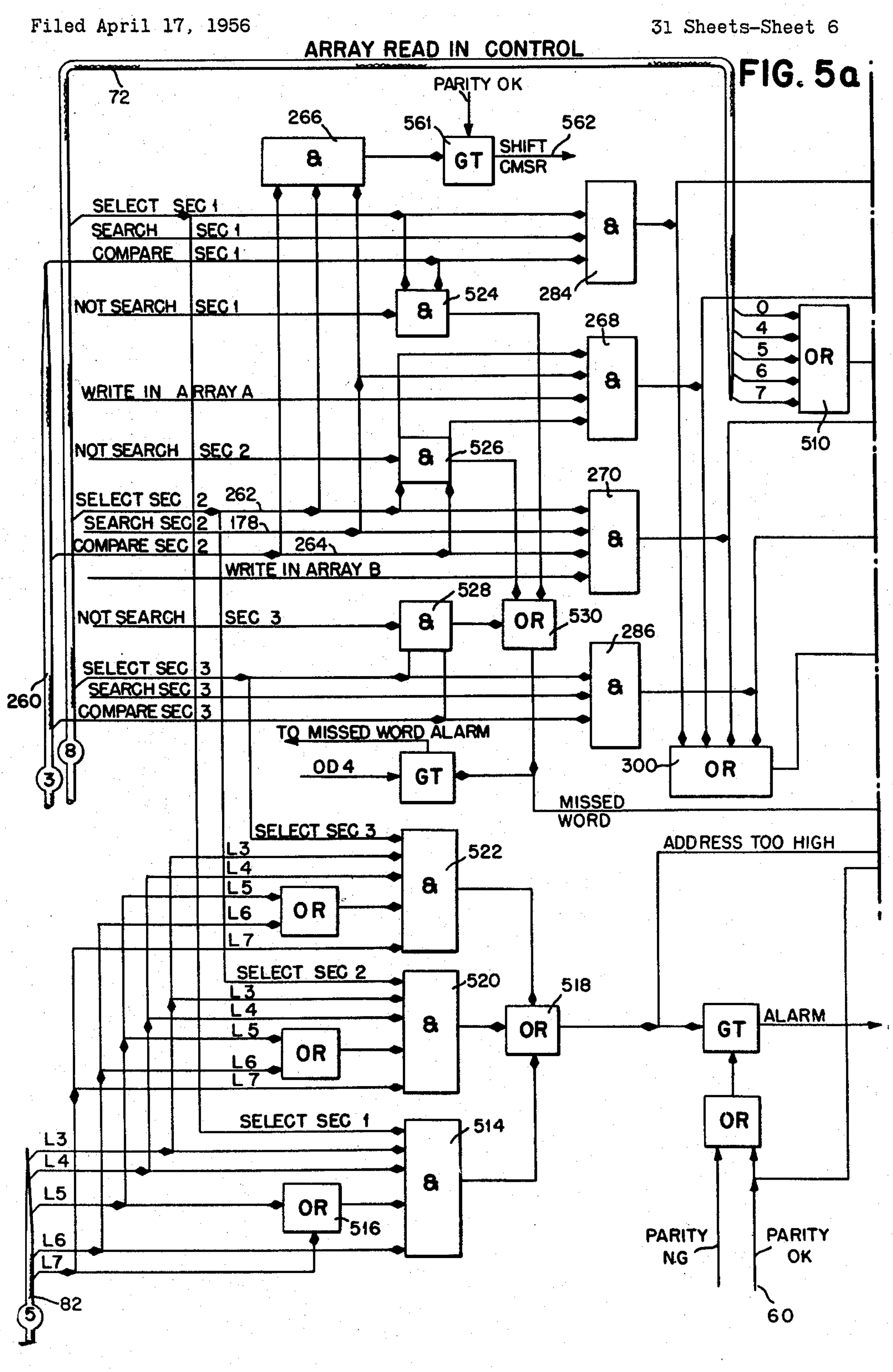
Figures 5B, 6:
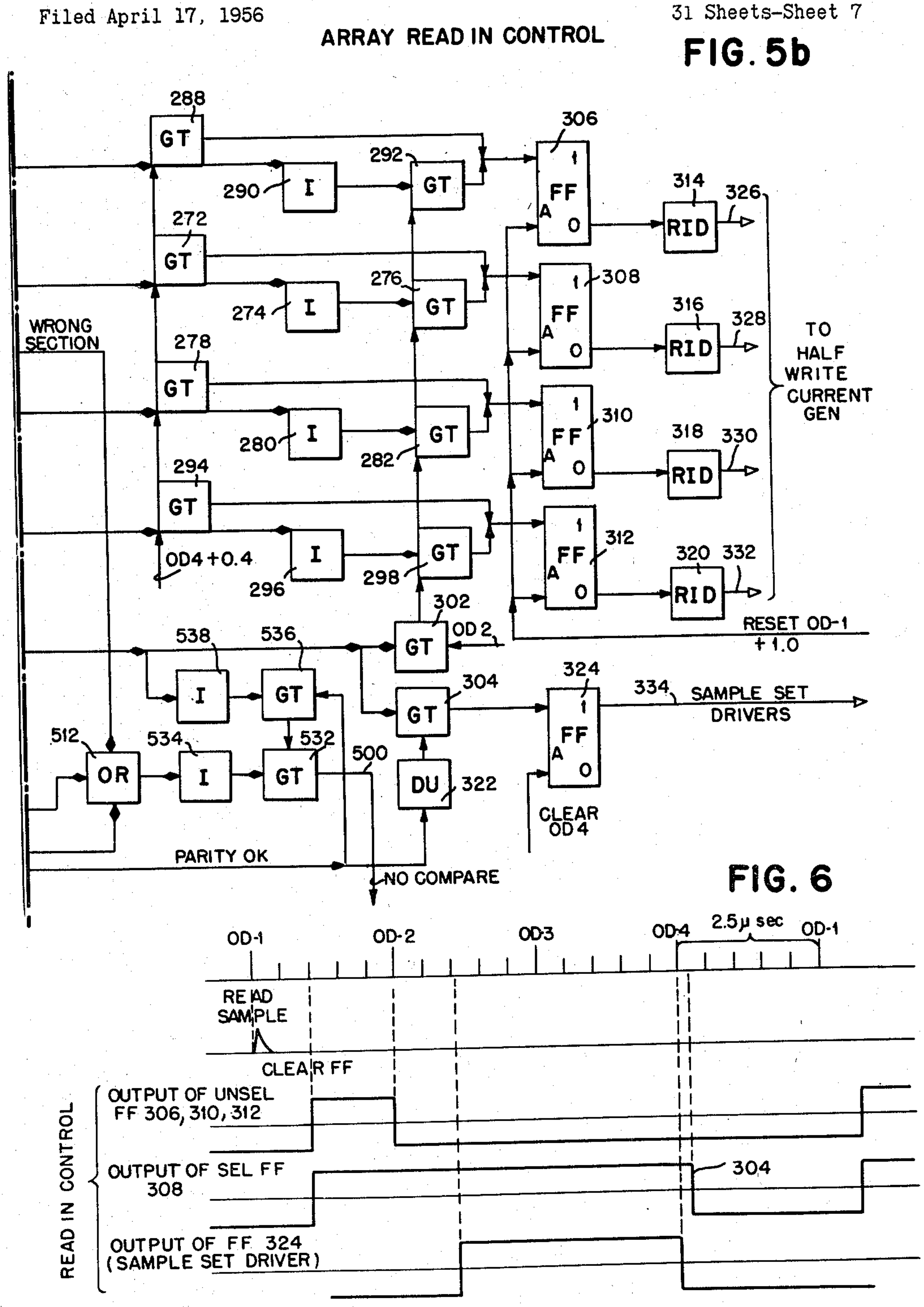

Figs. 5*a* and 5*b* when arranged side by side illustrate in logical block diagram form the Array Read-in Control shown as block 254 in Fig. 3*a*.

Fig. 6 is a family of curves illustrating in idealized form the potentials at various identified points in the circuit of Figs. 5*a* and 5*b*.

Figure 7A:
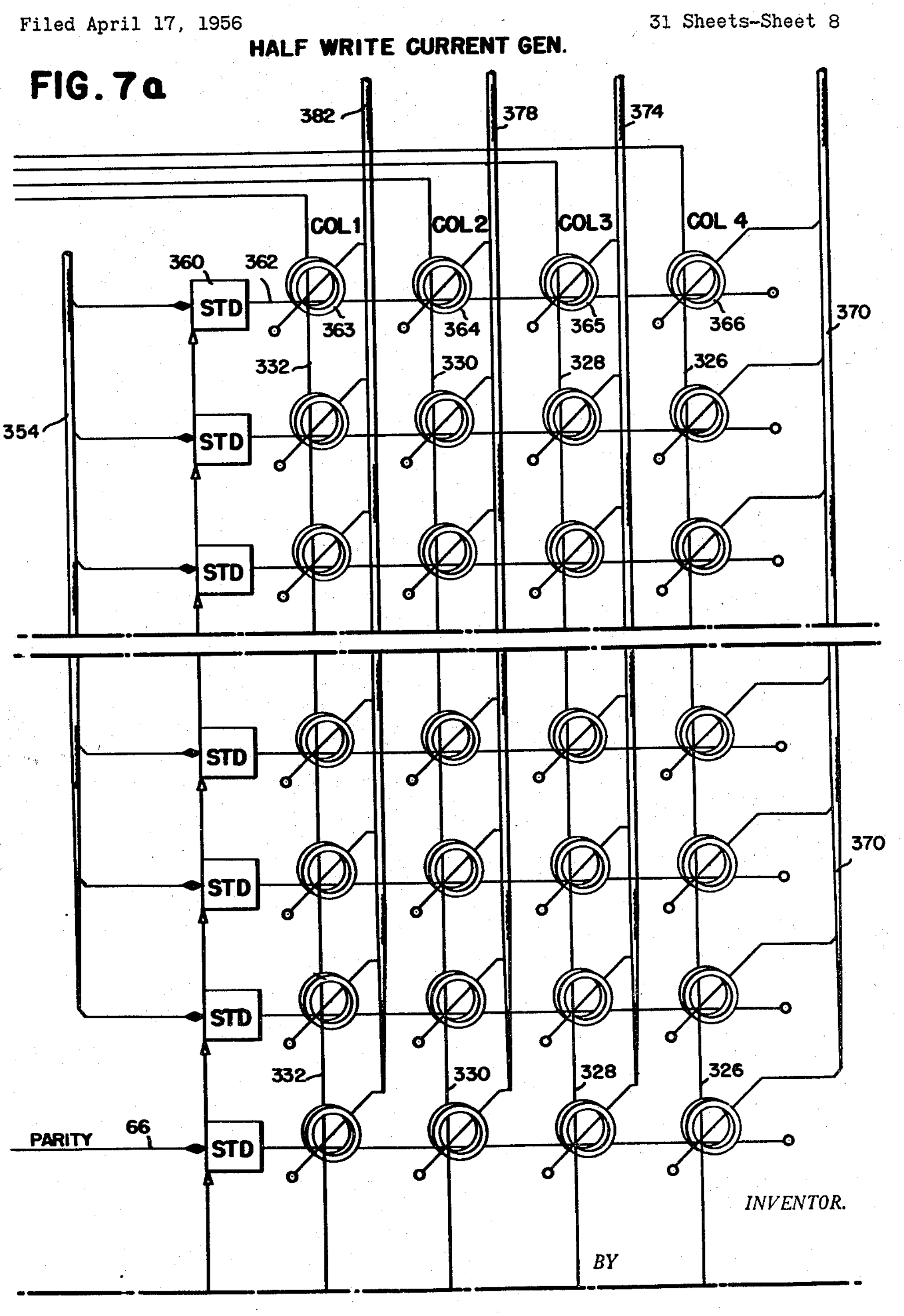
Figure 7B:
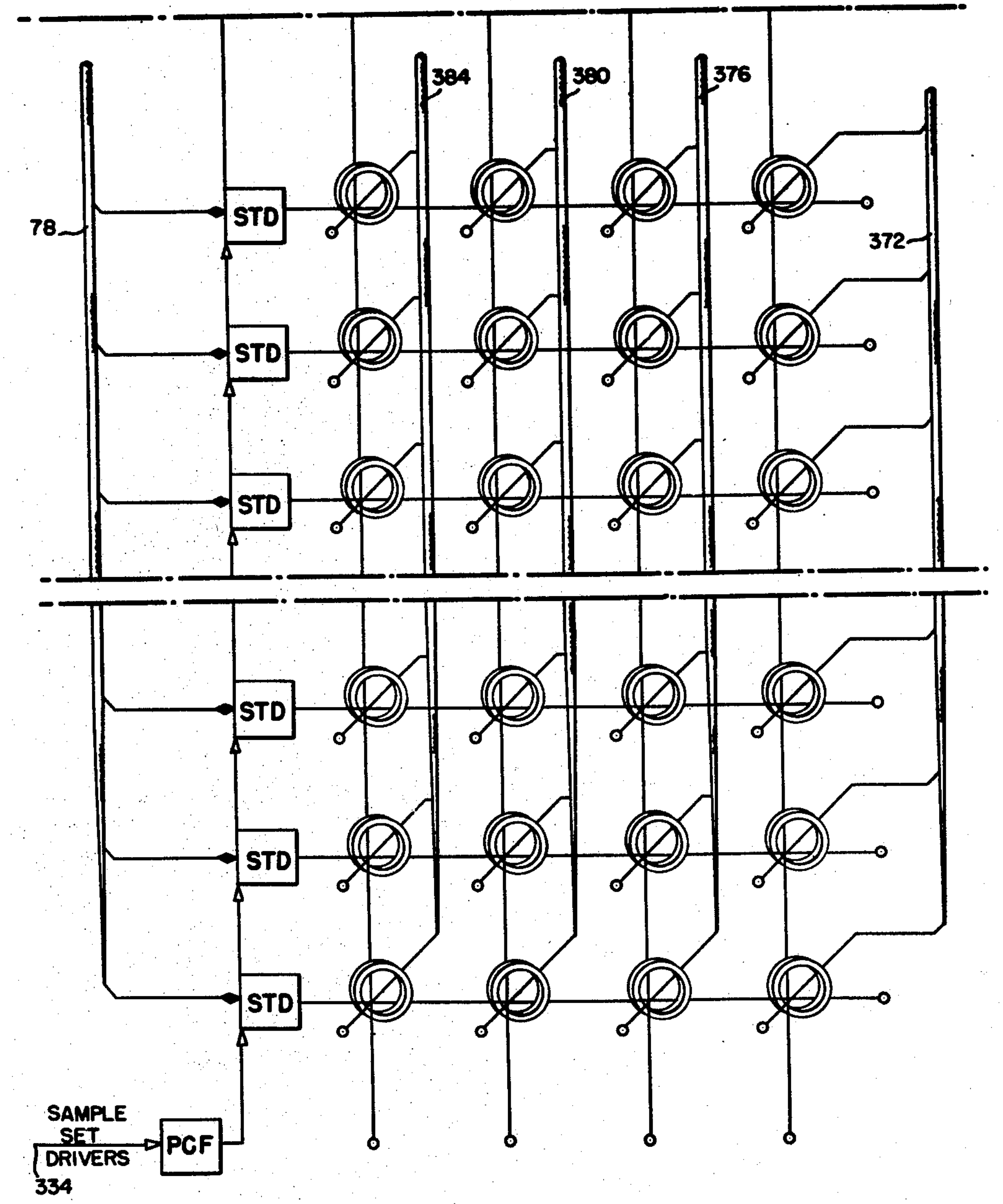

Figs. 7*a* and 7*b*, when arranged one above the other, illustrate in simplified schematic diagram form the Half Write Current Generator shown as block 352 in Fig. 3*b*.

Figure 8:
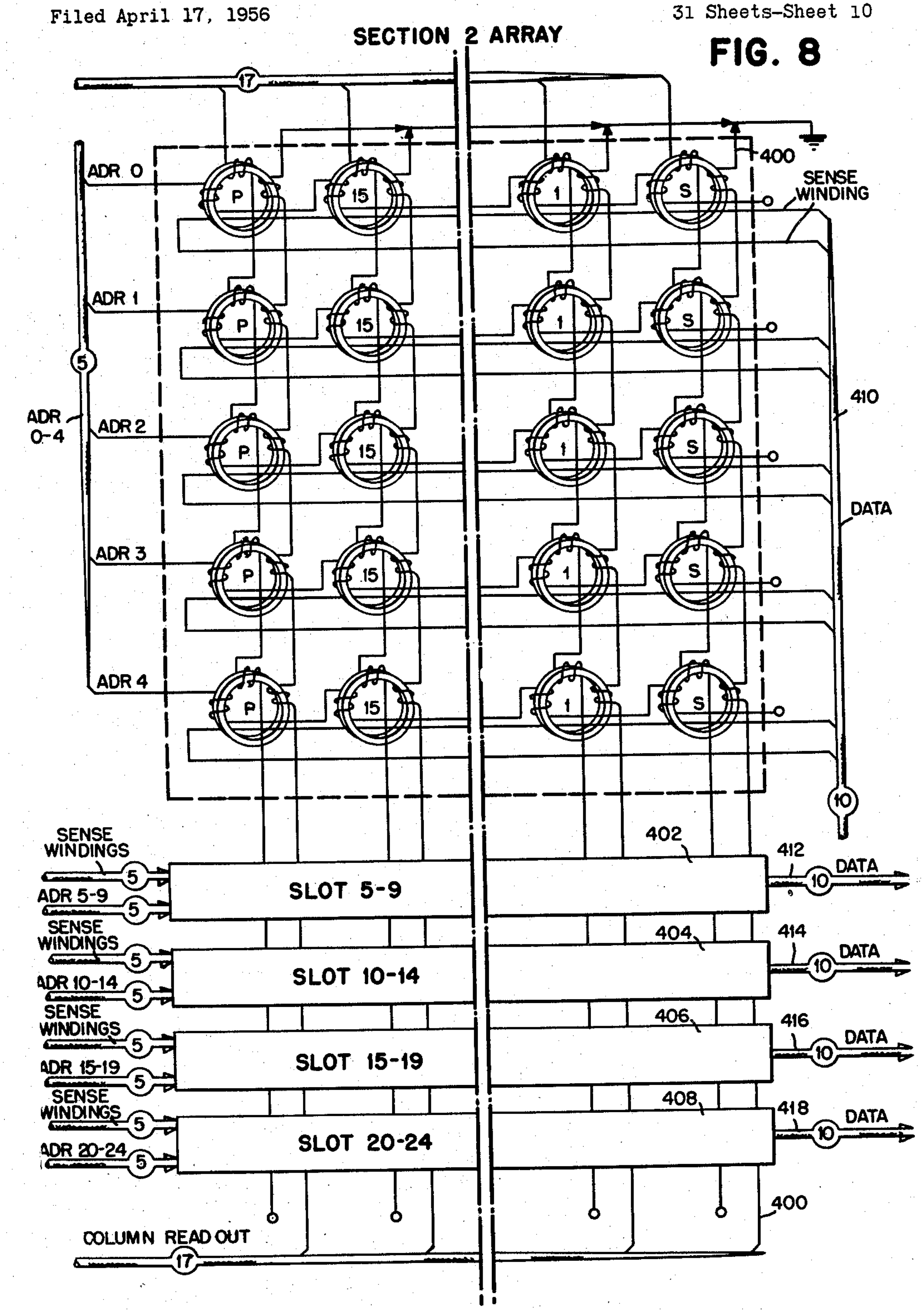

Fig. 8 is a simplified schematic diagram, partly in block form, of a typical Section 2 Array shown as blocks 250 and 252 in Fig. 3*b*.

Figure 9A:
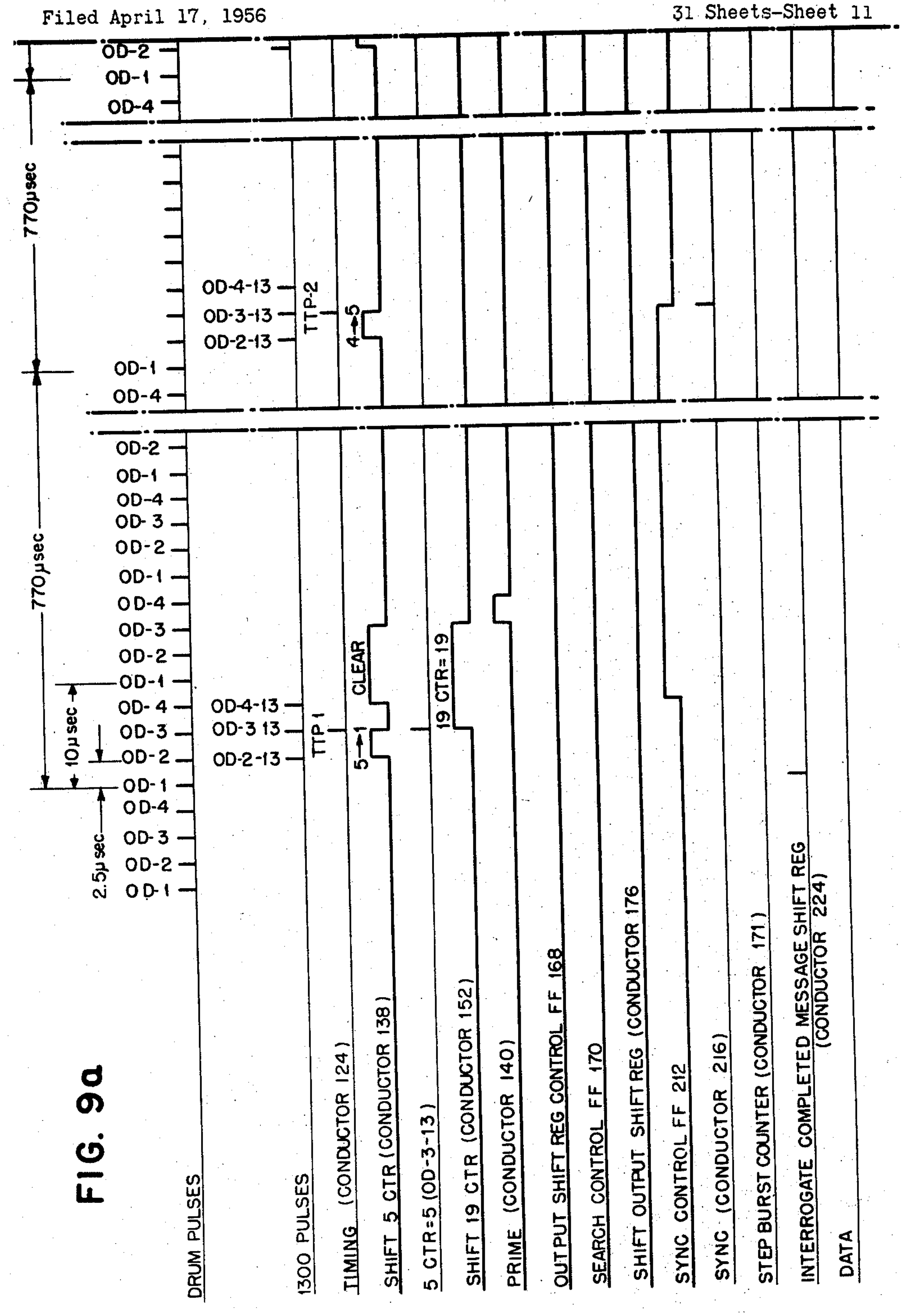
Figure 9B:
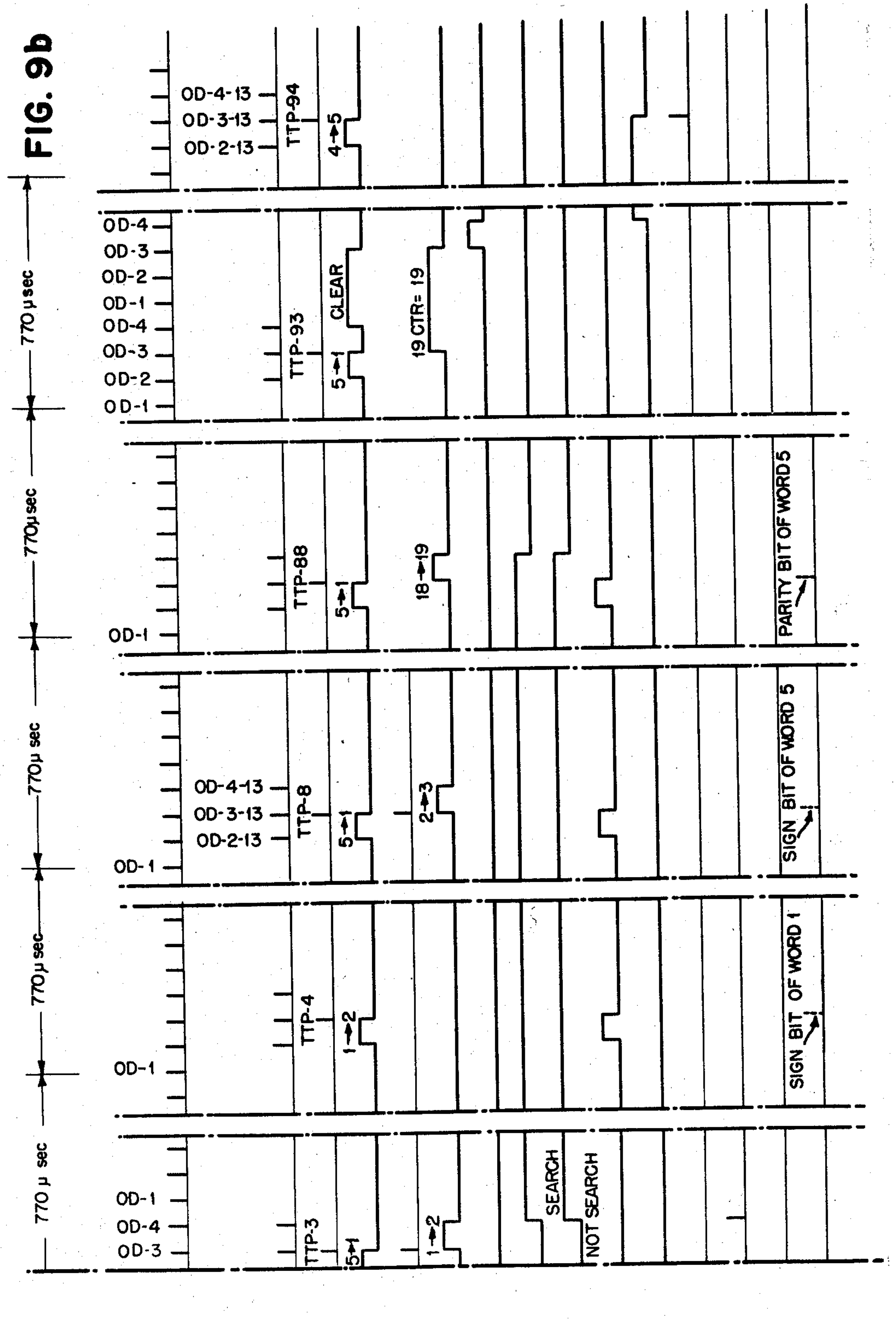

Figs. 9*a* and 9*b*, when arranged end to end, show a family of curves which illustrate the timing relationship of the various control pulses and data pulses produced by the apparatus of Figs. 3*a* and 3*b*.

Figure 10:
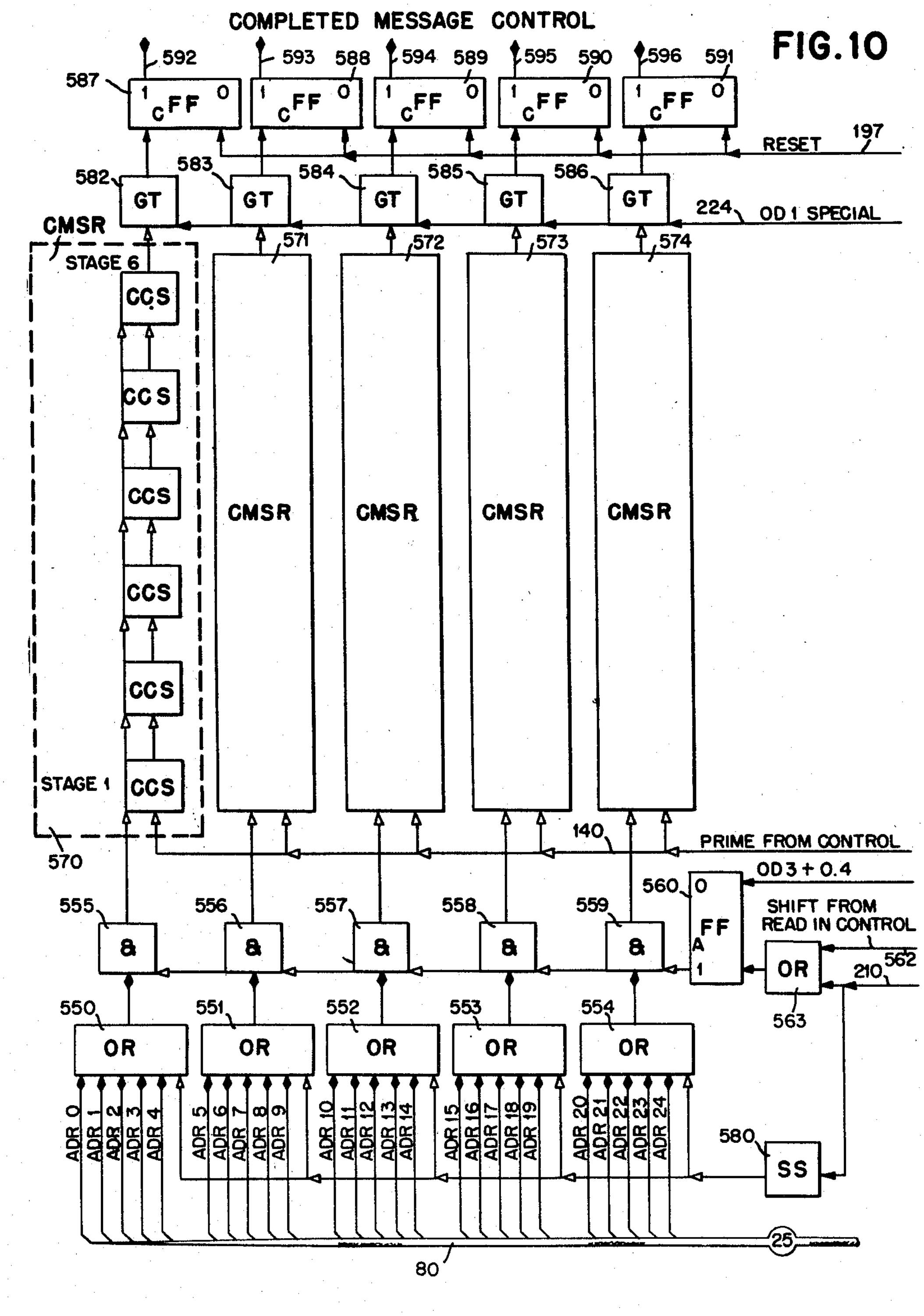

Fig. 10 is a logical block diagram of the Completed Message Control Circuit shown as block 460 in Fig. 3*b*.

Figure 11:
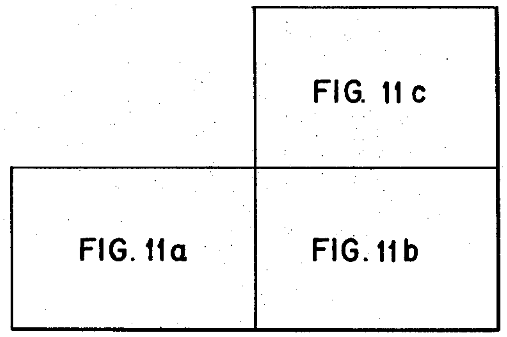
Figure 11A:
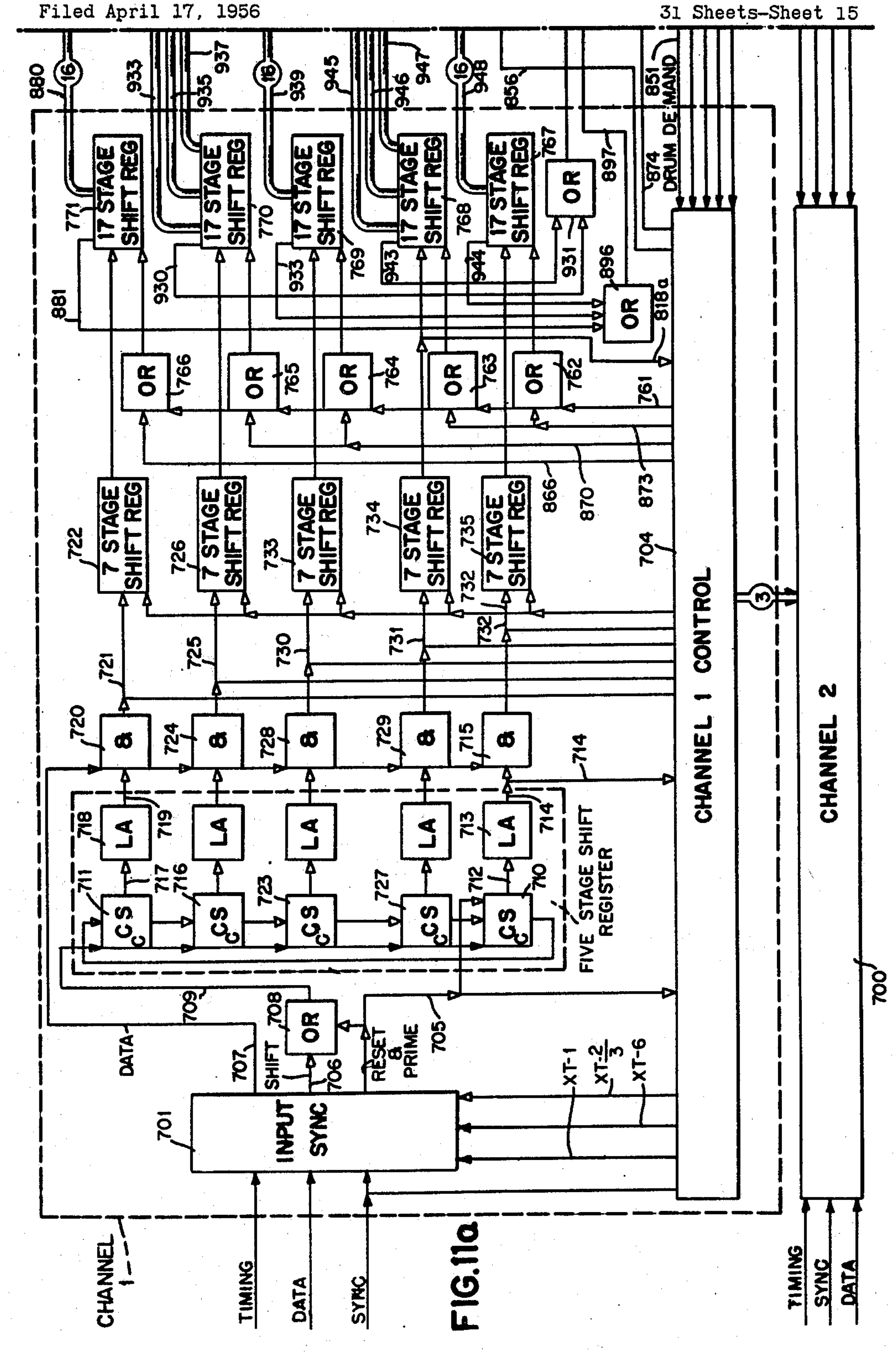
Figure 11B:
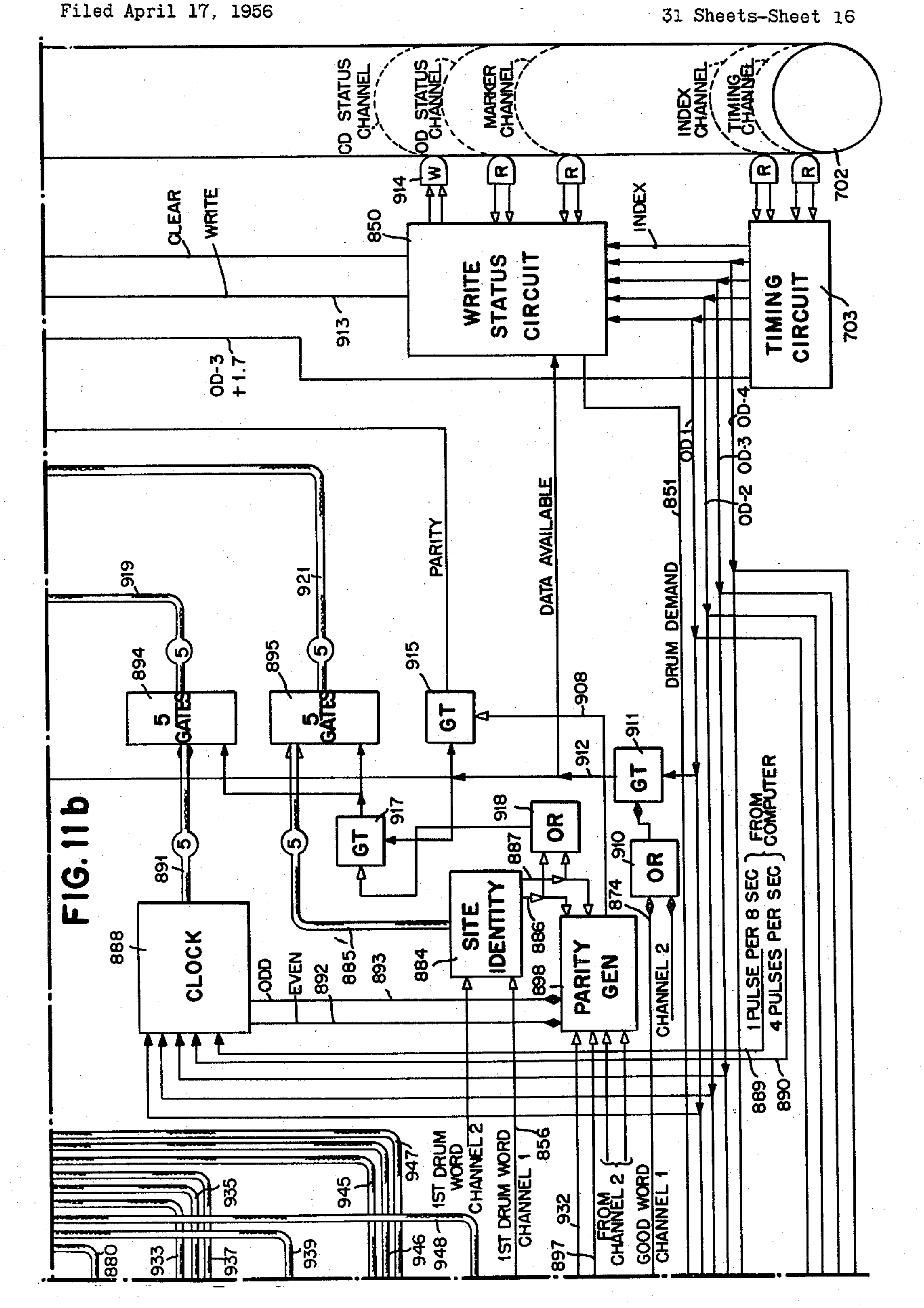
Figure 11C:
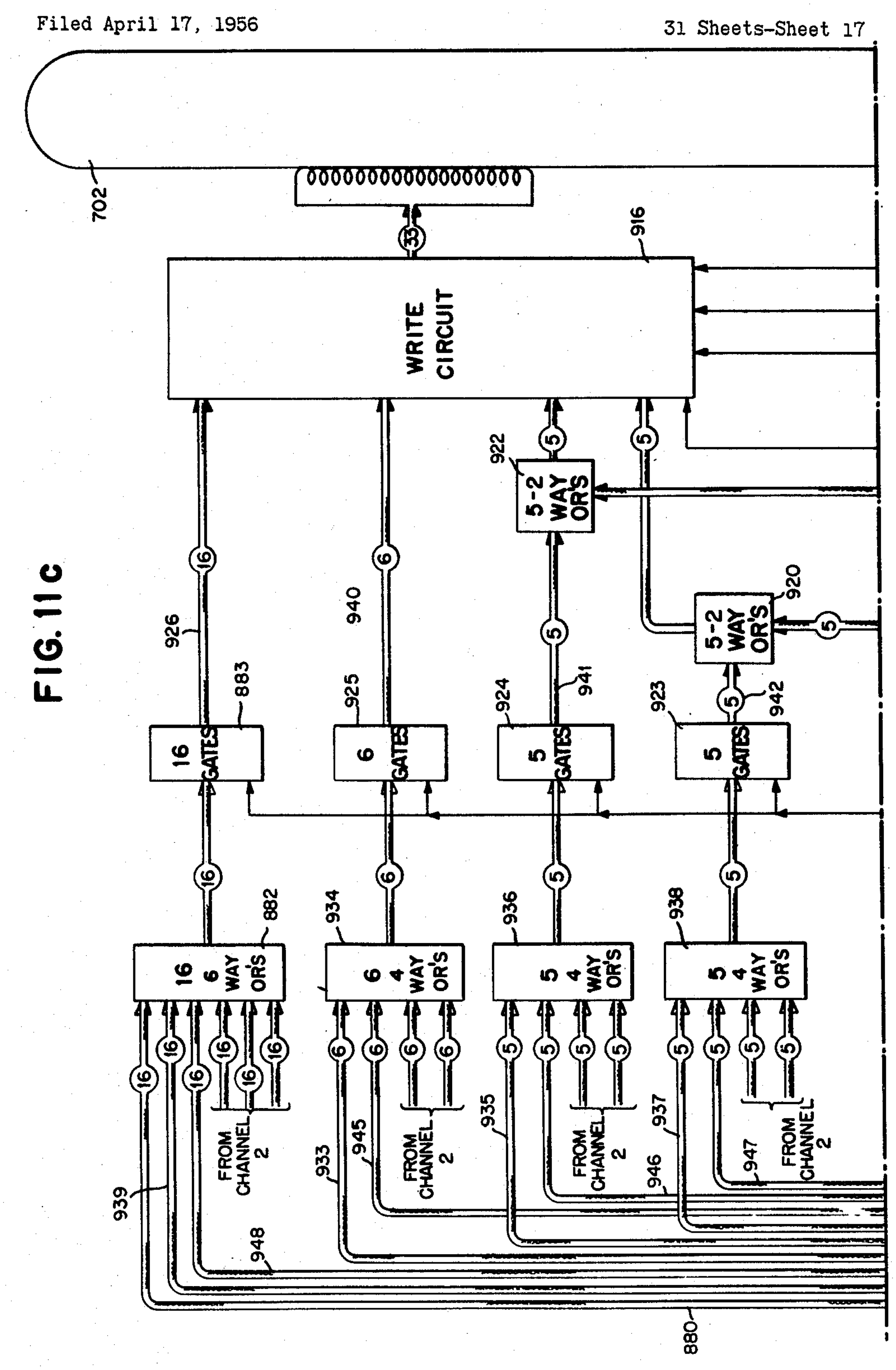

Fig. 11 is a diagram illustrating the manner in which Figs. 11*a*, 11*b* and 11*c* should be arranged to show the Input System of a Computer.

Figs. 11*a*, 11*b* and 11*c* when arranged in the manner shown in Fig. 11 illustrate in logical block diagram form the Input System of a Computer.

Figure 12:
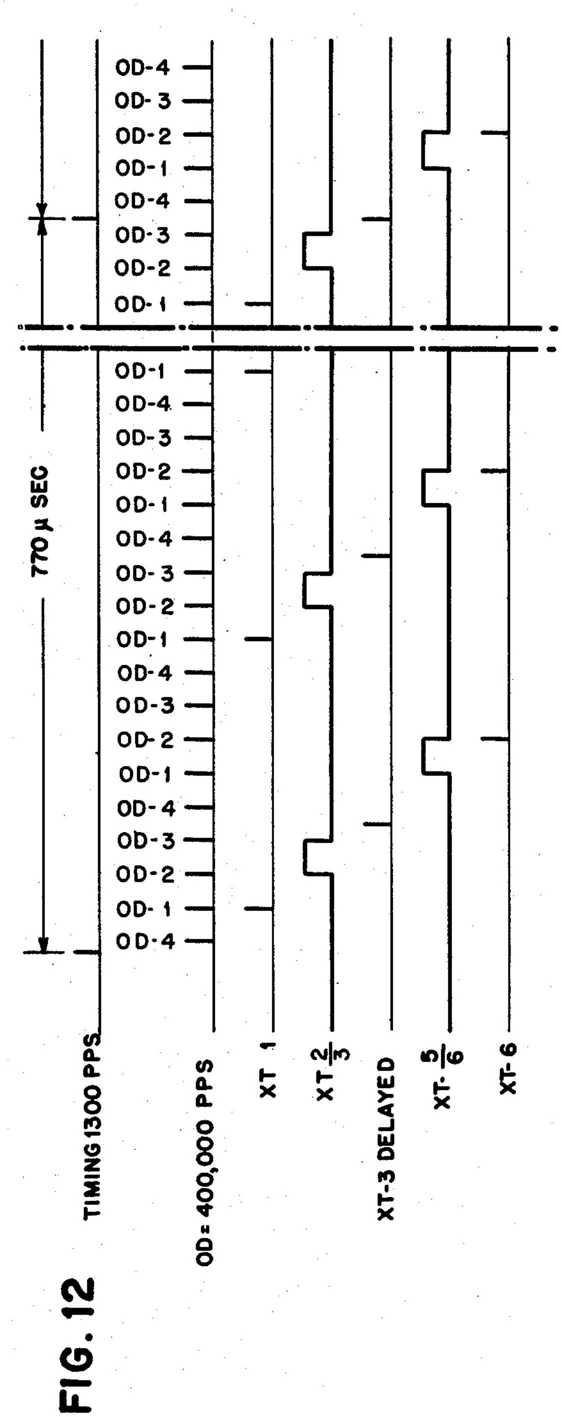

Fig. 12 is a family of curves illustrating the timing relationship of drum (OD) pulses and Cross-Tell (XT) pulses.

Figure 13:
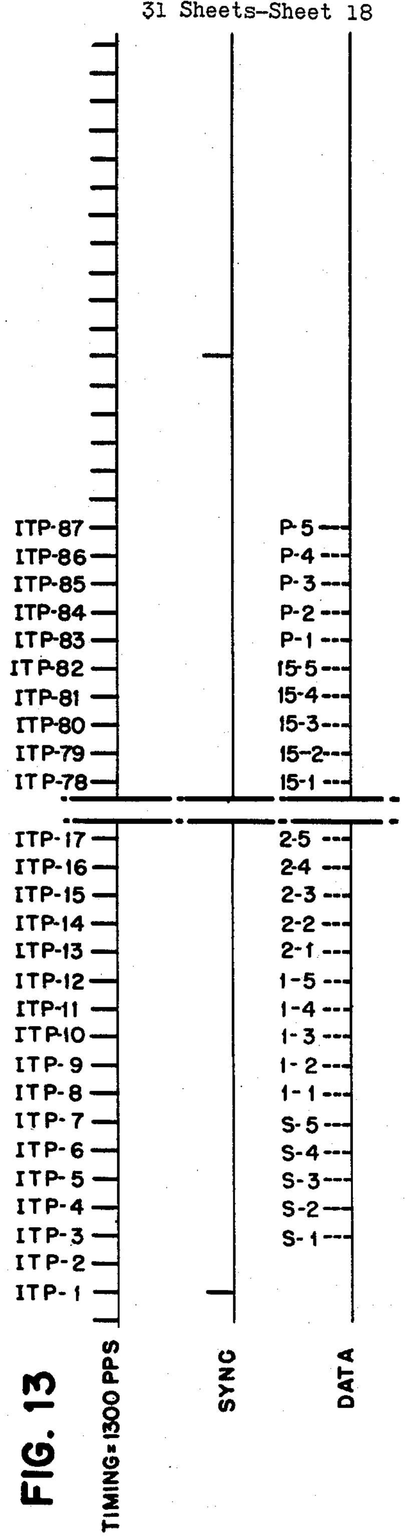

Fig. 13 is a family of curves illustrating the timing relationship of the timing, sync. and data pulses received by the input system of Figs. 11*a*, 11*b* and 11*c*.

Figure 14A:
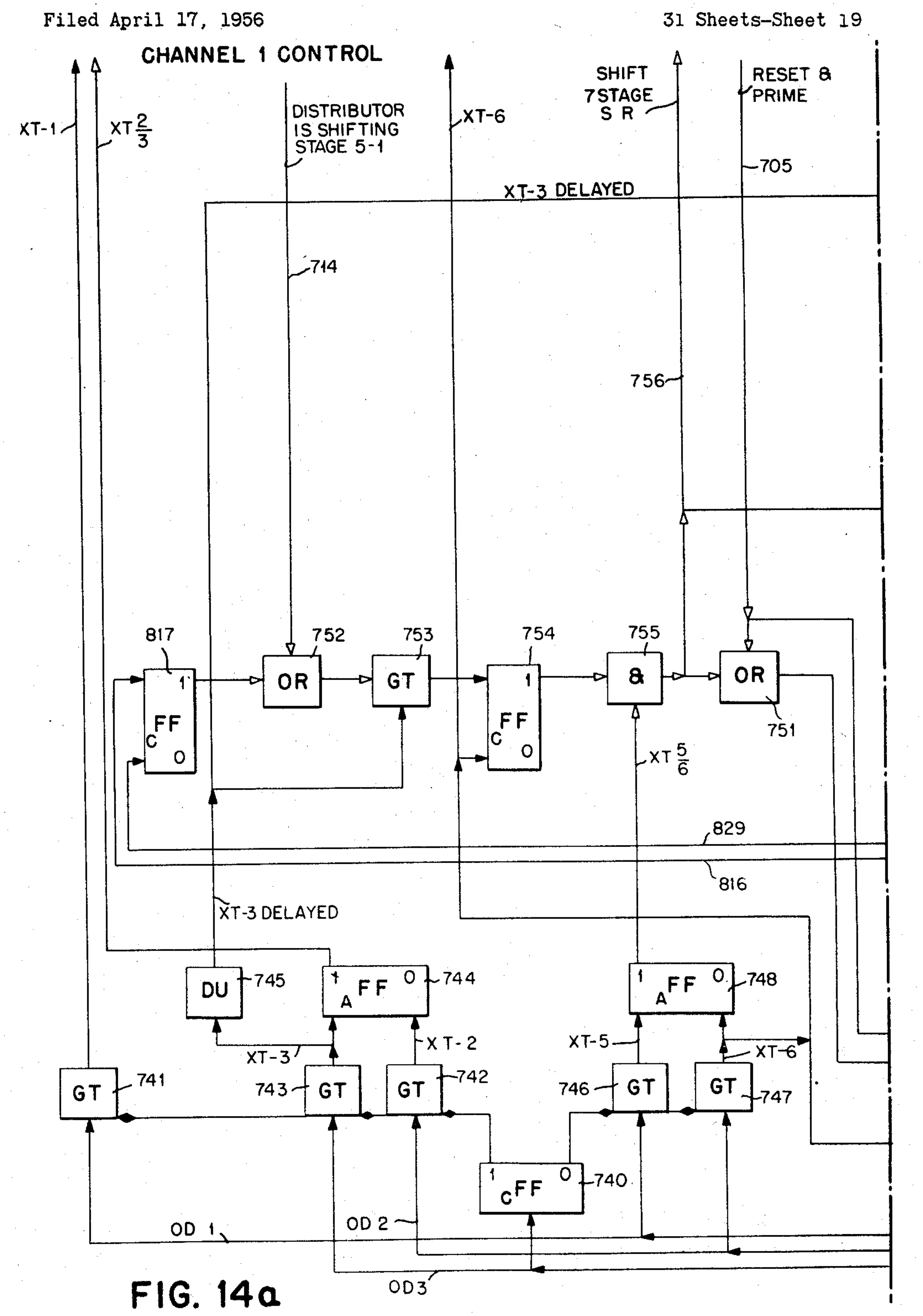
Figure 14B:
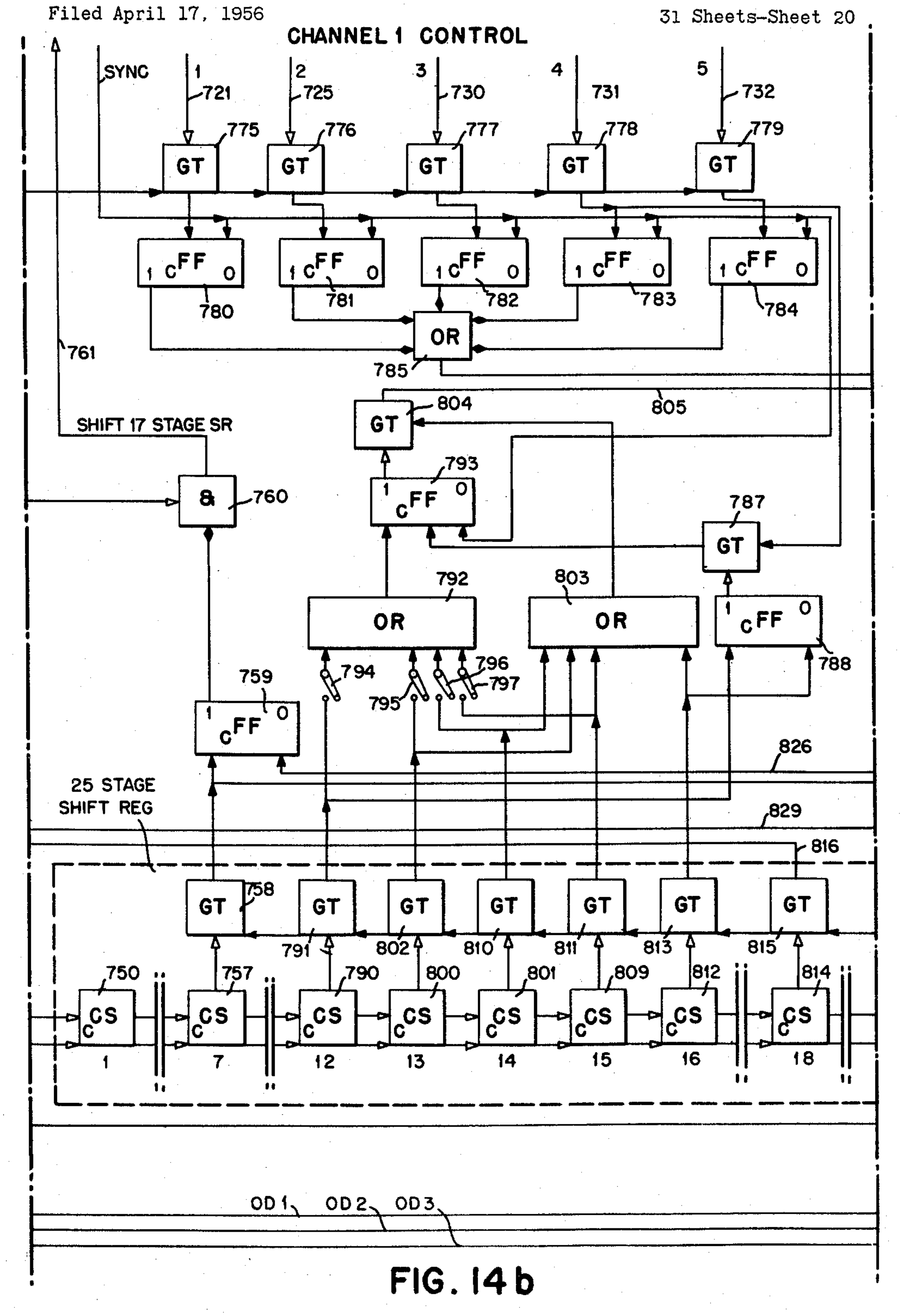
Figure 14C:
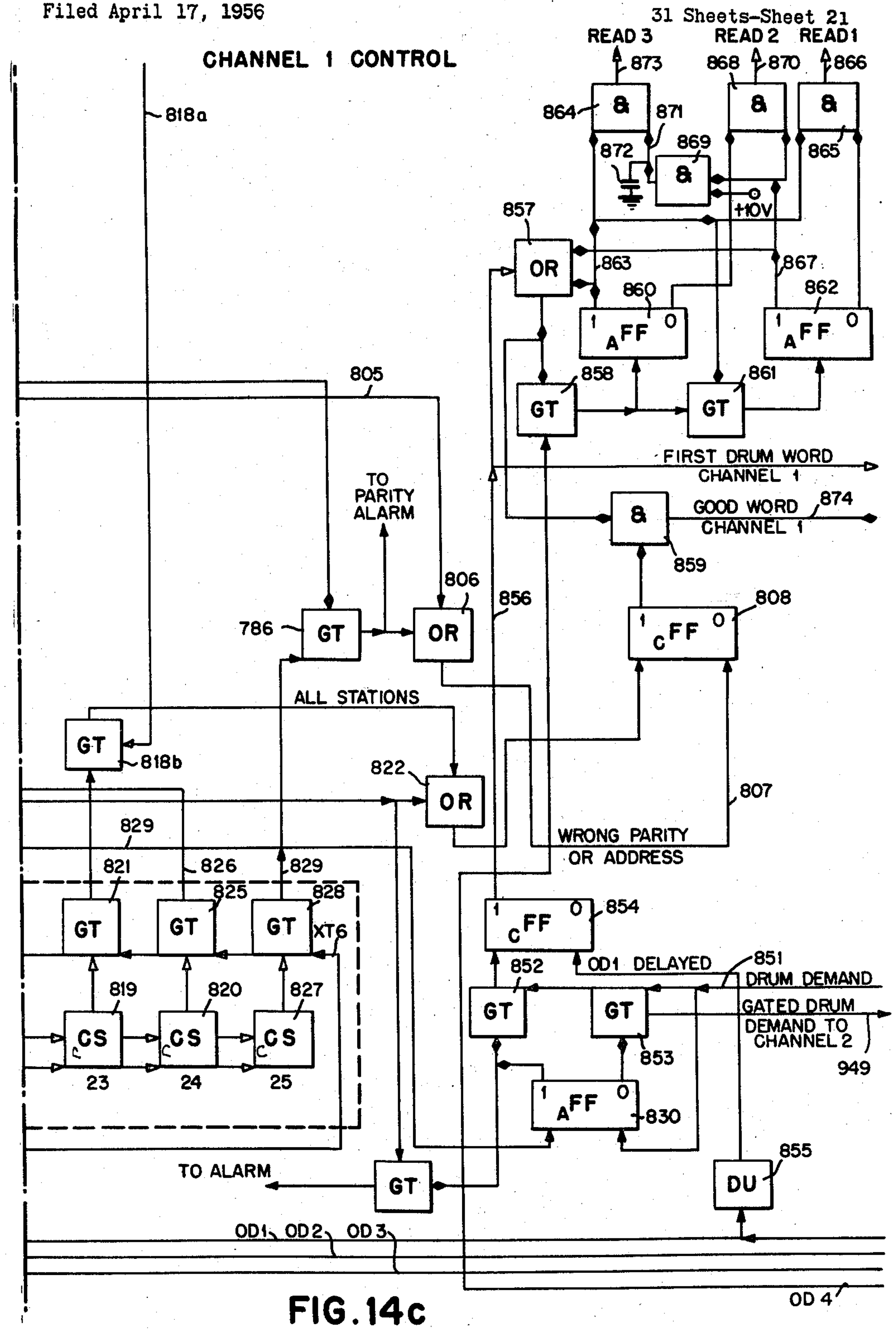

Figs. 14*a*, 14*b*, and 14*c* when arranged side by side in that order illustrate in logical block diagram form the channel 1 Control Circuit shown as block 704 in Fig. 11*a*.

Figure 15:
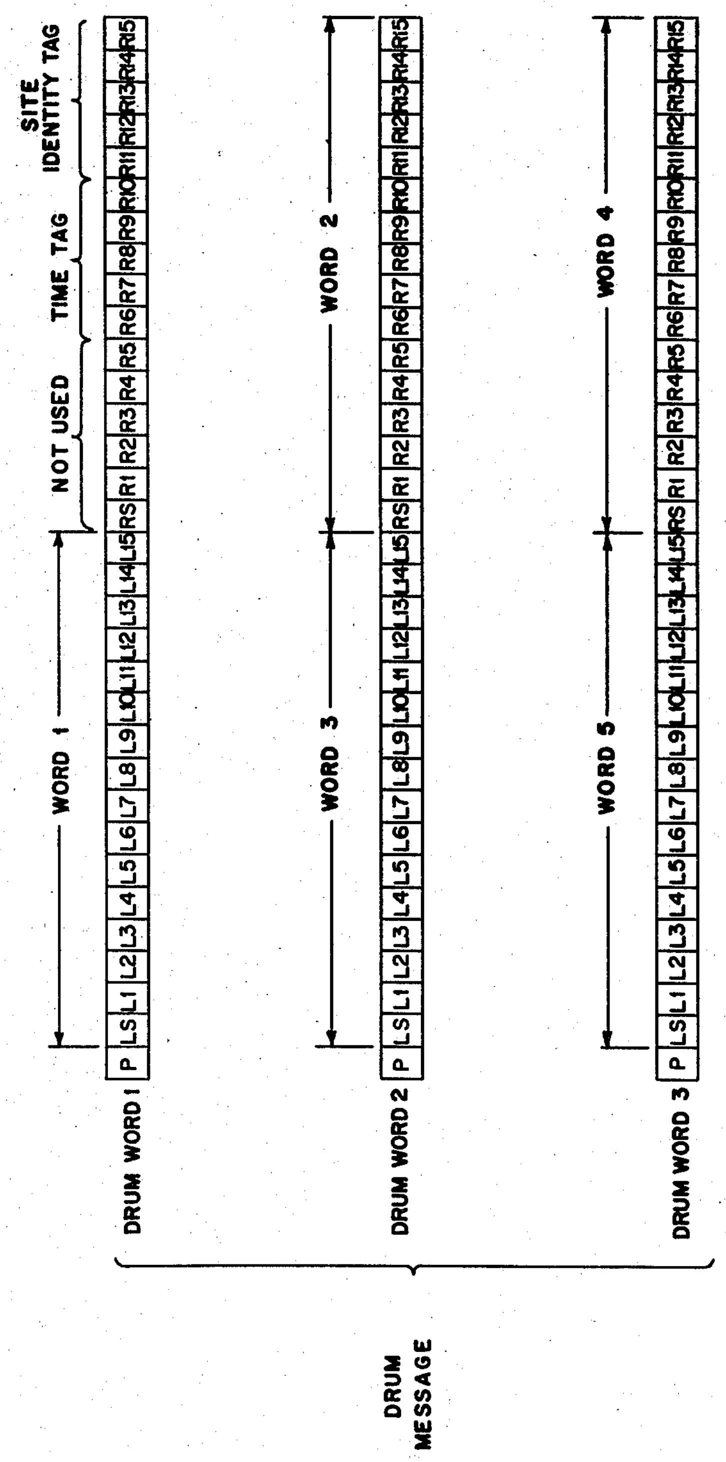

Fig. 15 is a chart showing the bit assignment lay-out of a three word drum message.

Figure 16:
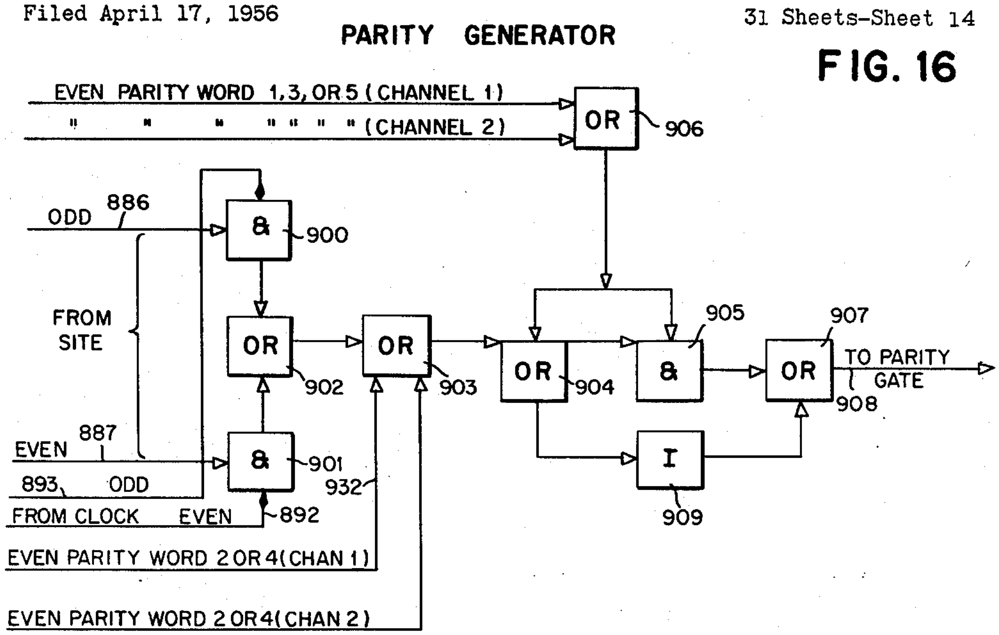

Fig. 16 is a logical block diagram of the parity generator shown as block 898 in Fig. 11*b*.

Figure 17:
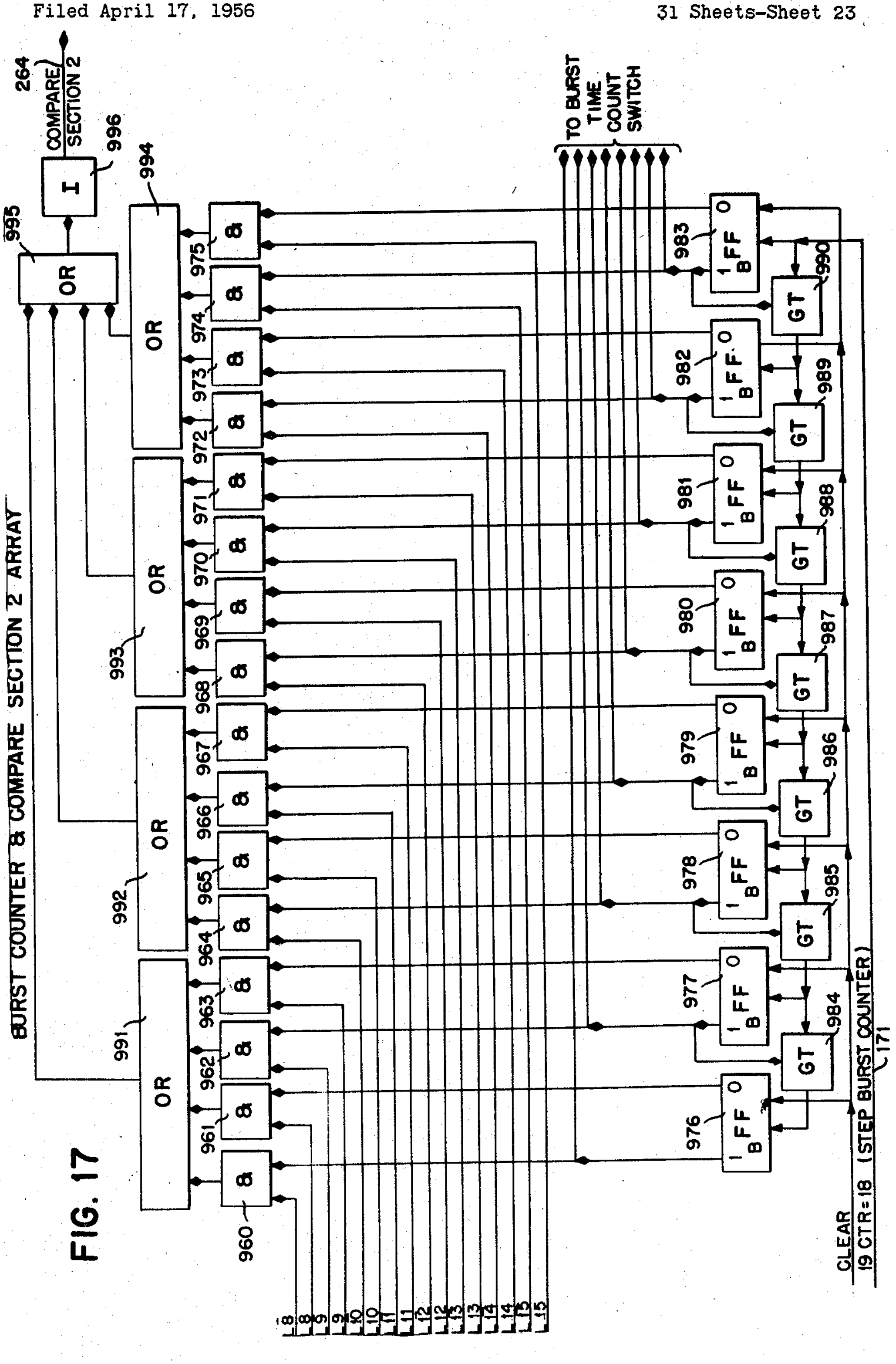

Fig. 17 is a logical block diagram illustrating the burst counter and compare circuit for Section 2 which is one of the circuits illustrated in Fig. 3*a* as block 258.

Figure 18:
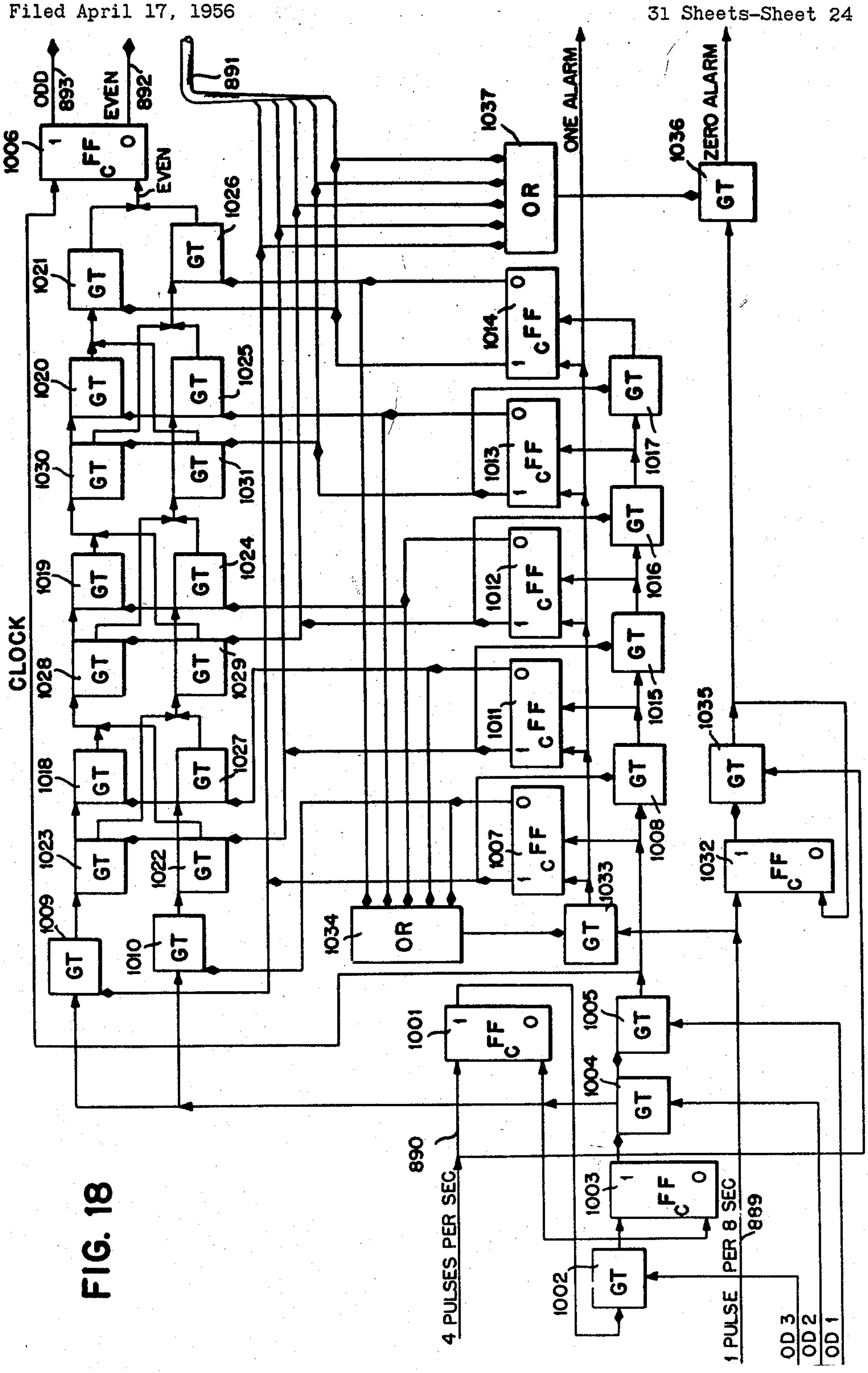

Fig. 18 is a logical block diagram illustrating the clock which is shown as block 888 in Fig. 11*b*.

Figure 19:
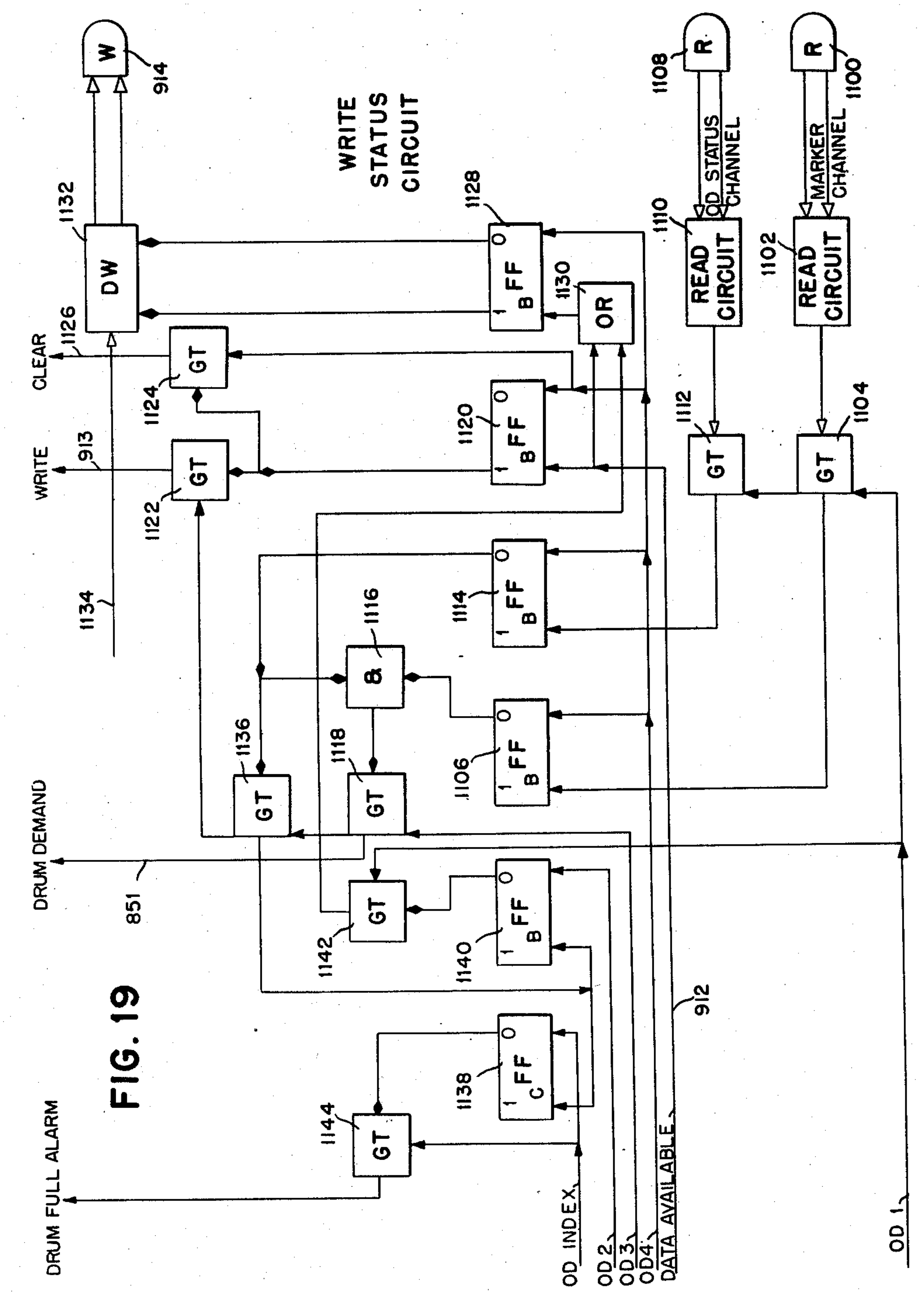

Fig. 19 is a logical block diagram illustrating the Write Status Circuit which is shown as block 850 in Fig. 11*b*.

Figure 20A:
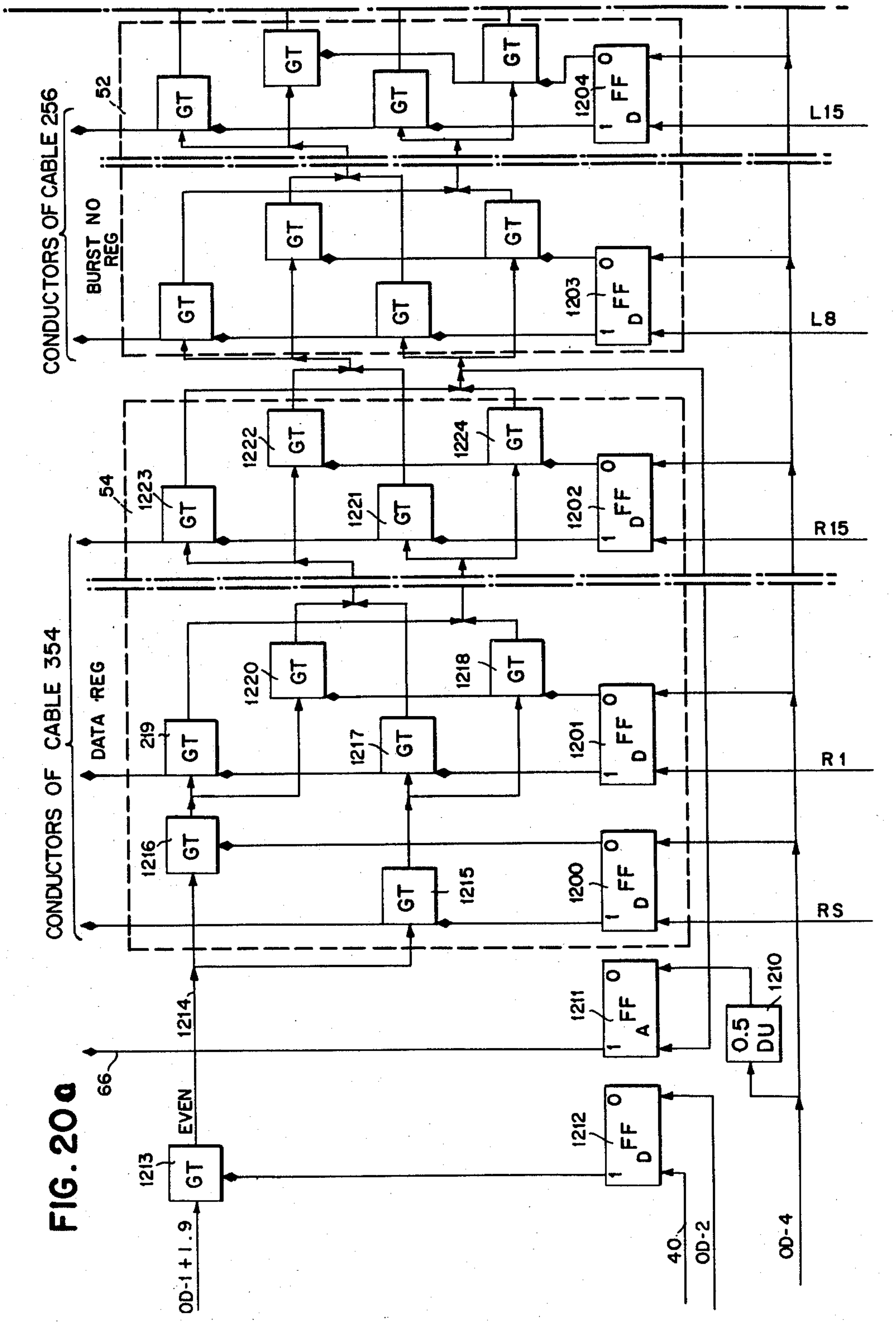
Figure 20B:
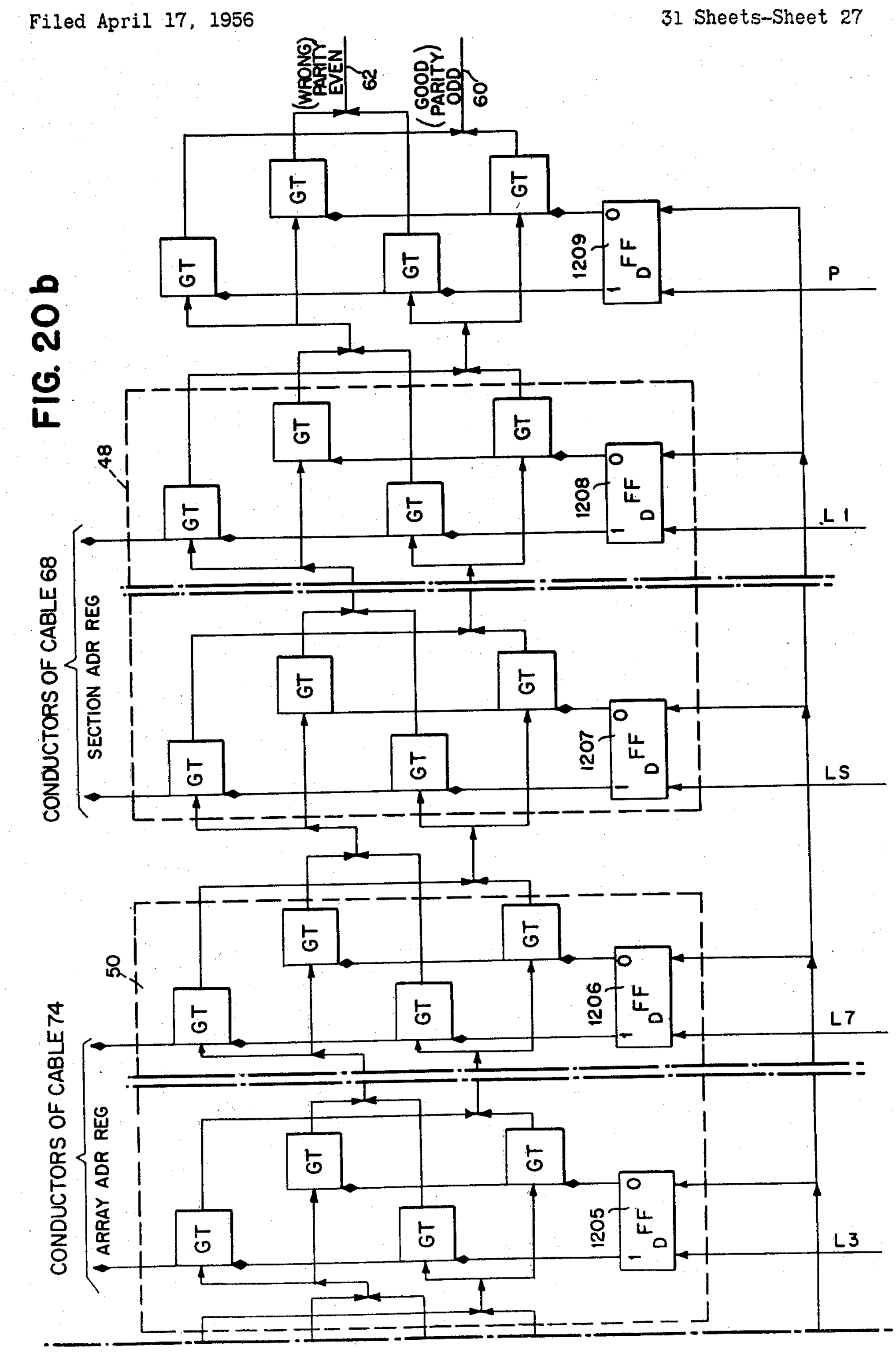

Figs. 20*a* and 20*b* when arranged end to end form a logical block diagram illustrating the drum word register which is shown in dotted lines and correspondingly labeled in Fig. 3*a*.

Figure 21:
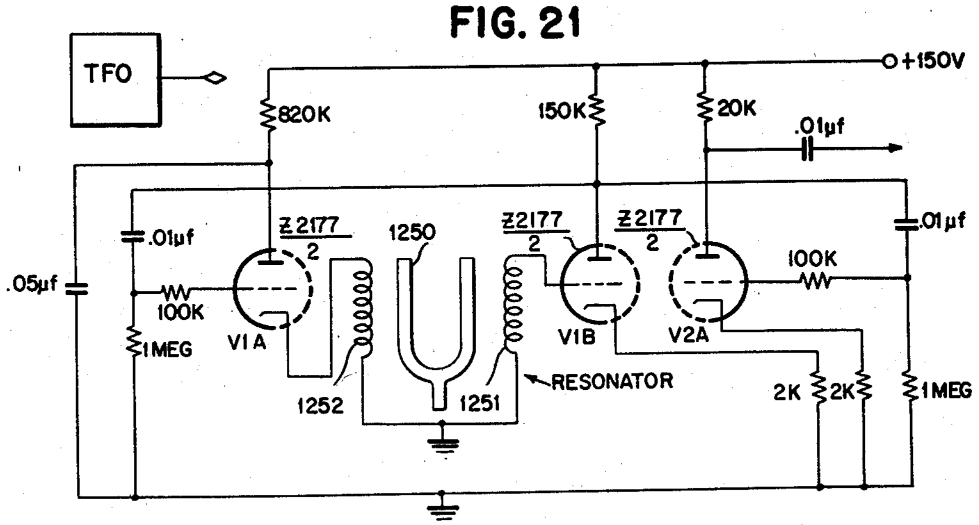

Fig. 21 is a schematic wiring diagram of the tuning fork oscillator shown as block 98 in Fig. 4*a*.

Figure 22:
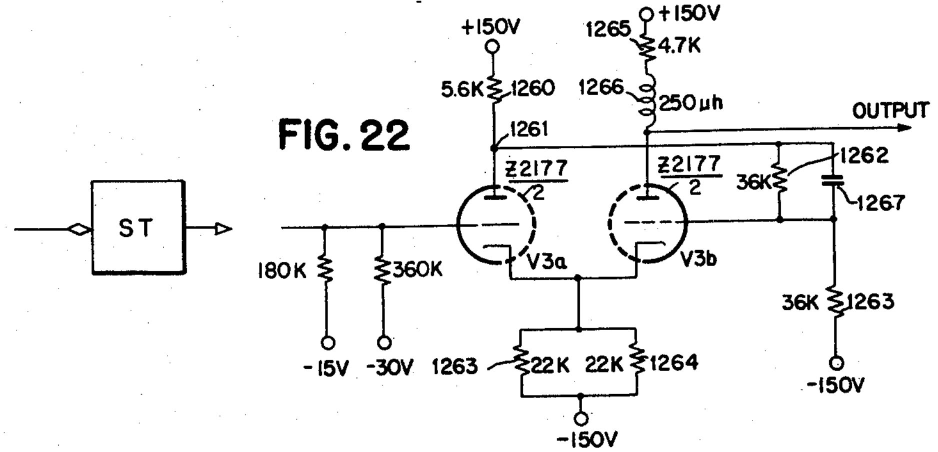

Fig. 22 is a schematic wiring diagram of the Schmitt trigger shown as block 100 in Fig. 4*a*.

Figure 23:
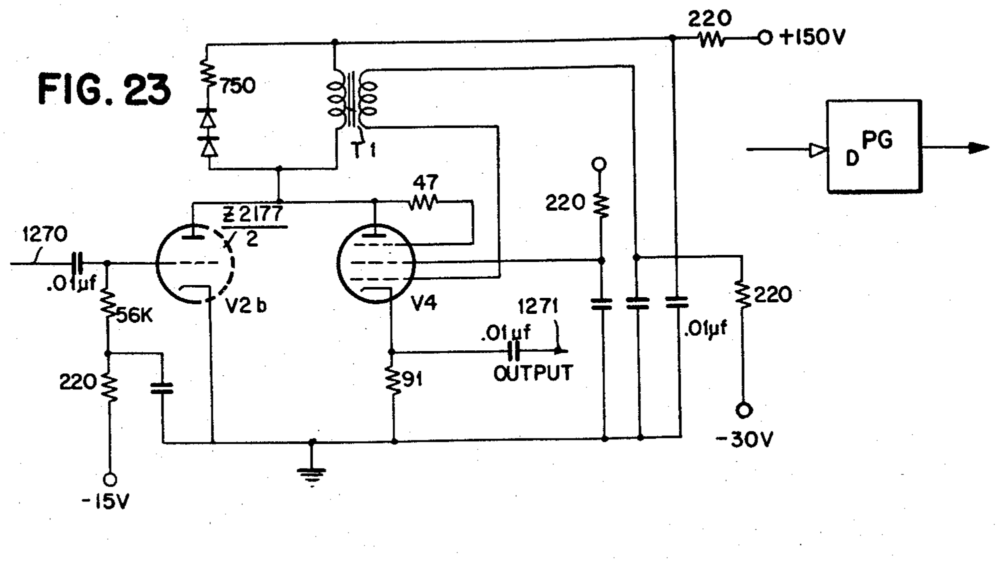

Fig. 23 is a schematic wiring diagram of the pulse generator shown as block 102 in Fig. 4*a*.

Figure 24:
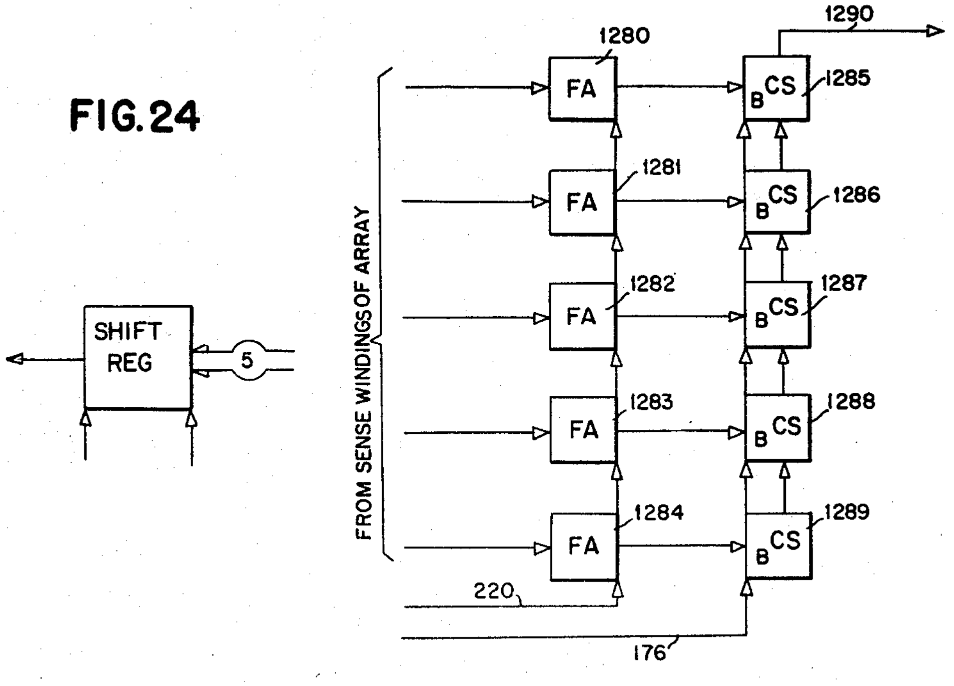

Fig. 24 is a logical block diagram illustrating the output shift register shown as block 420 in Fig. 3*b*.

Figure 25:
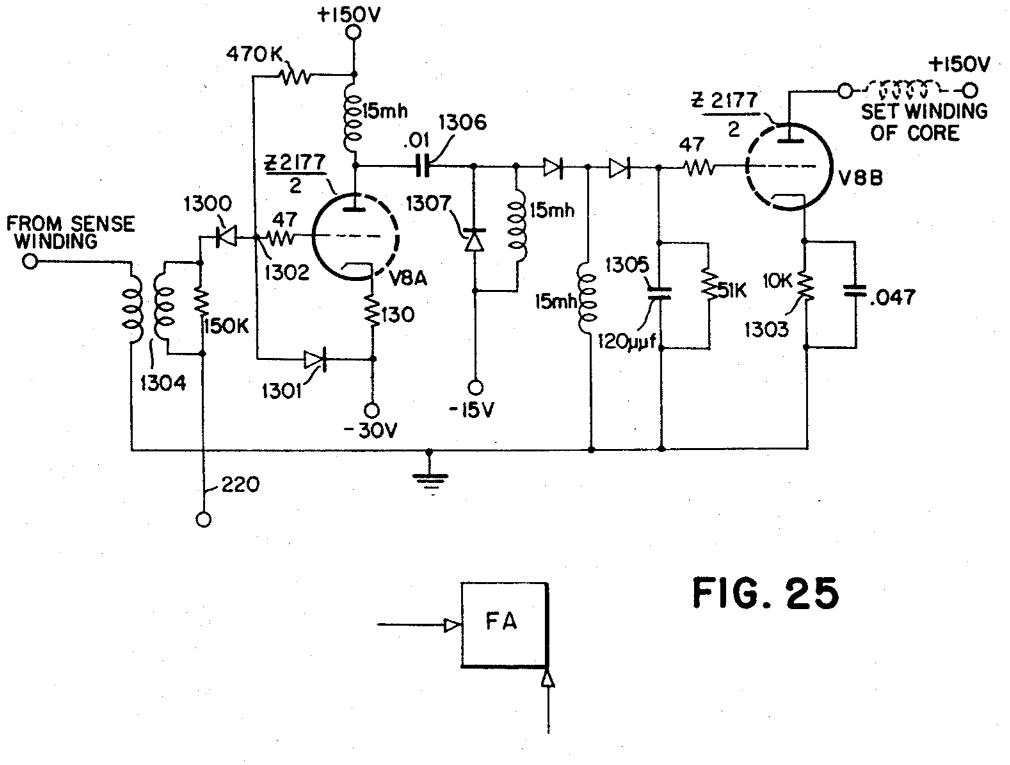

Fig. 25 is a schematic diagram of the flux amplifier shown as block 1280 in Fig. 24.

Fig. 26 is a schematic diagram of a core shift stage shown as blocks labeled "CS" in Fig. 24.

Figure 27:
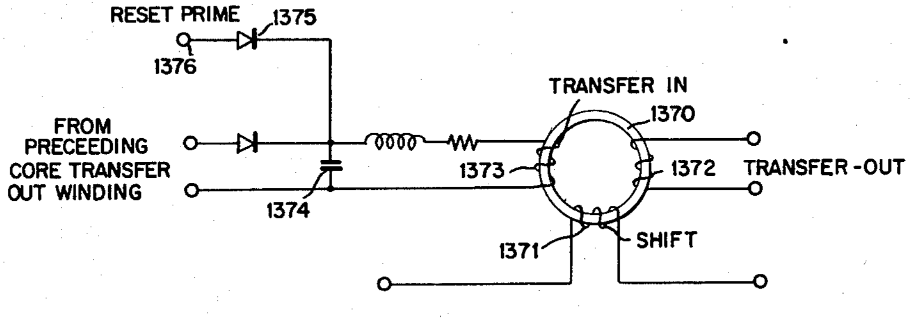
Figure 27:
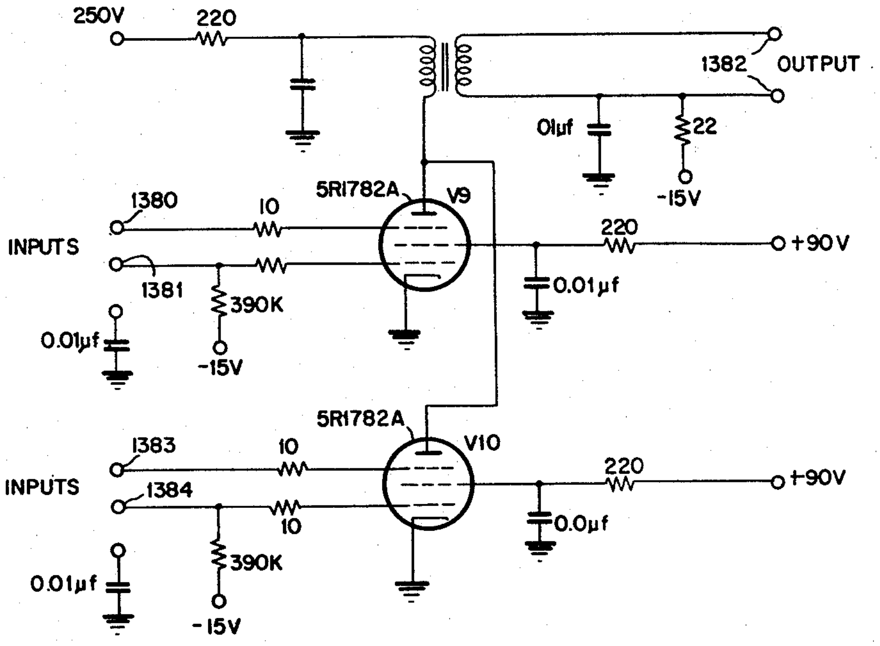

Fig. 27 is a schematic diagram of a core shift stage showing the connections for priming.

Figure 28:
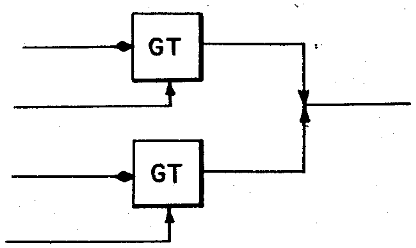

Fig. 28 is a wiring schematic diagram of gate circuits employed in an exclusive OR output arrangement.

Fig. 29 is a logical block diagram of the OD Read Status Control Circuit shown as block 38 in Fig. 3*a*.

*Conventions employed*

Since the invention will be described and illustrated in a system employing direct binary signals for the representation of digital information as distinguished from other types of binary signals, such as for example, binary coded decimal, a signal representing a digit will be referred to as a "bit," a group of bits will be referred to as a word or unit of intelligence, and a group of words will be referred to as a message.

Figure 1:
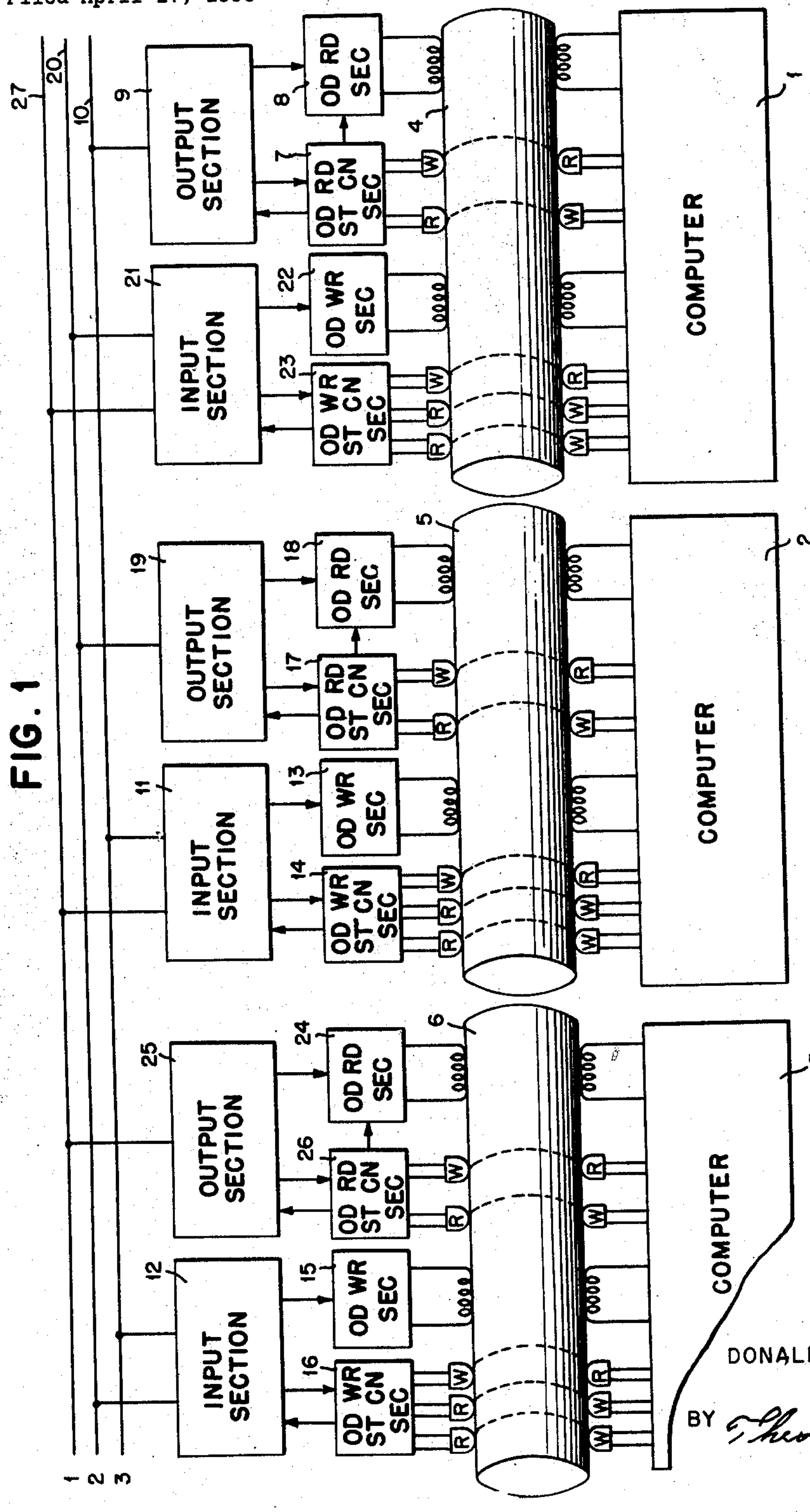
Fig. 1 is a simplified schematic block diagram of a communications system constructed in accordance with the principles of this invention.

Throughout the following description and in the accompanying drawings there are certain conventions employed which are familiar to certain of those skilled in the art. Additional information concerning those conventions is as follows:

In Fig. 1 of the drawing, each major part of the apparatus is shown as a block and data transfer and control between major parts is shown by a single line. Arrows on the lines of Fig. 1 indicate the direction of data transfer or control.

In the Block Diagram figures of drawings subsequent to Fig. 1, a conventional filled-in arrowhead is employed on lines throughout the drawing to indicate (1) a circuit connection, (2) energization with standard positive pulses and (3) the direction of pulse travel which is also the direction of control. A conventional unfilled-in arrowhead is employed on lines throughout the drawing to indicate the same things indicated by a conventional filled-in arrowhead except that the unfilled-in arrowhead illustrates a non-standard pulse generally having a duration considerably longer than the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the numbers of conductors within the cable. The D.C. levels are on the order of 10 volts when positive and 30 volts when negative, whereas pulses indicated by conventional filled-in arrowheads are positive going $\frac{1}{10}$ microsecond, half sine 20 to 40 volts in amplitude. Pulses indicated by conventional un-filled-in arrowheads are not necessarily sinusoidal, are usually pulses considerably longer than $\frac{1}{10}$ microsecond in duration and those referred to hereinafter are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical OR circuit, and so forth. The character subscripts preceding bold face characters identify the model of the circuit identified by the bold face character, that is, AFF identifies the model A flip-flop, CFF identifies the model C flip-flop and so forth.

In the description the general arrangement of the apparatus of a preferred embodiment of this invention will first be described with respect both to the manner in which the various circuit components and apparatus are interconnected and in respect to the general overall operation which is performed by these components and apparatus. The description of the general arrangement will be followed by separate and detailed descriptions of the various components and apparatus, which so require it, and each section of the description will have a heading which indicates the apparatus about to be described. The following is an index or table of contents of the description:

TABLE OF CONTENTS

| Subject | Column |
|---|---|
| Brief Description of Communications System | 4 |
| Message Delivered to Output Section | 6 |
| Output System | 6 |
| Section 2 Control | 8 |
| Array Read-In Control | 12 |
| Half-Write Current Generator | 14 |
| Section 2 Array | 16 |
| Drum Word Error Detection and Control | 18 |
| Wrong Section | 19 |
| Address Too High | 19 |
| Missed Word | 20 |
| Completed Message Control | 21 |
| Input System | 22 |
| Received Message Decoding and Synchronizing | 23 |
| Channel 1 Control | 25 |
| Received Message Parity Checking | 27 |
| Received Message Address Checking | 28 |
| Fast Shift Operation | 29 |
| Transfer from Core Storage to Drum Storage | 30 |
| Core Storage Read-Out Pulse Generation | 31 |
| Production of Drum Word 1 | 33 |
| Drum Word 1 Parity Generation | 34 |
| Production of Drum Word 2 | 36 |
| Parity Generation for Drum Word 2 | 36 |
| Production of Drum Word 3 | 37 |
| No Data Available in Channel 1 | 38 |
| Simultaneous Operation of Channels 1 and 2 | 38 |
| Burst Counter and Compare Circuit | 39 |
| Clock Circuit | 40 |
| Write Status Circuit | 42 |
| Drum Word Register | 43 |
| Tuning Fork Oscillator | 45 |
| Schmitt Trigger | 45 |
| Pulse Generator | 46 |
| Output Shift Registers | 46 |
| Gated Flux Amplifier | 46 |
| Core Shift Stages | 47 |
| Core Shift Stage with Reset and Prime | 48 |
| Logical OR Output of Gates | 48 |
| Read Status Control Circuit | 48 |
| Other Basic Circuits | 49 |

*Brief description of communications system*

Reference is first made to Fig. 1 which illustrates in simplified block form a communications system constructed in accordance with the principles of this invention. The communications system (called a Crosstell System) includes computers 1 through 3 having buffer drums 4 through 6 respectively for storage of output and input information. Information from computer 1 may be transmitted to either or both computers 2 and 3 by delivering information to be transmitted to buffer drum 4 from which the information is read by means of a Read control circuit 7 and Read Section 8 through an Output Section 9 and a Transmission Channel 10. The Transmission Channel 10 is indicated in Fig. 1 by means of a conductor or line. In the interest of illustrating in detail a preferred embodiment of this invention, the transmission channel will be described primarily with reference to its electrical characteristics. This transmission channel may be the type employed in above average quality voice transmission, that is, a channel having a band width sufficient to pass, with relatively uniform attenuation, signals having frequencies between 30 and 1600 cycles per second. It is to be understood however that the transmission channel may be of any suitable type as will become apparent hereinafter. Information delivered from computer 1 to Transmission Channel 10 is received by Input Sections 11 and 12. Input Section 11 performs a certain amount of processing of the information received and may deliver the information to Computer 2 by way of Write Section 13 and Buffer Drum 5 under the control of the Write Control Section 14. Information received by the Input Section 12 is likewise processed in a manner to be described in detail hereinafter and this information may be delivered to Computer 3 by way of Write Section 15 and Buffer Drum 6 under the control of a Write Section 16.

Information may be transmitted from Computer 2 to either or both Computers 1 and 3 by delivering that information to Buffer Drum 5 from where it is read under the control of a Read Control Section 17 through Read Section 18 and Output Section 19 to another Tranmission Channel 20. Information delivered to the Transmission Channel 20 may be received by Computer 1 through its Input Section 21, Write Section 22 and Buffer Drum 4 under the control of Write Control Section 23. This information transmitted by Computer 2 may also be received by Computer 3 through its Input Section 12, Write Section 15 and Buffer Drum 6 under the control of Write Control Section 16. Computer 3 may communicate with either or both of Computers 1 and 2 by delivering its information to Buffer Drum 6 from where it is read through Read Section 24 and Output Section 25 under the control of Read Control Section 26 to still another Transmission Channel 27.

From the preceding description it is noted that each computer has an associated Buffer Drum from which information may be read through its respective Read Section and Output Section under the control of a Read Control Section, and furthermore it will be noted that each computer includes an Input Section which may receive information from either one or both of two transmission channels and deliver that information through a Write Section to its Buffer Drum under the control of a Write Control Section. Since the input equipment as well as the output equipment of the computers may be identical, the subsequent description will be concerned with only the details of one of those input equipments and one of those output equipments. Although in Fig. 1 only three transmission channels and only three computers have been illustrated, it will be understood that in some practical embodiments of this invention many more than three computers will be arranged to intercommunicate and therefore many more than three channels will be provided. In the particular illustrated embodiment to be described hereinafter an output system will be provided such that it may deliver information to any one of five communication channels.

*Message delivered to output section*

Figure 2:
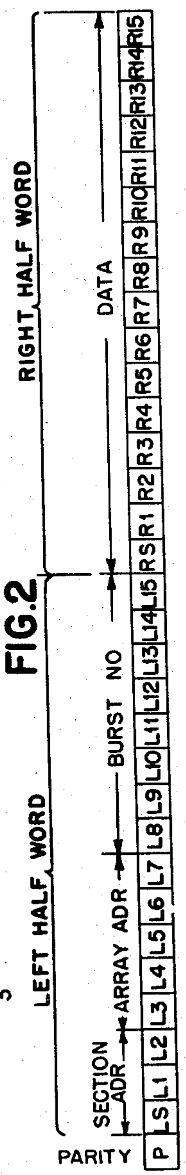
Fig. 2 is a diagram illustrating the bit assignments of one word of a typical five word message generated by a computer for transmission to another computer.

Reference is now made to Fig. 2 which illustrates the bit assignment of one word of a typical 5 word message which is delivered from the computer to its output drum, certain bits of each word of this message being intended for delivery to a communication channel. This message as read from the output drum includes 5 drum words each having 33 parallel bits. As shown in Fig. 2, a drum word includes a parity bit as well as a left and right half word. The left half word of each word has 3 bits labeled Left Sign through Left 2 and these 3 bits specify which one of several output sections the particular word is to be delivered to. As described herein, these section address bits determine whether or not the word is destined to be transmitted through a communications channel to another computer. It will be apparent therefore that words delivered by a computer may be destined to be transmitted to various things other than another computer. As will be described herein however, the equipment involved in transmission between computers will be described and only certain of the other equipment will be referred to. For the purpose of this description the transmission of words having the binary code 010 in their left half word, bit positions Left Sign through Left 2, will be described. Five bits of the left half word labeled Left 3 through Left 7 in Fig. 2 are a binary code which specifies which communication channel the particular word is to be transmitted to. The remaining 8 bits of each left half word specify a binary code which indicates the time at which that word is to be delivered from the drum to the output section, that is, a particular message as read from the drum will have in its left half word of each word the same code in bit positions Left 8 through Left 15 since all of the words of a given message are to be transmitted during the same time period. However, another message destined to be transmitted on the same communication channel will have still another binary code so that the two messages will be transmitted at different times. It will be understood that a message destined for transmission to another computer and a message destined to be delivered to some other section of the Output System may each have the same burst number and it will further be understood that a message destined for transmission to another computer by way of one channel may have the same burst number as another message which is destined for transmission by way of a different channel. These 8 bits will be referred to hereinafter as the burst number and this burst number in effect determines the order of transmission. The right half of each word of the message contains the information which is to be transmitted between computers. Bits 4 through 7 of the right half word of word 4 of the message is a binary code which specifies which one of several of the computers which receive this message should actually accept the message and bit 15 of the right half word of word 4 of the message is either a binary zero or a binary one, that is, if this message is to be accepted by all of the computers which receive the message a binary one is placed in this position whereas if only specific receiving computers are to receive this message then a binary zero is placed in this bit position and the aforementioned 4 bits of word 4 identify which one is to accept the message.

*Output system*

Referring now to Figs. 3*a* and 3*b*, a computer 30 is shown by a block symbol. It is to be understood that any suitable equipment may be provided for the device labeled Computer. However in the preferred embodiment, this equipment is of the type shown and described in copending patent application Serial Number 612,266, entitled "Control Equipment," filed by R. J. Cypser et al. on September 26, 1956 (IBM Docket 4908). This computer is capable of generating five word messages of the type described with respect to Fig. 2 and causes those messages to be written on a magnetic storage drum 32. The manner in which the computer may write on the drum 32 is illustrated and described in the aforementioned patent application, IBM Docket 4908. As described in that application, words are written in registers of the drum 32 in a random fashion, that is, a word is written provided that the register is empty and the drum has been instructed to write. As described in detail in that patent application each time a word is written on the drum 32 a binary one is written by the computer in an OD Status Channel 34.

The OD Status Channel 34 is read by a read head 36 which delivers the OD status signals to an OD Read Status Control Circuit 38. When a signal representative of a binary one is delivered to the OD Read Status Control Circuit 38 that circuit generates a pulse on a conductor 40 which causes that full drum register to have its signals delivered through Read Circuits 42 to a Drum Word Register 44. The parity bit of the drum word is delivered to a parity storage circuit 46, the section address bits shown in Fig. 2 as Left Sign through Left 2 are delivered to a Section Address Register 48, the array address bits Left 3 through Left 7 are delivered to the Array Address Register 50, the burst number is delivered to the Burst Number Register 52, and the data bits are delivered to a Data Register 54. In this way the signals from each register of the drum which is full are delivered to the various storage circuits of the Drum Word Register 44. When the OD Read Status Control Circuit 38 delivers a pulse to conductor 40 thereby causing sampling of the Read Circuits 42, that same pulse is also delivered to a parity generator 56 where in response to this pulse a pulse is delivered to a conductor 58 which is delayed in time by a suitable amount. This pulse on conductor 58 inspects each bit of the word read from the drum and determines whether there was an odd or an even number of binary ones in the word. If there was an odd number of binary ones a pulse is delivered to a conductor 60 labeled Good Parity whereas if the total number of binary ones in the word was an even number then a pulse is delivered to a conductor 62 labeled Wrong Parity. In response to this pulse on conductor 58 the data register 54 as well as the various other storage circuits of the drum word register were inspected to determine the total number of binary ones and if the total number of binary ones stored in the data register 54 is odd, a pulse is delivered to a conductor 64 which when received by the Parity Generator 56 causes a positive D.C. level to be established on a conductor 66 labeled Parity.

As will be apparent hereinafter, the timing and control is such that immediately prior to reading a drum word the Drum Word Register 44 is cleared, that is, all storage circuits in the Drum Word Register are set in their binary zero state and therefore only those circuits receiving a binary one signal (a pulse) from their corresponding read heads of the drum 32 will be set to their binary one state. The D.C. levels representative of the bits stored in the Section Address Register 48 are delivered by way of the conductors of a cable 68 to a Section Decoder 70 where these D.C. levels on the conductors of cable 68 cause a selected one of the conductors of a cable 72 to be made positive. The D.C. levels representative of the bits stored in the Array Address Register 50 are delivered by way of the conductors of a cable 74 to an Address Decoder 76 where the particular code causes a selected one of the conductors of a cable 78 and a corresponding one of the conductors of a cable 80 to be made positive provided that the signals received from the conductors of cable 74 represent a binary number between 0 and 25. In the event that the binary number represented by the signals on the conductors of cable 74 is a number greater than 25, then a position D.C. level will be established on one of the conductors of a cable 82 labeled Address Too High.

*Section 2 control*

Before proceeding with a further description of Fig. 3 a detailed description will be made of the Section 2 Control which is shown as block 84 in Fig. 3. This Section 2 Control provides the necessary control and timing for subsequent operations in the equipment shown in Fig. 3.

Referring now to Figs. 4*a* and 4*b* which illustrate in logical block form the Section 2 Control shown as block 84 in Fig. 3, the Section 2 Control receives drum timing pulses labeled OD—1, OD—2, OD—3 and OD—4. As described in detail in copending patent application Serial Number 494,982, these OD drum timing pulses are generated by a timing circuit shown in detail in Figs. 8 and 16 of that patent application. Referring now to Fig. 4*b*, pulses on the conductors labeled OD—1 through OD—4 are .1 microsecond pulses occurring every 10 microseconds and OD—1 precedes OD—2 by 2½ microseconds, OD—2 precedes OD—3 by 2½ microseconds and OD—3 precedes OD—4 by 2½ microseconds.

Referring back to Fig. 4*a*, OD—1 pulses are delivered through a delay unit 90 to a conductor 92 labeled OD—1+1 microseconds and these delayed OD—1 pulses are also applied through a further delay unit 94 to a conductor 96 labeled OD—1+1.9 microseconds. The Section 2 Control System further includes a source of 1300 pulses per second which is derived from a tuning fork oscillator 98 whose output is applied through a Schmitt trigger 100 and a pulse generator 102. These 1300 pulses per second appear on the conductor 104 and each of these pulses causes a flip-flop 106 to be set in its binary one state. Flip-flop 106 when in the binary one state conditions a gate 108 to pass a pulse received through a delay unit 110 from a conductor labeled OD—4. This pulse which samples the gate 108 is also delivered to a conductor 112 labeled OD—4+0.4 microseconds. The pulse passed by gate 108 causes a flip-flop 114 to be set in the binary one state thereby conditioning each of the gates 116, 118 and 120. Gate 116, when conditioned, passes a pulse received from the conductor labeled OD—2 to a conductor 122 labeled OD—2—13. A pulse on the conductor 122 also causes the flip-flop 106 to be cleared to its binary zero state. Gate 118 when conditioned passes a pulse received from the conductor labeled OD—3 to a conductor 124 labeled OD—3—13 and gate 120 when conditioned passes a pulse received from the conductor labeled OD—4 to a conductor 126 labeled OD—4—13. A pulse on conductor 126 also causes flip-flop 114 to be cleared to its binary zero state. OD—3—13 pulses are delivered to various circuits for control purposes and are also delivered to a conductor labeled (Timing) which is connected to the previously mentioned transmission channel as will be described in detail subsequently.

From the above description it will be seen that each pulse on the conductor 104 causes first a pulse to be delivered to the conductor labeled OD—2—13 followed by a pulse on the conductor labeled OD—3—13, followed by a pulse on the conductor labeled OD—4—13. Pulses on the conductors 122, 124 and 126 are therefore pulses which occur at a 1300 pulse per second rate and the OD—2—13 pulses precede the OD—3—13 pulses by 2½ microseconds and the OD—3—13 pulses precede the OD—4—13 pulses by 2½ microseconds. These delayed OD pulses and the 1300 pulses thus far described are delivered to various control circuits as will be described hereafter. The Section 2 Control Circuit of Fig. 4*b* further includes a circuit outlined by dotted line 130 to be referred to hereinafter as a 19 counter. The 19 counter basically consists of 19 stages connected as a shifting register and as herein described each stage includes a magnetic core together with a capacitor storage type of transfer circuit interconnecting each stage with its subsequent stage. Core shifting registers of this type are well known in the art and an example of this type of core shifting register is shown and described in detail in copending application Serial Number 484,677 (IBM Docket 4846), "Magnetic Core Circuit," filed by W. M. McMillan et al. January 28, 1955.

The Section 2 Control Circuit of Fig. 4*a* further includes a circuit outlined by dotted line 132 which will be referred to hereinafter as a 5 counter. The 5 counter is basically a five stage core shifting register and may be of the type shown in copending patent application Serial Number 438,657, "Transfer Circuit," filed by Francis Stern-Montagny June 23, 1954. Each OD—2—13 pulse is applied through an OR circuit 134 to cause a flip-flop 136 to be set in its binary zero state and this flip-flop 136 is set in its binary one state by pulses received on the conductor labeled OD—3. Flip-flop 136 in response to each OD—2—13 pulse causes its output conductor 138 to be made positive and it will stay positive for 2½ microseconds since the following OD—3 pulse causes the flip-flop 136 to be turned off. Pulses on the conductor 138 are applied to the shift windings of the five stages of the 5 counter 132. The 5 counter 132 is primed as will be apparent from subsequent description by applying a 2½ microsecond pulse to the conductor 140 which is connected to the input winding of the core in the 4th stage of the 5 counter 132. Each time a pulse is applied to conductor 138 the binary one state of a particular stage of the 5 counter is transferred to the next succeeding stage. When the binary one state is transferred from the 5th stage 142, this binary one state is transferred to the first stage 144 of that counter and further causes a gate 146 to be conditioned to pass the next OD—3—13 pulse.

A pulse passed by the gate 146 causes a flip-flop 148 to be set in its binary one state and this flip-flop is set in its binary zero state by a pulse received from an OR circuit 150. When the flip-flop 148 is in the binary one state, the positive potential pulse on output conductor 152, which is connected to the shift windings of the 19 counter, causes the binary one state of the particular stage of the 19 counter to be transferred to the next succeeding stage provided that the pulse on conductor 152 is approximately 2½ microseconds in duration.

The OR circuit 150 whose output turns flip-flop 148 off receives a pulse from a gate circuit 154 provided that the binary one state is not being transferred from the 19th stage 156. This pulse passed by gate 154 is an OD—4—13 pulse and therefore the conductor 152 will be made positive for 2½ microseconds if gate 154 passes the pulse. From the description thus far it will be seen that each time that the 5 counter is transferring the binary one state from its 5th stage 142 to its one stage 144, flip-flop 148 is set in its binary one state to cause the 19 counter to be shifted.

For the purpose of the immediate description, it will be assumed that the 5 counter has been primed by setting its 4th stage to the binary one state in any suitable manner and the 19 counter has been primed by causing its first stage to be set in the binary one state in any suitable manner. In response to the first received OD—2—13 pulse followed by a subsequent OD—3 pulse, flip-flop 136 causes the binary one state to be transferred from the 4th stage to 5th stage of the 5 counter 132. The next OD—2—13 pulse followed by an OD—3 pulse causes flip-flop 136 to transfer the binary one state from the 5th stage to the 1st stage and as a result of this transfer, flip-flop 148 is set in the one state and will be cleared to the binary zero state by the next OD—4—13 pulse. Therefore flip-flop 148 is in its binary one state for 2½ microseconds and its output conductor 152 causes the binary one state of stage 1 of the 19 counter to be transferred to stage 2.

When the binary one state is transferred from the 1 stage of the 19 counter, thyratrons 160 and 161 as well as a gate 162 will receive a positive potential having a duration on the order of 4 microseconds which positive potential begins at substantially OD—3—13 time. This positive potential received by thyratrons 160 and 161 will cause one or the other of those thyratrons to deliver current to its respective output conductor 164 or 165 respectively, dependent upon which of those thyratrons is conditioned by a flip-flop 166. Gate 162 in response to this positive potential resulting from the transfer in the 19 counter passes the next OD—4—13 pulse to cause a flip-flop 168 and a flip-flop 170 to be set in their binary one states and also causes a pulse to be delivered to a conductor 171 labeled Step burst counter. Flip-flop 168 when in the binary one state conditions a gate 172 to pass OD—2—13 pulses and these pulses cause a flip-flop 174 to be set in its binary one state. Flip-flop 174 is cleared to its zero state by OD—3—13 pulses. It will therefore be seen that as long as flip-flop 168 is in its binary one state, output conductor 176 will have a succession of 2½ microsecond positive pulses delivered thereto. Flip-flop 170 when in the binary one state causes a positive potential to be delivered to conductor 178 labeled Search.

From the above description it will be seen that when the binary one state is transferred from the 5th stage to the 1st stage of the 5 counter 132, the 19 counter is caused to shift the binary one state to the next succeeding stage, that is, when the 5 counter has been shifted five times the 19 counter is shifted once. When the binary one state is shifted from stage 2 of the 19 counter to stage 3, thyratrons 180 and 182 will have a positive pulse applied thereto and this positive pulse will be passed to their respective output conductors 184 and 186 dependent upon which of those thyratrons is conditioned by the flip-flop 166. Each of the stages 3 through 16 of the 19 counter is identical to the previously described stage 2, that is, they also have two output conductors, one of which will receive a pulse of current from its thyratron provided that that thyratron is conditioned by flip-flop 166. The transfer of the binary one state from stage 17 to stage 18 of the 19 counter causes a positive pulse to be applied to thyratrons 188 and 190, the output conductors of which are labeled 192 and 194 respectively, and the stage 17 operates in the same manner as the previously described stage 2. When the binary one state is transferred from stage 18 to stage 19 of the 19 counter a gate 196 is conditioned to pass an OD—4—13 pulse which causes flip-flops 168 and 170 to be set in their zero states. When flip-flop 168 is in the zero state the 2½ microsecond positive pulses are no longer applied to conductor 176. A positive D.C. level is established on conductor 198 when flip-flop 170 is in its binary zero state and this conductor 198 is labeled Not Search. The OD—4—13 pulse passsed by gate 196 is also applied to a conductor 197 labeled Reset and to the binary or complement input of flip-flop 166 to cause that flip-flop to reverse its existing state. The binary one output of flip-flop 166 is delivered by way of a conductor to condition one set of thyratrons and is also delivered to a conductor labeled Write in Array A. The binary zero output of flip-flop 166 conditions the other set of thyratrons and is also delivered to a conductor labeled Write in Array B.

When the binary one state is transferred from the 19th stage of the 19 counter this positive pulse is inverted by inverter 200 thereby preventing the previously mentioned gate 154 from being conditioned and therefore the flip-flop 148 which was turned on at OD—3—13 time by the 5 counter having been equal to five will remain on until a pulse is received from a gate circuit 202. Flip-flop 148 being in its binary one state causes gate 202 to be conditioned and since gate 154 did not pass the OD—4—13 pulse, gate 202 will still be conditioned at the time of the next OD—3 pulse to pass that pulse through OR circuit 150 to clear the flip-flop 148 to its binary zero state. From the description so far it will be seen that the 5 counter being equal to 5 causes flip-flop 148 to be turned on at OD—3—13 time and is turned off as long as the 19 counter does not equal 19 by an OD—4—13 pulse passed by gate 154. Normally flip-flop 148 generates a 2½ microsecond shift pulse on conductor 152. However when the 19 counter equals 19, the flip-flop 148 although turned on at OD—3—13 by the 5 counter equaling 5 is not turned off until OD—3 time. In this way flip-flop 148 is in its binary one state for 10 microseconds, delivering this 10 microsecond positive pulse to the shift conductor 152. This 10 microsecond shift pulse effectively clears the 19 counter since the shift current is left on long enough to prevent the capacitor transfer circuit from transferring a binary one state to any succeeding stage.

The pulse passed by gate 202, in addition to being delivered to OR circuit 150 as above described, is also delivered to a single shot 204 which in response to this .1 microsecond pulse produces a 2½ microsecond positive pulse on its output conductor 140 labeled Prime. This pulse on conductor 140 causes a binary one to be set in stage 1 of the 19 counter as well as stage 4 of the 5 counter. However before a pulse is delivered to stage 4 of the 5 counter that counter is cleared in the following manner: when the 19 counter equals 19, a gate circuit 208 is conditioned to pass the next received OD—4—13 pulse. This OD—4—13 pulse is delivered to the previously mentioned OR circuit 134 to cause flip-flop 136 to be set in the binary zero state. This flip-flop is cleared as previously described by an OD—3 pulse. However since flip-flop 136 is set in the binary zero state by an OD—4—13 pulse received from gate 208 flip-flop 136 remains in its binary zero state for 7½ microseconds, delivering a 7½ microsecond positive pulse to the shift conductor 138. This 7½ microsecond pulse is sufficiently long to clear the 5 counter in the same manner that the 10 microsecond pulse cleared the 19 counter. The pulse passed by gate 208, besides being delivered to the previously mentioned OR circuit 134, is also delivered to a conductor 210 labeled Shift Completed Message Shift Register as well as to flip-flop 212 to cause that flip-flop to be set in its binary one state. When in the binary one state, flip-flop 212 conditions a gate 214 to pass the next OD—3—13 pulse to a conductor 216 labeled Sync. It should further be noted that this OD—3—13 pulse causes the flip-flop 212 to be cleared to its binary zero state. The 2½ microsecond positive pulse and the 10 microsecond positive pulse produced by flip-flop 148 and delivered to conductor 152 are inverted by inverter 218 whose output is applied to a conductor 220 labeled Strobe. The one output of flip-flop 148 is also applied to a gate circuit 222 to condition that gate. Although gate 222 is conditioned many times during the operation of the 19 counter it will pass the OD—1 pulse applied thereto to the conductor 224 labeled OD—1 Special only at the time that the 19 counter equals 19.

Briefly summarizing the above description with respect to the Channel 2 control, the 19 counter causes one group of its thyratrons, for example 160, 180 and 188, to produce positive pulses on their output conductors in succession and these conductors are grouped in a cable 226. The next cycle of the 19 counter causes the other group of thyratrons to successively produce pulses on their output conductors which are grouped in cable 228. From the time that the 19 counter equals 1 to the time that the 19 counter equals 18, 2½ microsecond pulses at a 1300 cycle per second rate are delivered to the conductor 176. From the time that the 19 counter equals 1 to the time that the 19 counter equals 18, a positive D.C. level is established on a conductor 178 labeled Search and the remainder of the time a positive D.C. level is established on a conductor 198 labeled Not Search. When the 19 counter equals 19, a pulse is delivered to the conductor 210 labeled Shift Completed Message Shift Register and a pulse is produced on the conductor 216 labeled Sync. When the 19 counter equals 19 a .1 microsecond pulse is delivered to the conductor 224 labeled OD—1 Special.

Referring back to Fig. 3, bits Left Sign through Left 2 of each drum word which is stored in the Section Address Register 48 and decoded by the section decoder 70 cause one of the conductors of cable 72 to be made positive. If the section address code signals represent the binary number 010, then the conductor of cable 72 which is made positive is that which indicates that the drum word is destined for being written into a magnetic core array 250 labeled Section 2 Array A or magnetic core array 252 which is labeled Section 2 Array B. This positive potential on that conductor of cable 72 is delivered to an Array Read In Control 254.

Bits Left 8 through Left 15 of the drum word are stored in the previously mentioned burst number register 52. This register has a one and a zero output conductor for each bit stored therein and these output conductors form a cable group 256 as shown in Fig. 3. These D.C. levels representative of the burst number are delivered to a Burst Counter and Compare circuit 258. The Burst Counter and Compare circuit 258 essentially comprises a binary counter and means to compare the contents of the counter with the signals received on the conductors of cable 256 and if there is a comparison a positive potential is delivered to one of the conductors of cable 260. In a preferred embodiment of this invention the Burst Counter and Compare circuit 258 comprises three separate burst counters and compare circuits, one for each of three sections to which drum words may be delivered. Since this invention relates to the transmission of drum words to other computers, only one burst counter and compare circuit will be described in detail since the other burst counters and compare circuits may be identical but operate independently.

The Burst Counter and Compare circuit 258 receives a pulse from the conductor 171 and in response to each pulse increases the contents of the counter by one. It will be recalled in the description of Fig. 4 that a pulse is delivered to the conductor 171 each time that the 19 counter equals 1. If the contents of the burst counter successfully compares with the signals received on the conductors of cable 256, a positive potential will be delivered to one of the conductors of cable 260 and this signal is delivered to the Array Read-in Control 254.

*Array read-in control*

Reference is now made to Figs. 5*a* and 5*b* which illustrate in logical block form the details of the Array Read-In Control indicated in Fig. 3 as block 254. One of the conductors of cable 72 will be made positive under the above assumed conditions that the bits Left Sign through Left 2 of the drum word specify the binary number 010 and this conductor is indicated in Fig. 5 as conductor 262. When a successful comparison was made by the Burst Counter and Compare circuit 258 in Fig. 3 a positive potential is delivered to conductor 264 in Fig. 5.

As previously indicated with respect to Fig. 4*a*, a positive potential is delivered to a conductor 178 labeled Search as long as the 19 counter is equal to 1 through 18, and a positive potential is delivered to a conductor 198 labeled Not Search for the remainder of the 19 counter cycle. This positive potential on conductor 178 is delivered to each of three AND circuits 266, 268 and 270 of Fig. 5. The positive potential on conductor 262 is also delivered to each of those AND circuits as well as the positive potential on the conductor 264. As noted previously with respect to Fig. 4*a*, the flip-flop 166 has two output conductors, one labeled Write In Array A and the other labeled Write In Array B. These conductors are also connected to the Read-In Control Circuit of Fig. 5 such that the Write In Array B conductor is connected to the previously mentioned AND circuit 270 and the Write In Array A conductor is connected to the previously mentioned AND circuit 268. AND circuit 268 will produce a positive output provided that each of the following conditions is met: (1) bits Left Sign through Left 2 of the drum word specify the binary number 010, (2) a successful comparison was made by the burst counter and compare circuit for section 2, (3) the 19 counter is at a value between 1 and 18, and (4) the Write In Array A conductor is positive. AND circuit 270 will produce a positive output potential under the same conditions that AND circuit 268 produced a positive output except than AND circuit 270 requires a positive potential on the conductor labeled Write In Array B. AND circuit 268 conditions a gate 272 when its output is positive. This positive output is also applied to an inverter 274 whose output conditions a gate 276 when positive. AND circuit 270 conditions a gate 278 when positive and this output is also applied to inverter 280 whose output when positive conditions a gate 282.

As shown in Fig. 5, two additional AND circuits 284 and 286 are provided. AND circuit 284 is associated with the control circuits relating to Section 1 which is specified by bits Left Sign through Left 2 of the drum word identifying the binary number 001. It will be undertood that these three sections have their respective section control circuits and burst counter and compare circuits; therefore under the proper conditions for delivering a drum word to Section 1 AND circuit 284 will produce a positive output potential and likewise AND circuit 286 will produce a positive output when the proper conditions are met to deliver the drum word to Section 3. AND circuit 284 conditions a gate 288 when positive and the output of AND circuit 284 is also applied through an inverter 290 whose output when positive conditions a gate 292. AND circuit 286 when positive conditions a gate 294 and the output of AND circuit 286 is also applied to an inverter 296 whose output when positive conditions a gate 298.

The outputs of AND circuits 268, 270, 284 and 286 are applied to an OR circuit 300 whose output is applied to each of two gate circuits 302 and 304 and with this arrangement gates 302 and 304 will be conditioned when any one of the AND circuits 268, 270, 284 or 286 produces a positive output potential. Gates 272, 278, 288 and 294 are each sampled with an OD—4+0.4 microsecond pulse whereas gates 276, 282, 292 and 298 are sampled by an OD—2 pulse which is passed through the gate 302. A pulse passed by gate 288 or 292 causes a flip-flop 306 to be set in its binary one state, likewise gates 272 and 276 set a flip-flop 308; gates 278 and 282 set a flip-flop 310 and gates 294 and 298 set a flip-flop 312.

Flip-flops 306, 308, 310 and 312 are each set to their binary zero state by a pulse on the conductor labeled OD—1+1. The zero outputs of flip-flops 306, 308, 310 and 312 are respectively connected to Reset and Inhibit drivers 314, 316, 318 and 320. These reset and inhibit drivers are so constructed that in response to a positive potential they produce substantially no output current on their respective output conductors 326, 328, 330 and 332 whereas in response to a negative input potential they produce relatively large output currents.

As noted previously in the description of the operation of the drum word register 44 in Fig. 3, in the event that the total number of binary ones in the word read from the drum was odd, a pulse is delivered to conductor 60 labeled Good Parity. This pulse is delivered to the Array Read-In Control in Fig. 5 where it is applied through a delay unit 322 to the previously mentioned gate 304 and the timing of this pulse by proper adjustment of the delay unit 322 is such that this pulse arrives at the gate 304 at substantially OD—2+1.2 microseconds and in the event that gate 304 is conditioned, a pulse is passed to cause the flip-flop 324 to be set in its binary one state. This flip-flop is set to its binary zero state by OD—4 pulses. When in the binary one state flip-flop 324 produces a positive output on its output conductor 334 labeled Sample Set Drivers.

The operation of the Array Read-In Control thus far described will be explained with reference to Fig. 6 which is a family of curves illustrating in idealized form the potentials on various identified conductors. For the purposes of this description, it will be assumed that AND circuit 268 produces a positive output potential and therefore since a drum word can only be destined for one section, all of the other AND circuits, namely, 270, 284 and 286, will produce a negative output. This positive output produced by AND circuit 268 causes the gate 272 to be conditioned and gate 276 to be non-conditioned. AND circuit 284 producing a negative output causes gate 288 to be non-conditioned and gate 292 to be conditioned. Likewise, AND circuit 270 causes gate 278 to be non-conditioned and gate 282 to be conditioned, and AND circuit 286 causes gate 294 to be non-conditioned and gate 298 to be conditioned. At OD—1+1 time the selected flip-flop 308 is set in its binary zero state to produce a positive output potential and likewise flip-flops 306, 310 and 312 produce a positive output beginning at OD—1+1 time. At OD—2 time gates 298, 282 and 292 pass the OD—2 pulse to cause flip-flops 306, 310 and 312 to produce a negative output. At OD—2+1.2 time gate 304 passes a pulse to cause flip-flop 324 to produce a positive output. At OD—4 time flip-flop 324 is set to its binary zero state thereby producing a negative output. The output of flip-flop 324 is labeled Sample Set Drivers and therefore has a positive pulse which begins at OD—2+1.2 time and ceases at OD—4 time. At OD—4+0.4 gate 272 passes a pulse to cause flip-flop 308 to be set in its binary one state thereby producing a negative output and at the next following OD—1+1 time flip-flops 306, 308, 310 and 312 will all be reset to their binary zero states. Conductors 326, 328, 330 and 332 form a cable group indicated in Fig. 3 as cable 350 and signals on these conductors are delivered to a half write current generator 352. The previously described positive pulse on conductor 334 labeled Sample Set Drivers is also delivered to the half write current generator 352. The D.C. levels from the data register 54 of Fig. 3 are also delivered to the half write current generator by way of the conductors of cable 354 as well as the previously mentioned parity conductor 66.

As previously mentioned with respect to Fig. 3, the address bits of the drum word are decoded in address decoder 76 to cause one of the conductors of cable 78 to be made positive and these conductors of cable 78 are also delivered to the half write current generator 352.

*Half-write current generator*

Referring now to Fig. 7, the conductors of cable 354 (data), the conductor 66 (parity) and the conductors of cable 78 (address) are connected to respective circuits labeled STD and these circuits are known in the art as Set Drivers. Essentially a set driver is a circuit which responds to a positive conditioning potential and a positive sample pulse to produce a relatively heavy current pulse on its output conductor. These set drivers are so constructed that they will produce sufficient current on their output conductors to cause one of the four cores associated with that output conductor to assume a binary one state provided that the core is not inhibited. More specifically, set driver 360, for example, has associated with its output conductor 362 four cores 363, 364, 365 and 366. Core 363 is associated with another conductor 332 which is the conductor previously described with respect to Fig. 5. Core 364 likewise has the conductor 330 associated therewith, core 365 has the conductor 328 associated therewith and core 366 has the conductor 326 associated therewith. It will be understood that each of the conductors of cable 354 and cable 78 as well as conductor 66 have an associated set driver, the output of which is associated with a row of four cores. Conductor 332 in addition to being associated with core 363 as above described is also associated with a core in each of the rows of the core array. Conductors 330, 328 and 326 are likewise associated with a core in each of the rows of the array.

Reviewing the operation thus far described, the drum word is read and stored in the Drum Word Register by sampling the read circuits at OD—1 time and therefore shortly thereafter the conductors of cable 354 and cable 78 will arrive at their steady states representative of the data and address respectively identified by that drum word. The parity conductor 66 will arrive at its steady state representative of the parity of the 16 bit data word shortly before OD—2 time. As previously mentioned with respect to Fig. 5, all of the reset and inhibit drivers 314, 316, 318 and 320 receive a positive potential beginning at substantially OD—1+1 time and therefore produce substantially no currents to the conductors 326, 328, 330 and 332. Beginning at OD—2 time the unselected conductors (as above assumed, conductors 326, 330 and 332 are unselected whereas conductor 328 is selected) produce a relatively heavy current and these currents are of such magnitude as to cause the cores associated with those conductors to be driven to their saturated state representative of a binary zero. Beginning at OD—2+1.2 time and ending at OD—4 time a positive potential is delivered to conductor 334 labeled Sample Set Drivers and this potential causes those set drivers which have been conditioned in response to the drum word to produce a current on their output conductors. This current is of sufficient magnitude to cause the selected core to be set in its binary one state but is not of sufficient magnitude to set the unselected cores since those cores are inhibited by the current from their respective reset inhibit drivers. At substantially OD—4 time those cores which are to be set in their binary one state have been so set and therefore the positive potential on conductor 334 ceases and this is immediately followed by the selected reset and inhibit driver producing a relatively heavy current. This current from the selected reset and inhibit driver causes those cores which were previously set in their binary one state to be reset to their binary zero state thereby producing a pulse in the sense winding associated with those cores.

The sense windings associated with column 4 cores which receive data and parity signals form a cable group indicated in Fig. 7 as cable number 370. The remaining cores of column 4 which receive address signals have their sense windings form a cable group indicated in Fig. 7 as cable 372. The other three columns have their windings similarly grouped, that is, column 3 sense windings form cables 374 and 376, column 2 sense windings form cables 378 and 380, and column 1 sense windings form cables 382 and 384. These sense windings in response to a change in the binary state from binary one to binary zero in their respective cores, receive an induced current of sufficient magnitude to produce what is known in the art as a half write current.

Referring back to Fig. 3, the conductors of cable 370 (data) are applied to a Section 1 Array 390 as well as the conductors of cable 372 (address). These address and data signals operate in a well known coincident current manner to cause the data signals to be written into the register of the array specified by the address signals. Likewise the conductors of cable 382 (data) and the conductors of cable 384 (address) are applied to a Section 3 Array 392. The conductors of cable 374 (data) and 378 (address) are applied to the Section 2 Array B 252 whereas the conductors of cable 378 (data) and the conductors of cable 380 (address) are applied to the Section 2 Array A 250. In this manner words read from the drum are stored in the array of Section 1, the array of Section 3 or any one of the arrays of Section 2, dependent upon the binary code contained in bits Left Sign through Left 2 of the drum word. However, if the drum word has a binary code indicating that the word is destined to be written into one of the Section 2 arrays, the particular array into which that word is written is controlled by the Section 2 Control Circuit 84. As will be apparent from the subsequent description, when a word is read from the drum which is destined to be written into one of the Section 2 arrays that word is written into the array A or the array B dependent upon which of those arrays is at present being read out of, that is, if array A is being read out of at this particular instant then the drum word will be written into array B and vice versa.

*Section 2 array A*

Reference is now made to Fig. 8 which illustrates in simplified schematic form a core array such as, for example, Section 2 Array A or Section 2 Array B, since these arrays as well as arrays 390 and 392 may be of identical construction. In a preferred embodiment the Section 1 Array 390 and the Section 3 Array 392 are not exactly identical to the Section 2 Arrays 250 and 252; nevertheless for an understanding of this invention the details of the Section 1 Array and the Section 3 Array are not required.

The data conductors delivered from the half write current generators are so arranged that each conductor is associated with a column of cores in the array and those data conductors when energized furnish what is known as a half write current to each of the cores in their respective column. This half write current by itself is ineffective to change the state of the magnetic cores associated therewith. The conductors from the half write current generator previously identified as address conductors are each associated with a row of cores in the array. In this way when the data conductors are energized with half-write currents representative of data, those bits of data will be written into the particular row of cores which receives a half-write current from its associated address conductor and therefore the cores of that row will be set in their binary one state or remain in their binary zero state in accordance with the particular bit of data that the core received.

As thus far described the 16 bits of data of the word read from the drum are written into the selected section identified by bits Left Sign through Left 2 of the drum word. The particular address in the array being that specified by bits Left 3 through Left 7 and when those 16 bits of data are written into an array a parity bit is also written with the data thereby specifying that the total number of binary ones in the 17 bits is an even number.

As previously mentioned with respect to the description of Fig. 5, the 19 counter causes the conductors of cable 226 to be sequentially pulsed or the conductors of cable 228 to be sequentially pulsed. Those conductors of cable 226 and 228 are the reset or read out conductors of their respective arrays. As shown in Fig. 8 the reset or read out conductors are arranged such that each conductor is associated with a column of the array and when energized this conductor causes each of the cores of that column to be set in its binary zero state. If for example conductor 400 which is associated with column 1 of the array is pulsed, all of the cores of that column which were in their binary one state will cause a signal to be induced in their corresponding sense winding. The array is so divided that each five rows of cores form a logical group. The first logical group could be said to be slots 0 to 4, the cores of this group being individually shown in Fig. 8. The second logical group could be said to be slots 5 to 9 and are indicated in Fig. 8 by block 402. Similarly, slots 10 to 14 are shown as block 404, slots 15 to 19 as block 406, and slots 20 to 24 as block 408. The sense windings of slots 0 to 4 form a conductor group indicated in Fig. 8 as cable 410. The logical groups 402, 404, 406 and 408 similarly have their sense windings grouped in cables 412, 414, 416 and 418 respectively.

As indicated in Fig. 3 the array A and array B have common sense windings, that is, a particular core register in array A and the corresponding register in array B have a single sense winding which links all of the cores of both of those registers. The conductors of cable 410 are connected to a five stage shift register 420 and the conductors of cables 412, 414, 416 and 418 are respectively connected to five stage shift registers 422, 424, 426 and 428. The five stage shift registers are preferably of the magnetic core type and are such that each stage has its individual input winding connected to its associated conductor from the array so that the 5 bits read from the array are stored in that shift register. Subsequent to the time that one column of an array is read out and prior to the time that the next column of the array is read out, each of the five stage shift registers 420, 422, 424, 426 and 428 receives five pulses on the conductor 176 labeled Shift Output Shift Register. The output winding of the last stage of shift register 420 is applied by way of a conductor 430 to a gate 432 and each of the other five stage registers are similarly connected to their respective gates 434, 436, 438 and 440. Each of these gates receives an OD—3—13 pulse to cause a .1 microsecond pulse to be applied to their respective gates 442, 444, 446, 448 and 450 provided that the signal received by that gate from its associated five stage shift register is representative of a binary one.

Gates 442, 444, 446, 448 and 450 will pass the pulses received provided that they are conditioned by a Completed Message Control circuit 460. The Completed Message Control Circuit 460 is so constructed that it will cause each of the gates 442, 444, 446, 448 and 450 to be conditioned provided that the particular gate has its corresponding five registers of the array filled at the time of read-out, that is, the message must have a total of five words or else the particular gate to which those message signals are applied will not be conditioned. The details of the Completed Message Control Circuit 460 and a more detailed description of its operation will be made subsequently.

The outputs of gates 442, 444, 446, 448 and 450 are respectively applied to transmission channels 462, 464, 466, 468 and 470. Each of those transmission channels receives another input from the conductor 124 (Timing) as well as still another input from the conductor 216 (Sync.).

Pulses on the conductors 124 and 216 are produced by the Section 2 Control 84 and the timing relationship of those pulses and data pulses will now be described making reference particularly to Figs. 4a and 4b, and Fig. 9. As noted previously, OD—3—13 pulses (Timing) are .1 $\mu$sec. pulses which occur at a 1300 p.p.s. rate. This succession of timing pulses is shown in Fig. 9 by the waveform labeled Timing.

Assuming for the purpose of this description that the fifth stage of the 5 counter is in its binary One state and the 19th stage of the 19 counter is in its binary One state, an OD—2—13 pulse followed by an OD—3—13 pulse causes a shift of the 5 counter from stage 5 to stage 1. This is shown in Fig. 9 by the pulse labeled "5 to 1" on the waveform labeled Shift 5 counter. This OD—3—13 pulse is coincident in time with the timing pulse labeled TTP—1 (Transmission Timing Pulse) and at this time the 19 counter is shifted as shown in Fig. 9 by the pulse labeled "19 counter equals 19" on the waveform labeled Shift 19 Counter. This shift pulse applied to the 19 counter is sufficiently long to clear the 19 counter and since the 19 counter is equal to 19, the pulse passed by the gate 208 (Fig. 4b) causes a long shift pulse being applied to the 5 counter. This is shown in Fig. 9 by a pulse labeled Clear on the waveform labeled Shift 5 counter. The pulse passed by gate 208 (Fig. 4b) also causes the Sync. Control Flip-flop 212 (Fig. 4b) to be turned on so that at the next OD—3—13 time, a pulse will be delivered to the conductor 216 (Sync.) and this pulse will be coincident with the Timing pulse labeled TTP—2 in Fig. 9.

Since the 5 counter is primed at its fourth stage, the binary One state will be transferred from the fourth stage to the 5th stage at the time of TTP—2 as indicated in Fig. 9. At the next following cycle (when TTP—3 is produced) the 5 counter transfers from stage 5 to stage 1, thereby initiating the shift of the 19 counter from stage 1 to stage 2. This shifting of the 19 counter initiates the reset operation of the cores in Column 1 of an array selected by the flip-flop 166 (Fig. 4b).

The information read from the column 1 cores (resulting from the reset operation) is delivered to the Output Shift Registers 420, 422, 424, 426 and 428 (Fig. 3). When the 19 counter transfers from Stage 1 to Stage 2, the output shift register control flip-flop 168 is turned on as indicated in Fig. 9 by the waveform correspondingly labeled.

As long as this flip-flop 168 is on, shift pulses (beginning at OD—2—13 and ceasing at OD—3—13) are applied to the output shift registers 420, 422, 424, 426 and 428. The first of these shift pulses is coincident with the shift pulse applied to the 5 counter to cause a transfer from stage 1 to stage 2 of that counter.

Assuming that word 1 of the five word message is stored in array B register having the address 0, word 2 in the register having address 1, etc. so that word 5 is in the register having address 4, then when column 1 of that array is read out, words 1 through 5 have their sign bits read out simultaneously and stored in the 5 stage shift register 420. The first shift of that register results in the sign bit of word 1 being delivered to the transmission channel 462, the second shift delivers the sign bit of word 2, and so on.

As shown in Fig. 9, the first data bit of a message occurs coincident in time with timing pulse labeled TTP—4. Since this data bit as well as subsequent data bits may be represented by a pulse (binary One) or no pulse (binary Zero) they are shown as dotted pulses in Fig. 9.

As describd in detail with respect to Fig. 4a, the 5 counter is stepped five times before the 19 counter is stepped once. Furthermore, shift pulses are delivered to the conductor 176 (Shift output shift register) at a 1300 cycle rate during the time interval that the 19 counter is equal to 1 and the 19 counter is equal to 18.

Since the output shift register is shifted beginning at OD—2—13 time and ending with OD—3—13 time, the fifth shift pulse (causing the sign bit of word 5 to be delivered to the transmission channel) ceases at the time that column 2 of the array receives its reset pulse. This reset pulse in column 2 of the array causes bit 1 of each of the five words to be delivered to the output shift register 420 and the read out of those bits to the transmission channel begins at the next timing pulse TTP—9.

The last 5 bits of the message which are transmitted are the parity bits of the 5 words. Noise in a transmission channel (which may cancel or add data pulses) will normally not extend for a time period greater than the time period of 3 or possibly 4 of the data pulses. If noise cancelled or added 2 or 4 data pulses of the same word, then a single parity bit for that word would not detect the error. Since successive data pulses of a word which is checked by a single parity bit are spaced by a period of 5 timing pulses, the probability of a noise cancelling or adding an even number of those data pulses is substantially eliminated.

The manner in which the parity of the words is checked by the receiving computer will be described in detail subsequently.

*Drum word error detection and control*

As thus far described, it has been assumed that each word read from the drum has been accepted and delivered through the output system to the transmission channel. In a preferred embodiment of this invention, there are many conditions which must be met before a word read from the drum is delivered to a transmission channel.

As previously mentioned, when a binary One signal is read from the OD Status Channel 34, the read head 36 delivers this signal to the OD Read Status Control Circuit 38 which, in response to this signal delivers a pulse to the conductor 40. A pulse on the conductor 40 samples the read circuits 42 causing the drum word to be delivered to the Drum Word Register 44 for storage therein. This pulse on conductor 40 occurs at OD—1 time and if the OD Read Status Control Circuit 38 does not receive a pulse on a conductor 500 labeled No Compare, it will write a binary Zero signal in a CD Status Channel 502 indicating that the drum register is now empty.

A pulse should be delivered to the conductor 500 by the Array Read in Control 254 if the drum word read is a "good" word but is not accepted for transmission because its burst number does not compare with the contents of a burst counter. A "good" word is defined as a word which (1) has the proper parity, (2) it has a section selection code (bits Left sign through Left 2) which identifies either section 1, section 2, or section 3, (3) it has an address code identifying a register which actually exists in the specified section, and (4) it is not a missed word, that is, a word which should have already been accepted.

*Wrong section*

In the illustrated preferred embodiment, three output sections are provided as above described; however, in order to specify one of those three by a binary code, 3 bits (Left sign through Left 2) have been provided. Since 3 binary bits may actually select one out of eight, the Section decoder 70 (Fig. 3) is provided with 8 output conductors.

Referring again to Figs. *5a* and *5b*, the conductor made positive by the binary code 001 is applied to the AND circuit 284, the conductor made positive by the binary code 010 is applied to AND circuits 268, 270, and the conductor made positive by the binary code 100 is applied to AND circuit 286 as previously described.

The remaining 5 conductors of cable 72 (each of which is made positive by a code identifying a non-existent section) are applied to an OR circuit 510 whose output (labeled Wrong section) is applied to an OR circuit 512.

The OR circuit 512 has two other input conductors, one labeled Address Too High and the other labeled Missed Word.

*Address too high*

As previously mentioned, the bits Left 3 through Left 7 identify the address of the register in the array into which the data bits of the drum word are to be stored. Since there are 5 bits, this code can actually select one out of 32. In the illustrated preferred embodiment, the Section 1 array has 26 registers (addresses 0 through 25) whereas the array A and array B of section 2 as well as the section 3 array each have 25 registers (addresses 0 through 24).

The conductor of cable 72 which is labeled Select Section 1 is applied to one input of a 5 input AND circuit 514. The previously mentioned conductors of cable 82 (conductors from the Address Decoder labeled Address Too High) are applied to the AND circuit 514 and to an OR circuit 516 whose output is applied to the AND circuit 514. If the bit Left 3 of the drum word is a binary One, then the conductor labeled L3 is positive; if bit Left 4 of the drum word is a binary One, then the conductor labeled L4 is positive, etc. If bit Left 3, bit Left 4 and bit Left 6 are binary Ones, then the address specified by the drum word is a number 26 or higher if either the Left 5 bit or the Left 7 bit is also a binary One. Therefore, the conductors labeled L5, L7 are applied to the OR circuit 516, the output of which is applied to the AND circuit 514. The output of AND circuit 514 is applied through an OR circuit 518 to the previously mentioned OR circuit 512.

An AND circuit 520 will likewise produce a positive output if Section 2 is selected and the address code specifies an address number 25 or higher. If Section 3 is selected and the address code specifies an address number 25 or higher, an AND circuit 522 will produce a positive output. The outputs of AND circuits 520 and 522 are applied through the OR circuit 518 to the previously mentioned OR circuit 512.

*Missed word*

The conductor of cable 72 labeled Select Section 1 is applied to a 3 input AND circuit 524. This AND circuit 524 produces a positive output when a positive potential is received from each of the conductors labeled Select Section 1, Compare Section 1 and Not Search Section 1. As previously mentionad, the Burst Counter and Compare circuit which produces a potential on the conductor labeled Compare Section 1 and the Section 1 control which produces a potential on the conductor labeled Not Search Section 1 are not described herein since they may be identical to but operate independently of their corresponding Section 2 equipment.

An AND circuit 526 will likewise produce a positive potential output if each of the conductors labeled Select Section 2, Compare Section 2 and Not Search Section 2 is positive. An AND circuit 528 will likewise produce a positive potential output if each of the conductors labeled Select Section 3, Compare Section 3 and Not Search Section 3 is positive.

Referring back now to Fig. *4b* and Fig. 9, a pulse is produced on the conductor 171 labeled Step Burst Counter when the 19 counter equals 1. A positive potential is produced on the conductor 198 labeled Not Search between the time that the 19 counter equals 18 and the 19 counter equals 1.

Since the Burst Counter is not stepped until the Search period begins, the Burst Counter contents during a Not Search period is the same as during the preceding Search period. The Search period should be so adjusted that the period is long enough to insure that each register of the drum has been inspected to see if the drum word stored in each register has a Burst number which compares with the contents of the burst counter. If a comparison is made during the Not Search period it indicates that the Search period was too short or that some other malfunction of the equipment has taken place.

Referring back now to Fig. 5, each of the AND circuits 524, 526 and 528 will produce a positive output if their respective sections have caused a word to be missed. AND circuits 524, 526 and 528 have their outputs connected through an OR circuit 530 to the previously mentioned OR circuit 512.

Briefly summarizing the above, OR circuit 512 will produce a positive output under any of the conditions (1) the drum word has an incorrect Section code, (2) the address code identifies an address which does not exist in the Selected Section Array or (3) the drum word is a word which was missed during the preceding Search period. Conversely, OR circuit 512 will produce a negative output if none of those conditions exist. Since the output of OR circuit 512 is connected to a gate 532 through an inverter 534 that gate will be conditioned only when none of the above enumerated conditions exist.

When a drum word is accepted, that is, it is written into one of the Section Arrays, OR circuit 300 produces a positive output potential. The output of OR circuit 300 is applied to a gate circuit 536 through an inverter 538. Gate circuit 536 will therefore be conditioned only when the drum word is not accepted.

As previously mentioned with respect to the description of Fig. 3, if the parity of the drum word is correct, a pulse is produced on the conductor 60 labeled Parity OK. As shown in Fig. 5, a pulse on the conductor 60 (Parity OK) is applied to the gate 536.

If the parity of the drum word is O.K. and the drum word is not accepted, gate 536 passes the pulses to the gate 532 which in turn passes the pulse to the conductor 500 (no compare) if none of the previously enumerated error conditions exist.

*Completed message control*

As briefly indicated previously, a message read out of Section 2 Array A or Array B, is not delivered to the Transmission Channel unless it is a Completed Message, that is, the message has 5 words.

Referring back to Fig. 3, address decoder 76 causes one of the 25 conductors of a cable 80 to be made positive if the address code of the drum word specifies a number 0 through 24. The signals on the conductors of cable 80 are applied to a Completed Message Control Circuit 460.

Reference is now made to Fig. 10 which illustrates in simplified logical block form the Completed Message Control circuit shown as block 460 in Fig. 3. Each of the conductors of cable 80 is labeled in accordance with the address number which causes that conductor to be made positive. These conductors of cable 80 are applied to OR circuits 550 through 554 as shown in Fig. 10. The outputs of OR circuits 550 through 554 are connected to AND circuits 555 through 559, respectively. The address bits of a drum word will cause one of the inputs of AND circuit 555 to be made positive if the address code represents an address 0 through 4, will cause one of the inputs of AND circuit 556 to be made positive if the address code represents an address 5 through 9, and so on. The other input of the AND circuits 555 through 559 is from the One output of a flip-flop 560.

Referring back now to Fig. 5, the previously mentioned AND circuit 266 produces a positive output when each of the conductors labeled Select Section 2, Search Section 2 and Compare Section 2 is positive. The output of AND circuit 266 is applied to a gate 561 which receives pulses from the conductor 60 (Parity O.K.). Gate circuit 561 will therefore produce a pulse on its output conductor 562 (Shift Completed Message Shift Register) each time that a drum word is accepted.

Referring back now to Fig. 10, pulses on conductor 562 are applied through an OR circuit 563 to cause the flip-flop 560 to be set in its binary One state. As will be described in detail subsequently, the parity O.K. pulse (which causes a pulse on conductor 562 if the word is accepted) occurs at substantially OD—2 time. Flip-flop 560 is cleared to its binary Zero state by a pulse on the conductor labeled OD—3+0.4. The flip-flop 560 is therefore in its binary One state approximately 2.5 μsec. to cause the other input of each of the AND circuits 555 through 559 to be made positive if the word is accepted for Section 2. The outputs of AND circuits 555 through 559 are applied to the shift windings of Completed Message Shift Registers 570 through 574, respectively.

Referring back now to Figs. 4*a*, 4*b*, and Figs. 9*a* and 9*b*, each time that the 19 counter and the 5 counter are primed, this priming pulse is also applied to the conductor 140 (Prime Completed Message Shift Register). As shown in Fig. 9, this priming pulse occurs approximately 1500 μsec. before the Search period begins.

Referring again to Fig. 10, the priming pulse on conductor 140 causes the 1st stage of each of the Shift Registers 570 through 574 to be set in its binary One state. These registers are therefore primed well in advance of any shift pulses which might be received.

Each time that a drum word is accepted by Section 2 and its address bits specify an array address 0 through 4, shift register 570 will shift the binary One state to the next succeeding stage, etc. If 5 drum words have been accepted for Section 2 and those 5 words had address codes specifying addresses 0 through 4, the binary 1 state of shift register 570 will have been shifted to stage 6 of that register.

Completed message shift registers 571, 572, 573 and 574 being identical to completed message shift register 570, operate in a similar manner which will be apparent from the preceding description.

The binary One state may be shifted to the 6th stage of any one of those shift registers at any time during the Search period. As shown in Fig. 9, the search period ends when the 19 counter transfers from its 18th stage to the 19th stage.

Referring back to Fig. 4*b*, when the binary One state is shifted from the 19th stage 156 of the 19 counter, gate 208 passes an OD—4—13 pulse to the conductor 210 labeled Shift completed message shift register. When a pulse is delivered to the conductor 210, the shift control flip-flop 148 is not reset until the following OD—3 time and as a result an OD—1 pulse is delivered to the conductor 224 labeled OD—1 Special.

Referring now to Fig. 10, in response to the pulse on conductor 210, the flip-flop 560 and a single shot 580 cause AND circuits 556 through 559 to produce output pulses. Since the single shot 580 generates a pulse approximately 8 μsec. in duration and since flip-flop 560 is cleared by OD—3+0.4 pulses, the AND circuits 555 through 559 produce pulses which are approximately 8 μsec. long. These 8 μsec. pulses, being applied to the shift windings of completed message shift registers 570 through 574, cause those registers to be cleared and in the event that those registers had received five previous shifts (resulting from 5 words having been written into their corresponding registers of the Core Array), their respective gates 582 through 586 are conditioned. The OD—1 Special pulse on conductor 224 is passed by any of the gates 582 through 586 which are conditioned to cause their respective flip-flops 587 through 591 to be set in their binary One state. Flip-flops 587 through 591, when in their binary One state, cause a positive potential to be applied to their respective output conductors 592 through 596. These flip-flops are reset to their Zero states each time that the 19 counter equals 18 since under that condition a pulse is received from conductor 197.

Referring back to Fig. 3, the conductors 592 through 596, when positive, condition their respective gates 442, 444, 446, 448 and 450.

Briefly summarizing the above description of the Completed Message Control Circuit 460 of Fig. 3, each time a word of a message is written into the Section 2 Array A or Array B, the counter corresponding to that message is advanced by One. Just before the time that a given array is to be read out (when the 19 counter equals 19), the gates 442, 444, 446, 448 and 450 will be conditioned if their respective registers of the Array contain a complete message, that is, 5 words. If due to some error, more than 5 or less than 5 words were written into the registers of the array associated with one of the gates 442, 444, 446, 448 or 450, then that gate will not be conditioned and the message although read out of the Array will not be delivered to the transmission channel.

*Input system*

As previously mentioned, each of the computers of Fig. 1 receives information from another computer. In a preferred embodiment of this invention, each computer has its input system so constructed that it may receive information from any one of several transmission channels. It will be understood that a given input system may receive information from one or more transmission channels which convey information from a given output system.

Since the input system of each of the computers may be identical, only one input system will be described in detail.

Referring now to Figs. 11*a*, 11*b* and 11*c*, the transmitted Timing, Sync. and data information from a transmission channel are applied to an input channel that is indicated in Fig. 11 by a dotted line which surrounds various circuits shown in block form.

The transmitted timing, sync. and data from another transmission channel are applied to Input Channel 2 indicated in Fig. 11 as block 700. Although only two input channels are shown, it will be understood that the number of such channels is a matter of choice and will be determined by the number of transmission channels employed in the overall communications system.

Since the circuits of each input channel may be identical, a detailed description will be made only with respect to Channel 1 and general reference made to other channels when required.

*Received message decoding and synchronizing*

The timing, sync. and data signals are applied to an input Synchronizer 701. Since the data received from the transmission channel is to be temporarily stored in a buffer drum as previously mentioned with reference to Fig. 1, the input synchronizer 701 is employed to synchronize the received timing, sync. and data with drum timing. In Fig. 11, a drum 702 has signals from its index and timing channels applied to a Drum Timing Circuit 703. The drum timing pulse generator 703 may be of the type shown and described in copending patent application Serial Number 494,982 (IBM Docket 4490), entitled "Magnetic Data Storage," filed by H. K. Rising et al., on March 17, 1955.

The OD pulses produced by the Drum Timing circuit 703 are .1 μsec. pulses having a timing relationship identical to the OD pulses previously described with reference to the Output System. These OD pulses are delivered by way of the appropriately labeled conductors to a Channel 1 Control Circuit 704. In response to these OD pulses, the Channel 1 Control circuit 704 produces various timing pulses for synchronizing purposes and these pulses will be referred to hereinafter as XT (Crosstell) pulses.

Reference is now made to Fig. 12 which is a family of curves showing the timing relationship of OD and XT pulses. XT—1 pulses are .1 μsec. in duration, have a repetition rate of 20 μsec. and, when they occur, they are at OD—1 time. XT ⅔ pulses are 2.5 μsec. in duration, have a repetition rate of 20 μsec. and when they occur, they begin at OD—2 time and end at OD—3 time. XT—3 delayed pulses are .1 μsec. in duration, have a repetition rate of 20 μsec. and when they occur, they are approximately 1 μsec. after OD—3 time. XT ⅚ pulses are 2.5 μsec. in duration, have a repetition rate of 20 μsec. and when they occur, they begin at OD—1 time and end at OD—2 time. XT—6 pulses are .1 μsec. in duration, have a repetition rate of 20 μsec. and when they occur, they are at OD—2 time.

XT—1, XT ⅔ and XT—6 pulses are delivered from the Channel 1 Control Circuit 704 to the Input synchronizer 701 by way of the conductors correspondingly labeled in Fig. 11.

In response to the timing, sync., data and XT pulses, the Input synchronizer 701 produces the following pulses:

(1) In response to each Sync. pulse, a pulse is delivered to a conductor 705 (labeled Reset and prime). This pulse on conductor 705 is 12.5 μsec. in duration, beginning at XT—1 time and ending at XT—6 time.

(2) In response to each timing pulse, a pulse is delivered to a conductor 706 (labeled Shift). This pulse on conductor 706 is 2.5 μsec. in duration and is coincident in time with the pulse received on the conductor labeled XT ⅔.

(3) In response to each data pulse, a pulse is delivered to a conductor 707 (labeled Data). This data pulse on conductor 707 is 12.5 μsec. in duration, beginning at XT—1 time and ending at XT—6 time.

A sync. signal always precedes data signals and this sync. signal causes a pulse to be delivered to the conductor 705. This pulse is applied through an OR circuit 708 to the conductor 709 and is also applied to the input of the 5th stage 710 of a 5 stage shifting register. This pulse on conductor 709 causes the shift windings of each stage of the 5 stage core shift register to be energized for 12.5 μsec. which is of such duration as to clear that register. Since the pulse on conductor 705 is applied to the input of the 5th stage 710 of that register, it causes that stage to assume a binary One state at the end of that pulse, in a manner to be described in detail hereinafter. This pulse on conductor 705 is also applied to the Channel 1 Control 704.

Reference is now made to Fig. 13 which is a family of curves showing the timing relationship of the Timing, Sync. and Data pulses delivered to the Input Synchronizer shown in Fig. 11 as block 701. As shown in Fig. 13, a sync. pulse is coincident in time with some timing pulse and this timing pulse is labeled ITP—1 (Input timing pulse number 1). Neither a sync. pulse nor a data pulse will be received coincident in time with the timing pulse ITP—2; however, coincident in time with ITP—3 a data pulse labeled S1 (sign bit of word 1) may be received. Coincident in time with ITP—4 the data bit labeled S2 (sign bit of word 2) may be received, etc. Coincident in time with ITP—87 a data pulse labeled P—5 (Parity bit of word 5) may be received and this is the last data bit of a given message.

Referring back now to Fig. 11, each timing pulse received by the Input Synchronizer 701 causes an XT ⅔ pulse to be delivered to the conductor 706. Each of these pulses is applied through OR circuit 708 and the conductor 709 to the shift windings of each stage of the 5 stage shift register. As described with reference to Fig. 12, XT ⅔ pulses are 2.5 μsec. in duration and therefore in response to one of these pulses, the 5 stage shift register causes a binary One signal stored in any of its stages to be transferred to the next subsequent stage. Since the 5 stage register is connected in a ring fashion the (output of the 5th stage 710 is connected to the input of the 1st stage 711), the ITP—2 pulse (Fig. 13) causes the binary One state of stage 5 to be transferred to stage 1.

Each data pulse received by the Input Synchronizer 701 causes a pulse 12.5 μsec. in duration to be delivered to the conductor 707 labeled Data. This pulse starts at XT—1 time and ends at XT—6 time.

The binary One state transferred from the 5th stage 710 to the 1st stage 711 in response to the received ITP—2 pulse causes the 5th stage to deliver a pulse to a conductor 712. This pulse on conductor 712 is suitably translated by a level setter stage 713 and delivered by way of a conductor 714 to condition one leg of a two input AND circuit 715. Since, as mentioned with reference to Fig. 13, no data pulse is received coincident in time with the ITP—2 pulse, the other input (conductor 707) of AND circuit 715 is not conditioned at this time and therefore that AND circuit produces no output. The pulse on conductor 714 is also delivered to the channel 1 control circuit 704 for reasons to be described subsequently.

Upon receipt of timing pulse ITP—3 (Fig. 13), the Input Synchronizer 701 (Fig. 11) delivers an XT ⅔ pulse to the conductor 706 which through OR circuit 708 and conductor 709 causes the binary One state to be transferred from the 1st stage 711 to the 2nd stage 716 of the 5 stage shift register. When the binary One state is transferred from the 1st stage 711, a pulse is delivered by way of a conductor 717 to a level setter 718 where this pulse is suitably translated and the pulse is delivered through a conductor 719 to one input of a two input AND circuit 720.

If the sign bit of word 1 is a binary One, then the Input Synchronizer 701 would receive a data pulse coincident in time with the ITP—3 pulse as shown in Fig. 13. This data pulse would result in the Input Synchronizer 701 delivering a pulse 12.5 μsec. in duration to the conductor 707 (Data). Therefore, if the sign bit of word 1 is a binary One, both inputs of AND circuit 720 will receive a pulse thereby producing a pulse on its output conductor 721. This pulse on conductor 721 is applied to the channel 1 control 704 for purposes to be described in detail hereinafter and is also applied to the input of a 7 stage shift register 722 to cause a binary One to be stored in the first stage thereof. If the Sign bit of word 1 is a binary Zero (no pulse on data input), then the AND circuit 720 will not receive a pulse on its input conductor 707 and therefore will not cause a binary One to be stored in the 1st stage of the 7 stage shift register 722.

The next input timing pulse (ITP—4 of Fig. 13) causes the binary One state to be transferred from the 2nd stage 716 to the 3rd stage 723. In a manner identical to that described with respect to the 1st stage of the 5 stage shift register, the binary One state transferred from stage 716 causes one input of an AND circuit 724 to receive a pulse. If the Sign bit of word 2 is a binary One, then a pulse will be received on the conductor labeled Data which is coincident with the ITP—4 timing pulse. Under this condition, AND circuit 724 will receive a pulse at both of its inputs and delivers a pulse to a conductor 725 thereby causing a binary One to be stored in a 7 stage shift register 726. If the sign bit of word 2 is a binary Zero, no pulse will be received by AND circuit 724 on its input conductor 707 (Data) and therefore no binary One will be stored in the 1st stage of the 7 stage shift register 726.

In like manner to the 1st and 2nd stages, the 3rd stage 723, a 4th stage 727 and the 5th stage 710 of the 5 stage shift register cause their respective AND circuits 728, 729 and 715 to receive a pulse when the binary One is transferred from those stages. Also, in like manner to the AND circuits 720 and 724, the AND circuits 728, 729 and 715 cause a pulse to be delivered to their respective output conductors 730, 731 and 732 resulting in a binary One being stored in the 1st stage of their respectively associated 7 stage shift registers 733, 734 and 735 if those AND circuits receive a data pulse coincident in time with the pulse applied to their other input.

Briefly summarizing the above operation, the Sign bits of words 1 through 5 which are received serially in time on the data input are distributed by AND circuits 720, 724, 728, 729 and 715 such that the sign bits of those words are stored in the 1st stage of the 7 stage shift registers 722, 726, 733, 734 and 735, respectively.

Before proceeding further with the description of Figs. *11a* through *11c*, a description of the Channel 1 Control 704 will be made.

*Channel 1 control*

Reference is now made by Figs. *14a* through *14c* which, when arranged side by side in the order of their figure numbers, illustrate in logical block form the Channel 1 Control shown as block 704 in Fig. *11a*.

Pulses on the conductor labeled OD—3 are applied to the complement or binary input of a flip-flop 740, thereby causing its One output to be positive in response to alternate OD—3 pulses and the Zero output to be positive in response to the other OD—3 pulses. When flip-flop 740 has a positive potential produced at its One output, gates 741, 742 and 743 are each conditioned to pass OD—1, OD—2 and OD—3 pulses, respectively. Gate 741 therefore passes alternate OD—1 pulses and these pulses appear on the conductor labeled XT—1. Gates 742 and 743 likewise pass alternate OD—2 and OD—3 pulses respectively and their output pulses appear on conductors labeled XT—2 and XT—3, respectively.

Pulses on the conductor labeled XT—3 are applied to the One input of a flip-flop 744 and are also delivered through a suitable delay unit 745 to a conductor labeled XT—3 delayed. Pulses on the conductor labeled XT—2 are applied to the Zero input of the flip-flop 744 and therefore the One output of that flip-flop (labeled XT ⅔) is positive from XT—2 time to XT—3 time.

When the Zero output of flip-flop 740 is positive, a gate 746 and a gate 747 are each conditioned to pass OD—1 and OD—2 pulses respectively. In this way, the OD—1 pulses and OD—2 pulses which are not passed by gates 741 and 742, respectively, are passed by gates 746 and 747, respectively. Pulses passed by gate 746 are delivered by way of a conductor labeled XT—5 to the One input of a flip-flop 748 whereas pulses passed by gate 747 are delivered by way of a conductor labeled XT—6 to the Zero input of the flip-flop 748. In this way, the One output of flip-flop 748 (labeled XT—⅚) is made positive from XT—5 to XT—6 time.

As previously mentioned with reference to Figs. *11a* through *11c* and Fig. 12, XT—1, XT—⅔ and XT—6 pulses are delivered to the Input Synchronizer for synchronizing purposes. When a Sync. pulse is received by the Input Synchronizer 701 (Fig. *11a*), a pulse beginning at XT—1 time and ending at XT—6 time is delivered to the conductor 705 (labeled Reset and prime), as previously mentioned. Besides being delivered to the 5 stage shift register of Fig. *11a*, as previously mentioned, this pulse is also delivered, by way of the correspondingly labeled conductor in Figs. *14a* and *14b*, to the input of the 1st stage 750 of a 25 stage shift register and through an OR circuit 751 to the shift windings of each stage of the 25 stage shift register.

This 12.5 μsec. pulse on the conductor 705 (labeled Reset and prime) therefore causes the 25 stage shift register to be cleared (by virtue of the relatively long pulse on the shift windings) and also causes the 1st stage of the 25 stage shift register to assume a binary One state at the completion of this pulse (by virtue of the pulse being applied to the input of the first stage).

As previously mentioned with refeernce to Fig. *11a*, the 5 stage shift register is primed by setting its 5th stage to the binary One state in response to the received Sync. pulse. The 1st received timing pulse following the sync. pulse (ITP—2 in Fig. 13) causes the binary One state to be transferred from stage 5 to stage 1 of the 5 stage shift register and therefore a pulse is delivered by way of conductor 712 and level setter 713 to the conductor 714.

As shown in Fig. *14a*, the conductor 714 is applied through an OR circuit 752 to the conditioning input of a gate 753. Since the 5 stage shift register of Fig. *11a* is shifted by XT—⅔ pulses, its positive pulse output applied to conductor 714 will be at its maximum positive value approximately 1 μsec. after XT—3 time and therefore gate 753 is sampled by the pulses on the conductor labeled XT—3 delayed.

A pulse passed by gate 753 causes a flip-flop 754 to be set in its One state and that flip-flop is returned to its Zero state by pulses on the conductor labeled XT—6. The One output of flip-flop 754 is applied to one input of a two input AND circuit 755. The other input of AND circuit 755 is the conductor labeled XT—⅚. It will therefore be seen that as a result of the input timing pulse (ITP—2 of Fig. 13), the AND circuit 755 delivers a 2.5 μsec. pulse to its output conductor 756 (labeled Shift 7 stage shift register). This 2.5 μsec. pulse is applied to the shift windings of all stages of each of the 7 stage shift registers 722, 726, 733, 734 and 735 (Fig. *11a*) to cause any binary One states of the stages of those registers to be transferred to the next stage, thereby insuring that the 1st stage of each of those registers is in its binary Zero state at the end of the shift pulse. From the subsequent rescription it will be evident that this shifting of the 7 stage shift registers in response to the input timing pulse following sync. has the effect of clearing those registers to receive new information even though they may contain information at that time.

The output of AND circuit 755 besides being delivered to the 7 stage shift registers is also delivered through the OR circuit 751 to the shift windings of all stages of the 25 stage shift register. The binary One state stored in the 1st stage 750 of the 25 stage shift register as a result of the sync. pulse is therefore transferred to the 2nd stage of that register in response to the input timing pulse following the sync. pulse (ITP—2 in Fig. 13).

When the Sign bits of words 1 through 5 are stored in the 1st stages of the 7 stage shift registers 722, 726, 733, 734 and 735 (Fig. 11*a*), the pulse produced by the 5th stage 710 of the 5 stage shift register is delivered by way of the conductor 714 to the gate 753 (Fig. 14*a*) through the OR circuit 752 and as a result, the 7 stage shift registers are again shifted (transferring the sign bits of words 1 through 5 to the 2nd stages of those registers) and the 25 stage shift register is again shifted (transferring the binary One state from stage 2 to stage 3).

The operation of causing the bit 1 of words 1 through 5 to be stored in the 1st stages of the 7 stage shift registers is identical to that described with respect to the sign bits. When bit 1 of word 5 is stored in the 1st stage shift register 735, the channel 1 control again causes all of the 7 stage shift registers to be shifted (sign bits to the 3rd stages and the bit 1's to the 2nd stages) and also causes the 25 stage shift register to be shifted (transferring the binary One state from stage 3 to stage 4).

The operations of causing the bits 2 through 5 to be stored in the 7 stage shift registers are a repetition of the operations described with reference to the sign bits and bits 1. When bit 5 of word 5 is stored in the 1st stage of the 7 stage shift register 735, the channel 1 control again causes all of the 7 stage shift registers to be shifted (sign bits to the 6th stage, bit 1's to the 5th stage, etc.) and also causes the 25 stage shift register to be shifted.

Referring again to Figs. 14*a* and 14*b*, this shift of the 25 stage shift register causes the binary One state to be transferred from the 7th stage 757 to the 8th stage. When the binary One state is thus transferred, a gate 758 is conditioned to pass an XT—6 pulse to set a flip-flop 759 in its One state. When in the binary One state, flip-flop 759 conditions one input of a two input AND circuit 760. Any subsequent shift pulses applied to the conductor 756 (labeled shift 7 stage shift register) will therefore be passed by AND circuit 760 to a conductor 761 (labeled shift 17 stage shift registers).

Referring back again to Fig. 11*a*, pulses on the conductor 761 are applied through OR circuits 762 through 766 to the shift windings of all stages of their respective 17 stage shift registers 767 through 771.

When bit 6 of words 1 through 5 have been stored in the 1st stages of the 7 stage shift registers, those registers are again shifted (transferring the sign bits to the 7th stages), the binary One state of the 25 stage shift register is transferred from stage 8 to stage 9 and also each of the 17 stage shift registers is shifted. This operation of starting to shift the 17 stage shift registers in synchronism with the 7 stage shift registers when the sign bits are transferred to the 7th stage has the effect of clearing the 17 stage shift registers in the same manner as that described with respect to the 7 stage shift registers.

*Received message parity checking*

If a given bit of word 1 is a binary One, then AND circuit 720 delivers a pulse by way of conductor 721 to the input of the 1st stage of the 7 stage shift register 722. In the same manner, word 2 through word 5 bits which are binary Ones appear as pulses on their respective conductors 725, 730, 731 and 732.

Referring again to Figs. 14*a* through 14*c*, positive pulses (representative of binary Ones) on the conductors 721, 725, 730, 731 and 732 cause their respective gates 775 through 779 to be conditioned. The gates 775 through 779, when conditioned, pass XT—3 delayed pulses to the complement input of their respective flip-flops 780 through 784. Each of these flip-flops is cleared to its binary Zero state in response to the input Sync. pulses.

Each binary One in Word 1 will cause flip-flop 780 to change its existing binary state. Each binary One in words 2 through 5 will cause their respective flip-flops 781 through 784 to change their existing binary state. If any of the Words 1 through 5 have an odd total number of binary Ones, then one or more of the flip-flops 780 through 784 will be in its binary One state at the time that the complete message has been received.

The binary One output of each of the flip-flops 780 through 784 is applied through an OR circuit 785 to condition a gate 786 when positive. In a manner to be described subsequently, this gate is sampled by a pulse which occurs after a complete message has been received and the pulse passed by this gate is used to actuate a suitable alarm and also to effect control operations.

*Received message address checking*

Pulses passed by gate 778, besides causing flip-flop 783 to be complemented as above described, are applied to a gate 787 which is conditioned by the One output of a flip-flop 788.

When the bit 10 of words 1 through 5 is transferred from the 1st stages to the 2nd stages of the 7 stage shift registers, the binary One state is transferred from the 12th stage 790 of the 25 stage shift register (Fig. 14*b*). This transfer from the 12th stage 790 causes a gate 791 to be conditioned to pass an XT—6 pulse. Pulses passed by gate 791 are applied to the One input of flip-flop 788 and are also applied through an OR circuit 792 to the One input of a flip-flop 793 provided that a manual switch 794 is closed.

Since the flip-flop 788 is set in its One state just after the bit 10 of word 4 is applied to the gate 787 (if bit 10 of word 4 is a binary One, a pulse is passed by gate 778 to gate 787 and if a binary Zero, no pulse is passed), the flip-flop 788 conditions a gate 787 to pass bit 11 and subsequent bits of word 4.

In a preferred embodiment of this invention, bits 11 through 15 of word 4 are called "address bits." If a particular message is transmitted by way of a given transmission channel to several computer locations, and it is desired that only one of those computers accept the message, a binary code is placed in bits 11 through 14. This 4 bit binary code will be checked by each computer input system that receives the message and only that computer which has been "pre-wired" to that same code will accept the message. If it is desired that all computers that receive a message accept that message, then a binary One is placed in bit 15 of word 4 and the presence of this binary One will cause the message to be accepted.

The previously mentioned manual switch 794 as well as manual switches 795 through 797 are provided as a means of "pre-wiring" an input system to accept only messages having a predetermined code. Assuming for the moment that channel 1 of Fig. 11*a* is to accept only those messages having the binary code 1011 in bits 11 through 14, then switches 794, 796 and 797 will be closed and switch 795 will be left open.

Under this assumed example just before bit 11 of word 4 is received (when the binary One state is transferred from the 12th stage 790 of the 25 stage shift register) flip-flop 788 as well as flip-flop 793 will be set in their binary One states. If bit 11 of word 4 as received is a binary One, then flip-flop 793 will be complemented to its Zero state by the pulse passed by gates 778 and 787. Just before the bit 12 of word 4 is received, the binary One state is transferred from the 13th stage 800 to the 14th stage 801 of the 25 stage shift register. This transfer causes a gate 802 to pass an XT—6 pulse through an OR circuit 803 to sample a gate 804. Under the assumed example that the 4 bit address code should have a binary Zero in bit 12 of word 4, switch 795 is open so that the pulse passed by gate 802 will not set flip-flop 793 in its binary One state.

Flip-flop 793 has its One output connected to condition the gate 804 when positive. If the bit 11 of word 4 as received is a One, then the pulse from gate 802 will not be passed by gate 804 since the flip-flop 793 will be in its Zero state when that pulse occurs. However, if the bit 11 of the received word 4 is a Zero (no pulse) then the flip-flop 793 would not have been complemented and would be in its One state when the pulse from gate 802 arrives at gate 804. A pulse passed by gate 804 to its output conductor 805 is delivered through an OR circuit 806 and a conductor 807 (labeled Wrong parity or address) to the Zero input of a flip-flop 808. The output of the previously noted gate 786 is also applied through the OR circuit 806 and the conductor 807 to the Zero input of the flip-flop 808.

Bits 12, 13 and 14 of word 4 are checked for proper address code in the same manner as that described with reference to the bit 11. The 14th stage 801 and 15th stage 809 of the 25 stage shift register together with their respectively associated gates 810 and 811 operate in like fashion to the 13th stage 800 and its associated gate 802. Before bit 15 of word 4 is received, the binary One state is transferred from the 16th stage 812 to the 17th stage of the 25 stage shift register thereby conditioning a gate 813 to pass an XT-6 pulse. A pulse passed by gate 813 is delivered through OR circuit 803 to sample the gate 804 and also sets the flip-flop 788 to its Zero state. This pulse from gate 813 therefore checks for comparison of bit 14 of the received word 4 with the code of switch 797 and also turns flip-flop 788 off so that no further pulses will be passed by gate 787. It should be noted that a sync. bit which precedes a message will cause flip-flop 793 to be set in its Zero state.

From the above description it will be seen that if any one of the bits 11 through 14 of word 4 fails to compare with the code established by switches 794 through 797, a pulse will be delivered by way of conductor 805, OR circuit 806 and conductor 807 to cause flip-flop 808 to be set in its Zero state. Flip-flop 808 is set in its One state by the pulse passed by gate 758 which is conditioned when the binary One state is transferred from stage 7 of the 25 stage shift register.

*Fast shift operation*

After the last bits (the parity bits) of words 1 through 5 have been stored in the 1st stages of the 7 stage shift registers, the binary One state of the 25 stage shift register is transferred from the 18th stage 814 to stage 19 as those parity bits are transferred from stage 1 to stage 2 of the 7 stage shift registers.

At this instant, the sign bits and bits 1 through 10 are now stored in stages 1 through 11 of the 17 stage shift registers and bits 11 through 15 and the parity bits are stored in stages 2 through 7 of the 7 stage shift registers. The transfer of the binary One state from the 18th stage 814 to stage 19 of the 25 stage shift register conditions a gate 815 to pass an XT—6 pulse by way of a conductor 816 to set a flip-flop 817 in its binary One state. When in the binary One state, flip-flop 817, through OR circuit 752 conditions gate 753 to pass XT—3 delayed pulses to the One input of flip-flop 754. Flip-flop 817 therefore controls what is termed "fast shift" operation, that is, when that flip-flop is in its One state, AND circuit 755 will pass each XT—5/6 pulse which will shift all of the 7 stage shift registers, all of the 17 stage shift registers and the 25 stage shift registers at a 20 μsec. rate since there is 20 μsec. between XT—5/6 pulses.

When the 15th bits of words 1 through 5 are transferred from the 7th stage of the 7 stage shift registers, bit 15 of word 4 on conductor **818*a*** (Figs. 11*a* and 14*c*) will cause a gate **818*b* to be conditioned if bit 15 of word 4 is a One. At this same time the binary One state is transferred from the 23rd stage 819 to the 24th stage 820 thereby causing a gate 821 to be conditioned to pass an XT—6 pulse which will in turn be passed by gate 818*b*** if bit 15 of word 4 is a binary One.

The pulses passed by gate **818*b* and pulses passed by gate 757** (stage 7 of the 25 stage shift register in Fig. 14*b*) are delivered through an OR circuit 822 to cause flip-flop 808 to be set in its binary One state.

When the parity bits of words 1 through 5 have been transferred from the 7th stages of the 7 stage shift registers to the 1st stages of the 17 stage shift registers, the binary One state is transferred from the 24th stage 820 to the 25th stage of the 25 stage shift register. This transfer causes a gate 825 to be conditioned to pass an XT—6 pulse by way of a conductor 826 to set the flip-flop 759 in its Zero state thereby preventing further shift pulses from being delivered to conductor 761 (labeled shift 17 stage shift register).

The next fast shift pulse causes the binary One state to be transferred from the 25th stage 827 resulting in a gate 828 being conditioned to pass an XT—6 pulse. This pulse is delivered by way of a conductor 829 to each of three circuits. It is delivered to the flip-flop 817 (Fig. 14*a*) to cause that flip-flop to be set in its Zero state thereby stopping the "fast shift" operation. It is further delivered to the gate 786 to be passed thereby if there has been a parity error. It is further delivered to a flip-flop 830 to cause that flip-flop to be set in its binary One state.

If a parity error was detected (gate 786 being conditioned after the complete message has been received) the pulse from gate 828 will be passed by that gate 786 to actuate a suitable alarm and is also delivered by way of OR circuit 806 to the Zero input of flip-flop 808.

Briefly reviewing what has been said with reference to flip-flop 808, it is set to its One state when the binary One is transferred from stage 7 of the 25 stage shift register, it is set in the binary Zero state if there is a wrong address code received, it is set in the binary One state if a binary One is in bit 15 of word 4 (all stations code) and it is set in the binary Zero state if there has been a parity error.

If, after the binary One state has been transferred from the 25th stage of the 25 stage shift register, the flip-flop 808 is in its binary One state, it indicates that the words in the 17 stage shift registers are accepted for delivery to the computer.

*Transfer from core storage to drum storage*

The words of the received message having been reconstituted from the interleaved signals received from the transmission channel as above described, are delivered to the computer through a drum system having a type of operation known as "Status."

Referring now to Fig. 15, the 5 received words are rearranged and certain other digital information is added so that the message, as delivered for storage on the drum, is a 3 word message each word having 33 bits. The first drum word, in bit positions Left sign (LS) through left 15 (L15) contains the corresponding bits of the received word 1. Bit positions Right sign (RS) and Right 1 (R1) through Right 5 (R5) are not used in drum word 1. Bit positions Right 6 (R6) through Right 10 (R10) of drum word 1 are used to indicate the time at which the received message is delivered to the drum and these bits will be referred to as a "time tag." Bit positions Right 11 (R11) through Right 15 (R15) of drum word 1 are used to identify where the message originated and will therefore be referred to as a "site identity tag." The 33rd bit called parity bit (P) is either a One or a Zero dependent upon the number of binary Ones in the remaining bits (LS) through (R15) of word 1. The circuits, as will subsequently be described, are so constructed that the number of binary Ones in any drum word including its parity bit is an odd number.

The drum word 2 of a message, as shown in Fig. 15, has in its bit positions Left sign through Left 15 the correspondingly designated bits of the received word 3 and has in its bit positions Right sign through Right 15, the correspondingly designated bits of the received word 2. The parity bit of drum word 2, like the parity bit of drum word 1, is an "odd" parity bit.

The third drum word of a message contains the received fifth word in its left half word and the received fourth word in its right half word and an "odd" parity bit in the manner shown in Fig. 15.

Referring back now to Figs. 11*a* through 11*c* and more particularly to Fig. 11*b*, the drum 702 is provided with a CD Status Channel, an OD Status channel and a Marker channel. The combined purpose of those channels is to provide a means whereby if a message is available to be written on the drum, it will be stored in successive registers on the drum which are "empty," that is, registers which do not contain useful information. Those channels also provide a means whereby the computer may read from the drum only those drum registers which are "full," that is, registers which contain useful information.

For the purpose of this discussion, a "slot" on the drum is defined as 3 successive registers. In order to mark the drum in such a way as to detect the first register of a "slot," the marker channel has recorded therein, in any suitable way, a binary Zero in a position corresponding to every third drum register, and binary Ones in positions corresponding to all other registers. The OD Status Channel and the CD Status Channel have the same significance as described in the previously mentioned copending application Serial Number 494,982, that is, a binary One in those channels indicates that the drum register corresponding to that signal is "full" whereas a binary Zero indicates that the drum register corresponding to that signal is "empty."

A Write Status Circuit 850 receives signals read from the OD Status Channel and the Marker Status channel. When the signals from those channels indicate that the next register of the drum which may be written into is empty and that this register is the first register of a "slot," the Write Status Circuit 850 delivers a pulse by way of a conductor 851 (labeled Drum demand) to the Channel 1 Control Circuit 704.

*Core storage read-out pulse generation*

Referring back now to Figs. 14*a* through 14*c* and more particularly to Fig. 14*c*, a pulse on conductor 851 (labeled Drum demand) is applied to a gate 852, a gate 853 and also is applied to the Zero input of the flip-flop 830. If, as previously described, the 25 stage shift register has transferred the binary One state from the 25th stage 827, an XT-6 pulse is applied through gate 828 and conductor 829 to the One input of the flip-flop 830.

Under these conditions, flip-flop 830 will be in its One state, causing the gate 852 to be conditioned, when a pulse is received on conductor 851. A pulse passed by gate 852 causes a flip-flop 854 to be set in its One state. As will be described in detail in a subsequent description of the Write Status Circuit, the drum demand pulse on conductor 851 occurs at approximately OD—3 time. The flip-flop 854 is cleared to its Zero state by an OD—1 pulse suitably delayed by a delay unit 855. The delay unit 855 provides the necessary timing relationship to cause the flip-flop 854 to remain in its One state for approximately 6 $\mu$sec. thereby producing a positive pulse on its One output conductor 856 under the above recited conditions. A positive potential on conductor 856 is delivered through an OR circuit 857 to cause a gate 858 to be conditioned and also one input of an AND circuit 859 to be conditioned. When conditioned in this manner, gate 858 passes an OD—4 pulse to the complement input of a flip-flop 860 and also samples a gate 861. The flip-flop 860 as well as another flip-flop 862 are initially set in their Zero states automatically after the equipment has been placed in operation as will be apparent from the subsequent description. Since the flip-flop 860 is initially in its Zero state, the gate 861 will not be conditioned to pass this first pulse passed by gate 858. This first pulse passed by gate 858 will, however, cause the flip-flop 860 to be complemented to its One state. When in its One state, flip-flop 860 produces a positive potential on its One output conductor 863 which is connected to an input of the OR circuit 857, the conditioning input of gate 861 and also to one input of each of two AND circuits 864 and 865. The other input of AND circuit 865 is the Zero output of flip-flop 862 and therefore this AND circuit produces a positive potential on its output conductor 866 in response to the first pulse passed by gate 858. Although the One output of flip-flop 854 is positive only long enough to condition gate 858 to pass one OD—4 pulse, subsequent pulses will be passed by gate 858 because the One output of flip-flops 860 and 862 are applied through OR circuit 857 to the conditioning input of gate 858.

When the first pulse passed by gate 858 causes AND circuit 865 to produce a positive output, the One output of flip-flop 860 conditions gate 858 to pass a second OD—4 pulse. This second OD—4 pulse complements flip-flop 860 to its Zero state and is also passed by gate 861 to complement flip-flop 862 to its One state. AND circuit 865 will therefore cease to produce a positive output; however, it should be noted that it did produce a positive output for approximately 10 $\mu$sec. (the time from one OD—4 pulse to the next). When in the One state, flip-flop 862 produces a positive potential on its One output conductor 867 which is applied to one input of each of two AND circuits 868 and 869 and also through OR circuit 857 to the conditioning input of gate 858. Since the other input of AND circuit 868 is the Zero output of flip-flop 860, AND circuit 868 produces a positive potential on its output conductor 870 in response to the second pulse passed by gate 858.

The other input of AND circuit 869 is from a suitable source of constant +10 volts and therefore it attempts to produce a positive potential on its output conductor; however, due to capacitor 872 this positive potential is slightly delayed. The purpose of this delay is to prevent AND circuit 864 from producing a positive potential on its output conductor 873 when flip-flop 860 is in transition from its One state to its Zero state and flip-flop 862 is in transition from its Zero state to its One state. During this transition period AND circuit 864 could conceivably produce a positive output for a brief interval and therefore the capacitor 872 is employed to delay the positive potential from the One output of flip-flop 862 and thereby prevent the undesired output of AND circuit 864. Gate 858, being conditioned by the One output of flip-flop 862, passes the third OD—4 pulse which causes flip-flop 860 to be complemented to its One state and under this condition of both flip-flops 860 and 862 being in the binary One state, AND circuit 864 produces a positive potential on its output conductor 864. Since flip-flop 860 is no longer in its Zero state, AND circuit 868 ceases to produce a positive output potential. The positive output from AND circuit 868, however, is approximately 10 $\mu$sec. as was the output of AND circuit 865. Since both flip-flops 860 and 862 are in their binary One state, gate 858 is conditioned to pass the fourth OD—4 pulse which complements both of those flip-flops to their Zero state. Under this condition the positive output of AND circuit 864 ceases (having been positive for approximately 10 $\mu$sec.) and the gate 858 is no longer conditioned to pass any further OD—4 pulses.

Briefly reviewing the operation as above described, when the 25 stage shift register produces an output from its 25th stage, the next received drum demand pulse on conductor 851 initiates what is termed a read-out operation, that is, conductor 866 receives a positive 10 $\mu$sec. pulse beginning at OD—4 time, followed by similar pulses on conductors 870 and 873 in that order. It should be noted that this operation occurs irrespective of whether the received word were accepted or not.

*Production of drum word 1*

If the received words have been accepted flip-flop 808 will be in its One state when flip-flop 854 produces the positive pulse on its output conductor 856 which is applied through OR circuit 857 to one of the inputs of AND circuit 859. Under the conditions that the received words are accepted, flip-flop 808 conditions the other input of AND circuit 859 and therefore a positive potential is established on its output conductor 874 (labeled good word channel 1).

It is also noted in Fig. 14*c* that when the flip-flop 854 produces a positive pulse on its output conductor 856, this pulse is delivered to a conductor labeled first drum word channel 1.

Reference is now made to Figs. 14*c* and 11*a*. When the 10 μsec. pulse is produced on the conductor 866 (labeled read 1 in Fig. 14*c*) this pulse is delivered through OR circuit 766 (Fig. 11*a*) to the shift windings of all stages of the 17 stage shift register 771 and causes each of those stages which has a binary One state to produce a pulse in its output conductor.

The output conductors of stages 2 through 17 of 17 stage shift register 771 are grouped as cable group 880 whereas the output conductor of the first stage of that register is designated 881 in Fig. 11*a*. Since the shift pulse on conductor 866 is 10 μsec. in duration, it effectively clears all stages of the 17 stage shift register 771 after the contents have been delivered to the conductor 881 and the conductors of cable 880. Each conductor of cable 880 is connected through its corresponding 6 input OR circuit of the group of sixteen 6-input OR circuits 882 to the conditioning input of its gate of the 16 gate group 883. The shift current applied to the shift windings of the stages of the 17 stage shift register begins at substantially OD—4 time and therefore those stages containing a binary One will produce an output pulse having such a magnitude as to condition its gate of the gate group 883 at approximately OD—1 time.

As previously mentioned with reference to Fig. 14*c*, when the flip-flop 854 is in its One state, it initiates the read-out of the 17 stage shift registers by producing a pulse on its output conductor 856 and this pulse is delivered by way of a conductor 856 labeled First drum word to a Site Identity Circuit 884 (Fig. 11*b*). The site identity circuit is essentially a plug board, whereby a pulse received on the conductor 856 may selectively be applied to any one of the conductors of a cable 885. This arrangement effectively permits a 5 bit code to identify which channel a given drum message came from. The site identity circuit further permits the pulse received from conductor 856 to be applied to either a conductor 886 or a conductor 887. A pulse on conductors 886 and 887 is used to identify the parity of the site identity tag code. If the number of binary Ones in the tag is an even number then a pulse is applied to conductor 886 to indicate this fact whereas if the number of binary Ones is an odd number, a pulse is applied to conductor 887.

As previously mentioned with reference to Fig. 15, a "time tag" is provided in the first drum word. In order to establish a binary code indicating the elapsed time from a reference, a clock circuit 888 is provided. This clock circuit receives from a suitable source (such as for example, the computer to which the message is to be delivered), one pulse every 8 seconds on a conductor 889 and four pulses every second on a conductor 890. The clock circuit further receives OD—1, OD—2 and OD—3 pulses for synchronizing purposes.

The clock 888 is essentially a binary counter which is reset by a pulse on the conductor 889 (labeled 1 pulse per 8 sec.) and merely counts in binary fashion the number of pulses received on the conductor 890 (labeled 4 pulses per sec.). The clock delivers to the conductors of a cable 891 the binary count and delivers a positive D.C. level to a conductor 892 (labeled even) if the number of binary Ones in the time tag is even, whereas it delivers a positive potential to a conductor 893 (labeled odd) if the number of binary Ones is odd.

The D.C. levels on the conductors of cable 891 (represensative of the time tag) are delivered to the conditioning inputs of a group of five gates 894 whereas the pulses on the conductors of the cable 885 (representative of the site identity tag) are applied to the conditioning input of a group of five gates 895.

*Drum word 1 parity generation*

Referring back now to Fig. 11*a*, when the 17 stage shift register 771 receives the "read-out" shift pulse from conductor 866, the signal stored in the first stage of that register (the parity bit of received word 1) is delivered by way of the conductor 881, through an OR circuit 896 and by way of a conductor 897 to a parity generator 898. It is noted in Fig. 11*b* that the parity generator also receives the parity signals on conductors 892 and 893 from the clock 888 and parity signals from the site identity circuit 884 on conductors 886 and 887.

Reference is now made to Fig. 16 which shows the parity generator in logical block form. A pulse on conductor 886 (representative of an odd number of binary Ones in site identity tag) conditions one leg of a two input AND circuit 900 whereas a pulse on conductor 887 (even number of binary Ones in site identity tag) conditions one leg of a two input AND circuit 901. The other input to AND circuit 900 is conductor 893 from the clock which is positive if the number of binary Ones in the time tag is odd whereas the other input of AND circuit 901 is conductor 892 from the clock which is positive if the number of binary Ones in the time tag is even.

It will therefore be seen in Fig. 16 that when the first drum word is read (flip-flop 854 in Fig. 14*c* delivering a positive pulse on conductor 856 labeled First drum word channel 1) this pulse on conductor 856 is delivered to AND circuit 900 or AND circuit 901 (Fig. 16) dependent upon the total number of binary Ones in the site identity tag. If the total number of binary Ones in the site identity tag combined with the time tag is an even number, then either AND circuit 900 or AND circuit 901 will deliver the pulse to an OR circuit 902 which is delivered through an OR circuit 903 to the input of an OR circuit 904 and an AND circuit 905. The other input of OR circuit 904 and AND circuit 905 is from an OR circuit 906 having as one of its inputs the previously mentioned conductor 897 (labeled even parity word 1, 3 or 5 channel 1).

If as above assumed, the total number of binary Ones in the site identity tag combined with the time tag is even, AND circuit 900 or AND circuit 901 will deliver the pulse through OR circuit 902 and OR circuit 903 to OR circuit 904 and AND circuit 905. If the number of binary Ones in the received word 1 is an even number, then pulse is received from conductor 897 which is applied through OR circuit 906 to AND circuit 905. Under these assumed conditions, the number of binary Ones in the time tag, the site identity tag and received word 1 combined is an even number, thereby causing AND circuit 905 to pass a pulse through an OR circuit 907 to a conductor 908 (labeled to parity gate).

Since a parity bit of One is recorded only if the data bits of the drum word have an even number of binary Ones, the above assumed condition (even number of binary Ones in each of time, site and received word 1) and the following discussed conditions cause a positive potential on conductor 908 (labeled to parity gate). If the total number of binary Ones in the site tag combined with the time tag is an odd number, then OR circuits 902 and 903 deliver a negative potential to OR circuit 904 and AND circuit 905. This negative potential applied to AND circuit 905 prevents that circuit from producing a positive output regardless of the other input to that AND circuit. In response to this negative input to OR circuit 904, that circuit will produce a negative output unless a positive potential is received on its other input from OR circuit 902. All OR circuits thus far described have been described from the standpoint of being a "positive OR," that is, a positive input applied to any input of an "OR" circuit will cause a positive output. An OR circuit can as well be described from the standpoint of being a "negative AND," that is, a negative input applied to all of its inputs will cause a negative output. It is the "negative AND" function of OR circuit 904 which is employed in the logic of this circuit so that the negative output of OR circuit 904 (when both inputs are negative) causes an inverter circuit 909 to produce a positive output which is applied through OR circuit 907 to the conductor 908 (labeled to parity gate).

Briefly summarizing the above, the parity generator of Fig. 16 could be said to have an overall function of receiving signals indicative of the parity of each of the time tag, site identity tag and received word 1 and producing a positive potential on its output conductor 908 if the number of binary Ones is an even number. The parity generator also functions in a maner to be described in detail hereinafter to produce a signal representative of the proper parity bit for drum words 2 and 3.

As previously mentioned with reference to Fig. 14*c*, if the words read from the 17 stage shift registers are acceptable for storage on the drum, a positive potential is established on the conductor 874 labeled good word channel 1 in Fig. 11*b*. This positive potential is delivered through an AND circuit 910 to cause a gate 911 to be conditioned. Gate 911, when conditioned, passes OD—1 pulses which are delivered by way of a conductor 912 to several places. A pulse is delivered by way of conductor 912 (labeled Data Available) to the Write Status Circuit 850,, where, in response to this pulse, a pulse at OD—3 time is delivered by way of a conductor 913 (labeled Write) and also a write a One signal is delivered to a write head 914 to cause that signal to be recorded in the CD Status channel. A pulse is delivered by way of conductor 912 to a gate 915 which, if conditioned, passes this pulse to the parity stage of a Write Circuit 916 to cause that stage to deliver a "Write a One" signal to the drum register parity position in response to a write pulse on conductor 913. A pulse on conductor 912 is also delivered to a gate 917 which is always conditioned in response to a pulse on conductor 856 (labeled 1st drum word) since a pulse on conductor 886 or conductor 887 is delivered to gate 917 through an OR circuit 918. In this way, gate 917 passes the pulse on conductor 972 to the group of 5 gates 894 and to the group of 5 gates 895 when the 17 stage shift register containing received word 1 is being read out. This pulse passed by gate 917 is applied to all of the gates of gate groups 894 and 895 and will be passed by those gates of group 894 which are conditioned (representative of a binary One) by the clock circuit 888 and will be passed by those gates of group 895 which are conditioned by the site identity circuit 884.

Pulses passed by gate group 894 are delivered by way of conductors of a cable 919 through a group of five two-input OR circuits 920 to the stages of Write Circuit 916 assigned the bit positions Right 6 through Right 10 as indicated in Fig. 15.

Pulses passed by gate group 895 are delivered by way of the conductors of a cable 921 through a group of five two-input OR circuits 922 to the stages of the Write circuit 916 assigned the bit positions Right 11 through Right 15 as indicated in Fig. 15.

Pulses on conductor 912 are also delivered to each of the gate groups 923, 924, 925 and 883. For reasons which will be apparent subsequently, the gates of groups 923, 924 and 925 will not be conditioned when drum word 1 is being read out.

The pulses on conductor 912 are passed by those gates of gate group 883 which are conditioned. When drum word 1 is being read out, those gates of gate group 883 which are connected to the stages of 17 stage shift register 771 containing a binary One will be conditioned to pass the pulse received on conductor 912. Pulses passed by gate group 883 are delivered by way of conductors of a cable 926 to those stages of write circuit 916 assigned bit positions Left sign through Left 15 as indicated in Fig. 15.

The information received by the various stages of the write circuit 916 (a pulse received by a given stage is representative of a binary One and no pulse a binary Zero) is stored therein and in response to a pulse on conductor 913 (write) followed by a pulse on conductor labeled OD—3+1.7 $\mu$sec., this stored information is written on the drum 702 in the register identified as being empty by the OD Status channel. Signals representative of binary Zeros are written on the drum by those stages of the write circuit 916 which do not receive a pulse of information whereas those that do receive a pulse (binary One) cause a binary One signal to be written on the drum.

In the above described manner, a pulse on conductor 851 (drum demand) from the Write Status Circuit 850 initiates readout operation of the 17 stage shift registers. If those registers contain information acceptable for storage on the drum 702, gate 911 is conditioned to pass OD—1 pulses, the first of those OD—1 pulses causes the stages of the write circuit 916 to be set to represent the information contained in the received word 1, the time tag and the site identity tag. The contents of the stages of the write circuit 916 is written on the drum in response to a pulse on conductor 913 (write) which is generated by the write status circuit 850 in response to the pulse (called data available) from gate 911.

*Production of drum word 2*

As above described, the actual read-out of the 17 stage shift register 771 is in response to the 10 $\mu$sec. shift pulse on conductor 866 (Fig. 14*c*). Immediately after the pulse on conductor 866, AND circuit 868 causes a positive 10 $\mu$sec. shift pulse to appear on its output conductor 870 as previously described. This pulse on conductor 870 initiates the read-out of drum word 2 in the following manner.

Referring back now to Fig. 11*a*, the 10 $\mu$sec. pulse on conductor 870 causes the 17 stage shift registers 770 and 769 to be read-out by a shifting operation similar to that as described previously with reference to 17 stage shift register 771.

*Parity generation for drum word 2*

When 17 stage shift register 770 is read-out, the parity bit of word 2, which is stored in stage 1 of that register, will cause a pulse to be delivered to a conductor 930 if that parity bit is a binary One. Pulses on conductor 930 are delivered through an OR circuit 931 and a conductor 932 to the Parity Generator 898. When 17 stage shift register 769 is read out, the parity bit of word 3, which is stored in state 1 of that register, will cause a pulse to be delivered to a conductor 933 if that parity bit is a binary One. Pulses on conductor 933 are delivered through OR circuit 896 and conductor 897 to the parity generator 898.

Referring again to Fig. 16, pulses on the conductor 932 (that conductor receives a pulse if the parity bit of received word 2 in channel 1 is a binary One) are applied through the OR circuit 903 to the OR circuit 904 and the AND circuit 905. Pulses on the conductor 897 (that conductor receives a pulse if the parity bit of received word 3 in channel 1 is a binary One), as previously described, are delivered through OR circuit 906 to the OR circuit 904 and AND circuit 905. As described in reference to parity generation for drum word 1, OR circuit 904, and inverter 909 deliver a positive potential to conductor 908 through OR circuit 907 if no positive pulse is received from OR circuit 906 and OR circuit 903, whereas AND circuit 905 delivers a positive pulse to conductor 908 through OR circuit 907 if a positive pulse is received from both OR circuit 906 and OR circuit 903. In this manner, if received words 2 and 3 combined have an even number of binary Ones, a positive potential is applied to conductor 908.

Referring back to Figs. 11*a* through 11*c*, stages 12 through 17 of 17 stage shift register 770 have their outputs connected by way of the conductors of a cable 933 through an OR group 934 to the conditioning input of the gates of gate group 925. Stages 7 through 11 of the 17 stage shift register 770 have their outputs connected by way of the conductors of a cable 935 through an OR group 936 to the conditioning input of the gates of gate group 924. Stages 2 through 6 of 17 stage shift register 770 have their outputs connected by way of the conductors of a cable 937 through an OR group 938 to the conditioning input of the gates of gate group 923. Stages 2 through 17 of 17 stage shift register 769 have their outputs connected by way of the conductors of a cable 939 through OR group 882 to the conditioning input of the gates of gate group 883.

From the above description it will be apparent that in response to the positive 10 μsec. pulse on conductor 870, the received word 2 and the received word 3 stored in 17 stage shift registers 770 and 769, respectively, are read out and those gates of gate groups 923, 924, 925 and 883, which correspond to a binary One bit in those received words, are conditioned. Furthermore, in response to that 10 μsec. pulse on conductor 870, gate 915 will be conditioned if the total number of binary Ones in received word 2 and received word 3 combined is an even number.

Since gate 911 is continuously conditioned during the read-out operation of the 17 stage shift registers, the first OD—1 pulse passed by that gate causes read-out of drum word 1 as previously described and the second OD—1 pulse passed by that gate causes read-out of drum word 2 as described immediately above, that is, gate 915, gate groups 923, 924 and 925 and gate group 883 are sampled. The outputs of the gates of gate group 883 are delivered by way of the conductors of cable 926 to those stages of the Write circuit 916 designated for recording bits Left sign through Left 15 (Fig. 15) on the drum. The outputs of the gates of gate group 925 are delivered by way of the conductors of a cable 940 to those stages of the Write circuit 916 designated for recording bits right sign and Right 1 through Right 5 (Fig. 15) on the drum. The outputs of the gates of gate group 924 are delivered by way of the conductors of a cable 941 and the OR circuits of OR group 922 to those stages of the Write circuit 916 designated for recording bits Right 6 through Right 10 (Fig. 15) on the drum. The outputs of the gates of gate group 923 are delivered by way of the conductors of a cable 942 and the OR circuits of OR group 920 to those stages of the Write circuit 916 designated for recording bits Right 11 through Right 15 (Fig. 15) on the drum.

In the above described manner, following the read-out operation which results in the first drum word of a message being recorded on the drum, the second drum word of the message is recorded in the drum register adjacent to the drum register into which the first drum word was written.

*Production of drum word 3*

Immediately after the 10 μsec. pulse on conductor 870 which causes read-out of the 17 stage shift registers 769 and 770, AND circuit 864 (Fig. 14*c*) causes a 10 μsec. pulse to be delivered to the conductor 873.

Referring now to Fig. 11*a*, the 10 μsec. pulse of conductor 873 is delivered to the shift windings of each stage of the 17 stage shift registers 767 and 768 to effect a read-out and clear operation of those registers which is the same as the read-out and clear operation described with reference to the other 17 stage shift registers. Stage 1 of 17 stage shift register 768 has its output applied by way of a conductor 943 and through OR circuit 931 and conductor 932 to the Parity generator 898 whereas stage 1 of 17 stage shift register 767 has its output applied by way of a conductor 944 and through OR circuit 896 and conductor 897 to the Parity generator 898.

Since the operation of the parity generator in response to signals on conductors 897 and 932 was previously described with reference to the production of Drum word 2, no further discussion with reference to the production of the parity bit for drum word 3 is required.

The 17 stage shift register 768 has the output of its stages connected in much the same manner as was described with reference to the 17 stage shift register 770. Stages 12 through 17 of 17 stage shift register 768 have their outputs connected by way of the conductors of a cable 945 through OR group 934 to the conditioning input of the gates of gate group 925. Stages 7 through 11 have their outputs connected by way of the conductors of a cable 946 through the OR group 936 to the conditioning input of the gates of gate group 924. Stages 2 through 6 have their outputs connected by way of the conductors of a cable 947 through the OR group 938 to the conditioning input of the gates of gate group 923.

The 17 stage shift register 767 has its outputs connected much in the same manner as the outputs of 17 stage shift register 769. The outputs of stages 2 through 17 of 17 stage shift register 767 are connected by way of the conductors of a cable 948 through OR group 882 to the conditioning input of the gates of gate group 883.

Since gate 911 is conditioned through OR circuit 910 when conductor 874 is positive, and since this conductor receives a positive potential when conductor 873 (Fig. 14*c*) is positive and the words being read-out are acceptable from drum storage, the third OD—1 pulse is passed by gate 911 (Fig. 11*b*). This third OD—1 pulse samples gate 915 and the gates of gate groups 923, 924, 925 and 883, thereby causing the third drum word to be written on the drum in the same manner as that described in reference to writing the second drum word on the drum.

*No data available in channel 1*

As previously mentioned, when the OD Status channel and Marker channel identify the first register of an empty three register slot, a drum demand pulse is produced on conductor 851 (Fig. 11*b*) by the Write Status Circuit 850.

If, when this pulse is applied to gates 852 and 853 (Fig. 14*c*), the flip-flop 830 is in its Zero state, the gate 853 passes this pulse by way of a conductor 949 (labeled Gated Drum Demand) to channel 2. In this manner, channel 2 receives drum demand pulses so that it may deliver messages to the drum, if it has messages acceptable for storage thereon.

*Simultaneous operation of channels 1 and 2*

As mentioned in the preceding description, when bits of the received message are being shifted into the 17 stage shift registers, the shifting of those registers is accomplished by shift pulses beginning at XT—5 time and ending at XT—6 time. A binary One signal being transferred in this manner from one given stage to another given stage of a 17 stage shift register will therefore produce a pulse on the output conductor of that stage. This output pulse will cause the gate, associated with that output conductor, to be conditioned, for example, if a binary One is being transferred from stage 2 to stage 3 of the 17 stage shift register 771, the pulse on the output conductor of that stage (one of the conductors of cable 880) will be applied through the particular OR of OR group 882 to condition the associated gate of gate group 883. Any gate conditioned in this manner will be conditioned considerably later than OD—1 time and therefore will have little or no effect since those gates are sampled at OD—1 time. Since the shift pulses applied to the 17 stage shift registers to cause read-out and clear operations are pulses which begin at OD—4 time, and end at OD—4 time, a binary One stored in any stage will cause its associated gate to be conditioned at approximately OD—1 time at which time the gate is sampled.

For the reasons just discussed, it will be apparent that although the outputs of the 17 stage shift registers of channel 1 and the outputs of the 17 stage shift registers of channel 2 condition the same corresponding gates (by virtue of the OR provisions of OR groups 882, 934, 936 and 938 as well as OR provisions in the parity generator 898 and Site Identity Circuit 884), the shifting in operation of one of those channels may be "simultaneous" with a read-out operation in the other channel. This provision of shifting a register for read-in purposes at a time which is different than when shifted for read-out purposes is described as incorporated in another preferred embodiment and claimed in copending application Serial Number 582,578 (IBM Docket 4910), entitled "Data Storage System," filed on May 3, 1956, by James S. Crosby, Jr., et al.

*Burst counter and compare circuit*

Reference is now made to Fig. 17 which illustrates in logical block form the burst counter and compare circuit for Section 2. As previously indicated, the block 258 in Fig. 3*a* includes burst counter and compare circuits for each of the various sections of the Output System. Since the burst counter and compare circuits for each of the various sections may be identical to that of the Section 2, only the burst counter and compare circuit for Section 2 will be described in detail.

As previously noted, both the binary One and binary Zero signals stored in the burst number register 52 (Fig. 3*a*) are delivered to the burst counter and compare circuit. In Fig. 17 the signals from the burst number register are applied as inputs to AND circuits 960 through 975. These conductors are labeled $\overline{L8}$, L8, $\overline{L9}$, L9, etc. This labeling is a convention employed to indicate under what condition the conductor receives a positive potential. If the left half word of the drum word in its bit position Left 8 (which is one of the bits stored in the burst number register 52 of Fig. 3*a*) has a binary Zero, then the conductor labeled $\overline{L8}$ is positive. If this bit position has a binary One, then the conductor labeled L8 is positive. With this convention of labeling it will be apparent under what condition a given one of those conductors is positive.

The other input to each of the AND circuits 960 through 975 is from an 8 stage binary counter comprising flip-flops 976 through 983 and their associated gates 984 through 990.

This 8 stage binary counter receives reset commands in the form of pulses on the conductor labeled Clear. As indicated in Fig. 17, a pulse on the conductor labeled Clear causes each of the flip-flops 976 through 983 to assume its Zero state. Pulses are applied to the conductor labeled Clear in any suitable manner. Since this counter, as will be apparent from the subsequent description, automatically resets during normal operation, it is only necessary to apply a pulse to the conductor labeled Clear when the counter is initially put into operation or during operational testing.

A pulse received from conductor 171 causes the counter to be advanced since this pulse is applied to the complement input of a flip-flop 983 as well as to a gate 990. Each pulse causes flip-flop 983 to change its existing state, every second input pulse causes flip-flop 982 to change its existing state (since gate 990 only passes pulses when flip-flop 983 is in its binary One state), every fourth input pulse causes flip-flop 981 to change its existing state (since both of the flip-flops 982 and 983 must be in their binary One state before gates 989 and 990 will pass the pulse to the complement input of flip-flop 981), and so forth. When a sufficient number of pulses have been received to cause all of the flip-flops to assume their binary One state, the next received pulse will cause all of the flip-flops to return to the reset state (all set to binary Zero).

As indicated in Fig. 17, the low order stage flip-flop 983 of the counter has its One output applied to AND circuit 974 and its Zero output applied to AND circuit 975. Those AND circuits 974 and 975 receive the low order output of the burst number register (bit 15); however, AND circuit 974 receives the Zero signal whereas AND circuit 975 receives the One signal. In this way, if the low order bit (bit L15) of the drum word compares with the low order bit (output of flip-flop 983) of the counter, then neither of the AND circuits 974 or 975 will produce a positive output.

In a like manner the remaining orders of the drum word are compared to their corresponding order of the counter and if each order compares, then all of the AND circuits 960 through 975 deliver negative potentials through OR circuits 991 through 995 to an inverter 996 which in response to this negative signal delivers a positive signal to the conductor 264 (Compare section 2).

If any bit of the drum word fails to compare with its corresponding order of the counter then one or more of the AND circuits 960 through 975 will deliver a positive potential to the inverter 995 which will in turn deliver a negative potential to the conductor 264.

*Clock circuit*

Reference is now made to Fig. 18 which illustrates in logical block form the Clock Circuit indicated as block 888 in Fig. 11*b*. As mentioned in the description of Fig. 11*b*, the clock circuit counts the number of pulses received on conductor 890 (4 pulses per sec.) and delivers signals to the conductors of cable 891 representative of the count. The clock circuit also delivers a positive potential to the conductor 892 (Even) if the number of binary Ones in the count is an even number and a positive potential to the conductor 893 (Odd) if the number of binary Ones in the count is an odd number. The clock circuit also receives pulses on the conductor 889 (1 pulse per 8 sec.) and in response to each of these pulses performs a reset and check operation.

Pulses received on conductor 890 (4 pulses per sec.) cause a flip-flop 1001 to be set in its One state to thereby condition a gate 1002. When gate 1002 is conditioned it passes the next OD—3 pulse to cause a flip-flop 1003 to be set in its One state thereby conditioning a gate 1004 and another gate 1005. When gate 1005 is conditioned it passes the next received OD—1 pulse to the One input of a flip-flop 1006, to the complement input of a flip-flop 1007 and to the sample input of a gate 1008. When gate 1004 is conditioned it passes the next received OD—2 pulse to cause flip-flops 1001 and 1002 to return to their Zero states and that OD—2 pulse samples a gate 1009 and another gate 1010. In this way, a pulse on the conductor 890 (4 pulses per sec.) may occur at random time; however, in response to each pulse, a pulse occurring at OD—1 time will be passed by gate 1005.

Flip-flop 1007 and gate 1008 together with flip-flops 1011 through 1014 and gates 1015 through 1017 form a 5 stage binary counter whose operation is similar to the operation of the burst counter previously described. Assuming that the flip-flops 1007 and 1011 through 1014 are all in their Zero state, the first OD—1 pulse passed by gate 1005 causes flip-flop 1007 to be set in its One state and also causes flip-flop 1006 to be set in its One state. Each time that gate 1005 passes an OD—1 pulse, gate 1004 passes the next OD—2 pulse to the sample input of gates 1009 and 1010. After the first OD—1 pulse has been passed to cause flip-flop 1007 to be set in its One state, the OD—2 pulse passed by gate 1004 will be passed by gate 1009 (since flip-flop 1007 is now in its One state) and will also be passed by gates 1018, 1019, and 1020 to the sample input of gate 1021. After the counter has been reset to Zero and has only received one input pulse from gate 1005, gate 1021 will not be conditioned and therefore the pulse passed by gate 1020 will not be effective to change the state of flip-flop 1006. Flip-flop 1006 is a flip-flop employed to indicate the parity of the number contained in the counter and since the counter now indicates a count of One (one pulse received from gate 1005) the number of binary Ones in the count is an odd number. Since flip-flop 1006 remains in its One state it will deliver a positive potential to conductor 893 indicating an odd parity count.

The second pulse passed by gate 1005 causes flip-flop 1007 to return to its Zero state and flip-flop 1011 to be set in its One state. The OD—2 pulse passed by gate 1004 will be passed by gate 1010 (since flip-flop 1007 is now in its Zero state) and will also be passed by gates 1022, 1019 and 1020; however, gate 1021 will not pass that pulse since it is still not conditioned. Flip-flop 1006 will therefore remain in its One state after the count of binary Two has been stored and this is proper since the number of binary Ones stored by the counter is an odd number.

When the third pulse is passed by gate 1005, flip-flop 1007 is set in its One state and flip-flop 1011 remains in its One state thereby storing two binary Ones, one in the lowest order of the counter and one in the next higher order, indicating a count of three in binary form. This third pulse, like all other pulses passed by gate 1005, causes flip-flop 1006 to be set in its binary One state delivering a positive potential to conductor 893 (Odd) which is an incorrect indication of the number of binary Ones stored in the counter. The OD—2 pulse passed by gate 1004 will be passed by gate 1009 and gates 1023 through 1026 to the Zero input of flip-flop 1006. In this way, flip-flop 1006 is set to its proper state to indicate the number of binary Ones stored in the counter. It should be noted that although between OD—1 time and OD—2 time flip-flop 1006 may improperly indicate the parity count, this will have little or no effect on the operation of the input system previously described with reference to Figs. 11 through 15 since the signals produced by flip-flop 1006 are not used during this interval of time.

From the preceding description it will be evident how the remaining gate circuits 1027 through 1031 operate to cause flip-flop 1006 to assume the proper state to indicate the parity of the count. Succeeding pulses are counted by flip-flops 1007 and 1011 through 1014 and the parity of the count is indicated by flip-flop 1006. After the 31st pulse has been received, all of the flip-flops 1007 and 1011 through 1014 will be in their binary One state and the 32nd pulse will cause all of those flip-flops to assume their Zero states. Coincident in time with the 32nd pulse, a pulse will be received on conductor 889 which causes a flip-flop 1032 to be set in its One state. This pulse is also applied to the sample input of a gate 1033 which is conditioned by the Zero outputs of flip-flops 1007 and 1011 through 1014 by way of an OR circuit 1034. Since the pulse on conductor 889 is coincident in time with the 32nd pulse on conductor 890, it will sample gate 1033 before gate 1035 passes the pulse to advance the counter to indicate the count of 32. The pulse on conductor 889 will be passed by gate 1033 only in the event that the flip-flops 1007 and 1011 through 1014 fail to indicate the proper count of 31. The pulses passed by gate 1033 cause all of those flip-flops to be set in their One state and this pulse is also delivered to the conductor labeled One alarm and may be used in any desired manner as, for example, to actuate a visual alarm.

When in its One state, flip-flop 1032 conditions a gate 1035 and in this way the 33rd pulse is passed by gate 1035. A pulse passed by gate 1035 resets the flip-flop 1032 to its Zero state and also samples a gate 1036. This gate is conditioned by any of the One output flip-flops 1007 and 1011 through 1014 by way of an OR circuit 1037. When the 33rd pulse on conductor 890 is passed by gate 1035, all of the flip-flops 1007 and 1011 through 1014 should be in their Zero states; however, if any of those flip-flops are incorrectly in their One state, gate 1036 passes the pulse to the conductor labeled Zero alarm and may be used to actuate a visual alarm.

*Write status circuit*

The write status circuit serves to permit writing operations on a multiple word slot basis only in those registers of the drum which are empty. The general principles of Status type of drum operation are presented in the aforementioned copending application Serial Number 494,982 (IBM Docket 4490).

A read head 1100 delivers signals to a read circuit 1102 indicating whether or not the next register available to be written into is designated as the first register of a 3 register slot or compartment. As previously indicated, the signals recorded in the Marker channel of the drum, to which the read head 1100 responds are a binary Zero signal followed by two successive binary Ones, followed by another binary Zero, etc.

When a binary One signal is delivered by the read head 1100 to the read circuit 1102, that circuit conditions a gate 1104 to pass the next received OD—1 pulse. An OD—1 pulse passed by gate 1104 causes a flip-flop 1106 to be set in its binary One state. In this way flip-flop 1106 will be in its binary Zero state at OD—3 time every third drum register and when in the Zero state at OD—3 time it indicates that this register is the first of a three register slot.

A read head 1108 delivers signals read from the OD Status channel to a Read Circuit 1110. When read head 1108 reads a binary One in the OD Status channel (indicating that the next drum register available to be written into is full), read circuit 1110 causes a gate 1112 to be conditioned to pass an OD—1 pulse. This OD—1 pulse passed by gate 1112 sets a flip-flop 1114 in its binary One state. Flip-flop 1114 will therefore be in its Zero state at OD—3 time only when a drum register available to be written into is empty.

Since flip-flop 1106 and flip-flop 1114 have their Zero outputs applied to an AND circuit 1116, that AND circuit will cause a gate 1118 to be conditioned at OD—3 time under the conditions that the register available to be written into is the first register of a three register slot and that register is empty. A pulse passed by gate 1118 is delivered to the previously referred to conductor 851 labeled Drum demand.

In the event that data is available to be written onto the drum a pulse is produced on the conductor 912 labeled Data available in the manner previously described with reference to Fig. 11*b*. A pulse on conductor 912 causes a flip-flop 1120 to be set in its One state thereby causing a gate 1122 to be conditioned at OD—3 time and another gate 1124 to be conditioned at OD—4 time. In this way a pulse is delivered to the conductor 913 (Write) at OD—3 time and a pulse is delivered to a conductor 1126 (Clear) at OD—4 time in response to each data available pulse received by the write status circuit. When a pulse is received on conductor 912 (data available) another flip-flop 1128 receives that pulse through an OR circuit 1130 and sets that flip-flop in its One state. Flip-flop 1128 has its One and Zero outputs applied to a Drum Writer 1132 such that when the flip-flop is in its One state it conditions the drum writer to deliver a Write a One signal to the write head 914 in response to a pulse on a conductor 1134. When in the Zero state, flip-flop 1128 conditions the Drum Writer to deliver a Write a Zero pulse to the write head 914 in response to a pulse on conductor 1134. The pulse on conductor 1134 is approximately 1.7 μsec. in duration so that the width of the pulse delivered to the write head 914 will properly energize that head to write binary signals on the drum.

If a pulse is received from conductor 912 (data available) a binary One is accordingly written in the CD Status channel by write head 914. If a binary One is read in the OD Status channel by read head 1108, flip-flop 1114 is set in its One state in the manner above described. When in the binary Zero state, flip-flop 1114 conditions a gate 1136 such that it passes an OD—3 pulse to set a flip-flop 1138 in its One state and another flip-flop 1140 in its One state. The Zero output of flip-flop 1140 conditions a gate 1142 which is sampled by OD—1 pulses. Since flip-flop 1140 is set in its Zero state by OD—2 pulses it will be seen that it will remain in its Zero state during the following OD—1 time only when a binary One is read in the OD Status channel.

Under this condition, gate 1142 passes the OD—1 pulse through OR circuit 1130 to set flip-flop 1128 in its One state. A binary One read in the OD Status channel (indicating the register is full) is accordingly written in the CD Status channel.

If a Zero is read in the OD Status channel and no data is available to be written in that register, a Zero will be written in the CD Status channel since flip-flop 1128 is set in its Zero state at OD—4 time and will remain in that state at the following OD—3 time if no pulse is received on conductor 912 (data available).

Flip-flop 1138 has its Zero output applied to the conditioning input of a gate 1144 and since this flip-flop is set to its Zero state by the OD index pulses and set in its One state only if there is an empty register on the drum, gate 1144 will pass a pulse only if a complete revolution of the drum has been made and no empty register has been indicated. The output of gate 1144 may be used to actuate any suitable alarm to indicate that the drum has all registers full.

*Drum word register*

As previously described with reference to Fig. 3*a*, the drum word register receives words from the drum, stores each word, performs a parity check on the word and generates a parity bit for the 16 data bits of the word.

Reference is now made to Figs. 20*a* and 20*b*. Various stages of the drum word register are not shown in Figs. 20*a* and 20*b* in the interest of simplicity; however, those stages may be identical in construction to those stages which are shown and the operation of those stages which are not shown will be apparent from the following description.

The data register 54 receives the bits RS and R1 through R15 of the drum word. The RS bit, if a binary One, causes a flip-flop 1200 to be set in its One state, the R1 bit in like manner causes a flip-flop 1201 to be set in its One state and the R15 bit causes a flip-flop 1202 to be set in its One state. The burst number register 52 receives bits L8 through L15 of the drum word, bit L8 being stored in a flip-flop 1203 and bit L15 being stored in a flip-flop 1204. The Array Address register receives bits L3 through L7 of the drum word, bit L3 being stored in a flip-flop 1205 and bit L7 being stored in a flip-flop 1206. The Section Address register 48 receives bits LS and L1 through L2, bit LS being stored in a flip-flop 1207 and bit L2 being stored in a flip-flop 1208. The parity bit of the drum word is stored in a flip-flop 1209.

At OD—4 time, each of the flip-flops 1200 through 1209 is cleared to its Zero state by a pulse on conductor labeled OD—4. The flip-flops 1200 through 1209 receive their corresponding bit of the drum word in the form of a pulse at approximately OD—1 time, that is, if the drum word bit is a binary One the particular flip-flop receives a pulse on its One input, if a binary Zero, no pulse is received. The pulse on conductor OD—4 is delayed approximately 0.5 μsec. by a delay unit 1210 and then applied to the Zero input of a flip-flop 1211. When a drum word is delivered to the drum word register, a pulse is received on conductor 40 which sets a flip-flop 1212 in its One state. This pulse on conductor 40 occurs at approximately OD—1 time.

In this manner, a word read from the drum is stored in flip-flops 1200 through 1209 shortly after OD—1 time (OD—1 time plus the settling time of the flip-flops). When a new drum word has been stored in the drum word register, flip-flop 1211 will be in its Zero state and flip-flop 1212 will be in its One state. When in its binary One state, flip-flop 1212 conditions a gate 1213 to pass the next received OD—1+1.9 μsec. pulse to a conductor 1214 labeled Even. The purpose of the pulse on conductor 1214 is to check the parity of the drum word and to generate a parity bit for the 16 data bits of the drum word.

A pulse on conductor 1214 samples a gate 1215 and a gate 1216. If the RS bit of the drum word is a binary One, flip-flop 1200 will cause gate 1215 to be conditioned whereas if the bit is a binary Zero then gate 1216 will be conditioned. For the purposes of explanation, a pulse on conductor 1214 can be considered as representative of any even number, for example Zero, and therefore if the pulse is passed by gate 1215 it is representative of an odd number since a binary One (drum word bit RS=1) has been added to Zero. If the pulse on conductor 1214 is passed by gate 1216 it can be considered as representative of an even number since it was originally assumed to be even and a Zero has been added to it. A pulse passed by gate 1215 to the conductor labeled Odd samples a gate 1217 and a gate 1218 whereas a pulse passed by gate 1216 to the conductor labeled Even samples a gate 1219 and a gate 1220.

Gates 1217 through 1220 are called the "parity gates" for the R1 stage of the drum word and all stages except the RS stage have a similar arrangement of 4 "parity gates." If the total number of binary Ones in the 16 bits of data stored in the data register is an even number, a gate 1221 or a gate 1222 (parity gates of stage R15) will pass the pulse applied to conductor 1214 whereas if the total number of binary Ones is an odd number, then a gate 1223 or a gate 1224 will pass the pulse. A pulse passed by gate 1223 or gate 1224 is applied to the conductor labeled Odd and this pulse not only samples the parity gates of the L8 stage but also causes the flip-flop 1211 to be set in its One state. Flip-flop 1211 will therefore produce a positive D.C. level on its output conductor 66 if the total number of binary Ones in the 16 bits of data is an odd number.

In view of the above description, the operation of the parity gates associated with the remaining stages of the drum word register will be apparent. If a pulse is passed through the parity gates in such a manner as to be delivered to conductor 60 labeled Odd, this pulse represents that the parity of the drum word is good since the assumption is that the total number of binary Ones in the drum word including the parity bit is odd. If a pulse is delivered to the conductor 62 labeled Even, this pulse represents that the parity of the drum word is wrong.

*Tuning fork oscillator*

As previously indicated with reference to Fig. 4*a*, the primary source for 1300 cycle signals is a tuning fork oscillator shown as block 98 in Fig. 4*a*.

Reference is now made to Fig. 21 which shows in schematic form the circuit of a preferred tuning fork oscillator. A resonator comprising a tuning fork 1250, a pickup coil 1251 and a drive coil 1252 is preferably provided in an evacuated container. The tuning fork is constructed of magnetic material so that it may be supplied with energy by means of the drive coil 1252 which is wound on a permanent magnet and placed adjacent to one tine of the fork. The pickup coil feeds a voltage generated in it by the oscillations of the fork to the grid of tube section V1*b*. The anode of tube section V1*b* is A.C. coupled to the grid of tube section V1*a*. Tube section V1*a* is cathode follower connected to the drive coil 1252. The anode of tube section V1*b* is also capacitively coupled to the grid of tube section V2*a*. Tube section V2*a* and its associated circuit forms a saturated audio amplifier. With the circuit shown in Fig. 21, the tuning fork oscillator is self-starting, that is, full fork amplitude is reached within about 20 to 50 seconds from a cold heater start.

*Schmitt trigger*

As described with reference to Fig. 4*a*, the output of the tuning fork oscillator is applied to a Schmitt trigger 100 whose output is a positive going pulse.

Reference is now made to Fig. 22 which is a schematic diagram of a circuit called a Schmitt trigger. Starting with the condition of tube section V3*a* cut off and tube section V3*b* conducting, and with the grid of tube section V3*a* considerably negative with respect to the cathode, a rising level on this grid will at some point cause it to enter the conduction region. As conduction increases in tube section V3*a* the current through resistor 1260 causes a lowering of the voltage at point 1261 and a consequent proportional drop at the grid of tube section V3*b* due to the action of the voltage divider resistors 1262 and 1263. As the voltage of the grid of tube section V3*b* is lowered, that tube section tends toward cutoff and since there is less current flow through resistors 1263 and 1264, the cathode of tube section V3*a* goes more negative, hence increasing the positive-going difference between the grid and cathode of tube section V3*a* and driving it further into conduction. This action continues in the direction of conduction in tube section V3*a* and cutoff in tube section V3*b* until tube section V3*a* reaches saturation. Any further positive movement of the grid of tube section V3*a* results only in an increase in grid current. As the voltage level on the grid of tube section V3*a* is now lowered, a point is reached at which the feedback divider resistors 1262 and 1263 move the grid of tube section V3*b* to a point where the grid to cathode potential of tube section V3*b* is such that some conduction starts, raising the cathode slightly. Since the grid of tube section V3*a* is held by the input voltage and the cathode is now moving in a positive direction, tube section V3*a* tends more toward cutoff, further raising the anode of that section and dragging the grid of tube section V3*b* along in the positive direction. The circuit has now switched back to the original state. The input voltage level needed to cause conduction to switch from tube section V3*b* to V3*a* is somewhat higher than that needed to cause the reverse action. This is due to the difference in the values of the anode circuit resistors 1260 and 1265 and produces a "hysteresis" effect with more inherent stability than a symmetrical circuit. Inductor 1266 serves to provide peaking action. Capacitor 1267 serves to increase the A.C. loop gain which increases switching speed, hence producing a faster rise time in the leading edge of the output waveform.

*Pulse generator*

As described with reference to Fig. 4*a*, the output of the Schmitt trigger 100 is delivered to the pulse generator 102 which produces a .1 μsec. pulse in response to the relatively wide pulse from the Schmitt trigger.

Reference is now made to Fig. 23 which is a schematic diagram of a pulse generator. The fast rising voltage applied to the input 1270 is differentiated and applied to the grid of tube section V2*b* which acts as a D.C. current switch in the plate circuit of a blocking oscillator type of pulse generator comprising tube V4. As the plate pull-over triode (tube section V2*b*) is rapidly driven into conduction a voltage is developed across the grid side (secondary) of transformer T1 due to the large *di/dt* in the primary. The transformer is so oriented that when current in the primary is increasing a positive voltage is applied to the grid of tube V4. This positive-going grid starts conduction in tube V4, adding to the current flowing in the primary of transformer T1, and causing a further positive increase in the induced voltage on the grid. This action continues until saturation of tube V4 is reached. At this point current flow becomes constant, hence *di/dt* and the voltage induced in the secondary become zero, allowing the grid to move toward the −30 v. bias voltage. This initiates a decrease in plate current inducing a voltage on the grid of V4 which tends to drive it even further negative. A very fast leading and trailing edge of the signal is thus generated at output terminal 1271.

*Output shift registers*

As described with reference to Fig. 3*b*, the shift registers 420, 422, 424, 426 and 428 receive parallel data signals from the storage arrays and convert the parallel data to serial data.

Reference is now made to Fig. 24 which shows, in logical block diagram form, the details of one of the output shift registers, the others being identical to the one illustrated. Each sense winding is connected to its individual one of the flux amplifiers 1280 through 1284. Each of the flux amplifiers is of the gated type, that is, a gate signal on conductor 220 is applied to each of those flux amplifiers and any of those flux amplifiers receiving a signal representative of a binary One from the sense winding will produce an output signal.

The outptut of flux amplifiers 1280 through 1284 is applied to stages 1285 through 1289 of the output core shifting register respectively.

When a gate signal is received on conductor 220, those flux amplifiers which receive a signal representative of a binary One pass the signals to cause their corresponding stage of the output shifting register to be set in the One state. This operation is followed by the application of five shift pulses to the conductor 176 thereby causing the parallel data written into the core shifting register to be delivered in serial form to the output conductor 1290.

*Gated flux amplifier*

As described in detail with reference to Fig. 4*b*, flip-flop 148 causes shifting of the 19 counter by producing 2.5 μsec. positive pulses on its One output. The shifting of the 19 counter causes read-out of the One of Core Arrays A and B. When the 2.5 μsec. shift pulse is produced by flip-flop 148, that pulse is inverted by inverter 218 and delivered to conductor 220. This 2.5 μsec. negative pulse on conductor 220 is applied as a gate to the flux amplifier which receives on its other input the signal produced on a sense winding of the array being read-out by the 19 counter.

Reference is now made to Fig. 25 which is a schematic wiring diagram of the gated flux amplifier. As previously stated, in the absence of shift pulse being applied to the 19 counter, conductor 220 is at a plus 10 volt D.C. level whereas during the shifting of the 19 counter, conductor 220 is at negative 30 volts D.C. level. When conductor 220 is at plus 10 volts a diode 1300 has approximately 40 volts impressed upon it in the reverse direction since a diode 1301 holds junction point 1302 at approximately negative 30 volts. Under these conditions, the grid of tube section V8*a* is slightly negative with respect to the cathode and that tube section conducts rather heavily. The plate circuit output of tube section V8*a* is coupled to the grid of a tube section V8*b* and this grid is biased to almost cutoff by virtue of the current flow through cathode resistor 1303.

When the gate voltage of negative 30 volts appears on conductor 220, there is substantially zero volts impressed across diode 1300 but otherwise the flux amplifier circuit is in substantially the same condition as when positive 10 volts is applied to conductor 220. If during the gate period a signal is delivered by the sense winding of the array to the primary of a transformer 1304, a voltage will be impressed across diode 1300 which will cause that diode to conduct, thus lowering the potential applied to the grid of tube section V8*a*. This lowering of the potential on the grid of tube section V8*a* causes the potential at the anode to rise and this rise in potential is coupled to the grid of tube section V8*b* to cause that tube to conduct. A capacitor 1305 charges very rapidly when the potential of the grid of tube section V8*b* rises and because of the long time constant discharge path for that capacitor, tube section V8*b* will conduct a sufficient length of time to cause the core, having its set winding in the anode circuit, to be set in its binary One state. Since the grid side of capacitor 1306 is connected to a negative 15 volts source through a diode 1307, the anode signal from tube section V8*a* must exceed positive 15 volts before it will affect the conduction in tube section V8*b*. Therefore, noise signals less than 15 volts in amplitude at the grid side of capacitor 1306 will not cause a core to be set.

*Core shift stages*

As indicated in the various figures of the drawing, three distinct models of core shift stages are employed and they are identified as the A, B and C models. The A model core shift stages may be of the type shown and described in the previously referred to copending application Serial Number 484,677, entitled "Magnetic Core Circuit," filed January 28, 1955, by W. M. McMillan et al.

Reference is now made to Fig. 26 which shows in schematic form the B model core shift stage. A magnetic core 1350 has a first winding 1351 which receives current generated to cause shifting or driving of the core stage. This winding 1351 is therefore so oriented that when energized, it causes the magnetic state of the core to be driven in the binary Zero direction. Another winding 1352 on the core 1350 receives current to set or prime the core. Winding 1352 is therefore so oriented that when energized, it causes the magnetic state of the core to be driven in the binary One direction. A third winding 1353 receives current to cause the core to be set and is therefore so oriented that when energized it causes the magnetic state of the core to be driven in the binary One direction. A fourth winding 1354 is provided on the core 1350 and is so oriented that if the magnetic state of the core is representative of a binary One and the winding 1351 is energized, thereby switching the state of the core, voltage will be induced in the winding 1354 with such polarity that a capacitor 1355 will be charged through diode 1356. The discharge path of the capacitor 1355 is through an inductor 1357, a resistor 1358, and a winding similar to winding 1353 which is associated with the core of the next succeeding stage. The charging circuit and discharging circuit of capacitor 1355 therefore forms a transfer path for transferring signals stored in one stage to the succeeding stage.

The model C core shift stage may be similar to the model B core shift stage but differs in that winding 1352 may be eliminated since the C model is not employed where two inputs for setting of the core are required.

*Core shift stage with reset and prime*

As indicated with reference to Figs. 11*a* and 14*b*, a core shifting register may be cleared and primed by applying a long shift pulse to the drive or shift windings of the various stages of the register and also applying the long shift pulse to the transfer circuit of the core into which a binary One is to be primed.

Referring now to Fig. 27, a core 1370 has a drive or shift winding 1371, a transfer-out winding 1372 and a transfer-in winding 1373. A capacitor 1374 has a charging and discharging circuit such as that described above with reference to Fig. 26 and further includes another charging circuit which includes a diode 1375. When it is desired to reset and prime a core shift stage, the winding 1371 receives a long shift pulse and this long shift pulse is also applied to terminal 1376 to thereby charge capacitor 1374. At the termination of the long shift pulse, the capacitor 1374 discharges thereby causing the core 1370 to be set in its binary One state.

*Logical or output of gates*

As shown in Figs. 18, 20*a* and 20*b*, pairs of gates may have their outputs connected in logical OR manner.

Reference is now made to Fig. 28 which is a schematic wiring diagram of a pair of gates employing a logical OR output. Tube V9 is a first gate and has its conditioning input applied to a terminal 1380 and its sample input applied to a terminal 1381. The coincidence of a positive D.C. level at terminal 1380 and a positive pulse at terminal 1381 causes tube V9 to conduct and thereby produce a pulse at output terminals 1382. Tube V10 is a second gate and likewise has its conditioning input applied to a terminal 1383 and its sample input applied to a terminal 1384. The coincidence of a positive pulse at terminal 1384 and a positive D.C. level at terminal 1383 causes tube V10 to conduct and thereby produce a pulse at output terminal 1382. The gates are therefore connected in logical OR fashion since gate tube V9 or gate tube V10 may cause a pulse to be produced at output terminals 1382.

*Read status control circuit*

As previously described with reference to Fig. 3*a*, the OD Read Status Control circuit reads the status signals recorded on the OD Status channel of the drum, delivers a pulse to conductor 40 when the status signal indicates that the drum register is full and then records an empty status signal in the CD Status channel unless a pulse is received on conductor 500. If a pulse is received on conductor 500, a full status signal is recorded by the Read Status Control circuit on the CD Status channel.

Reference is now made to Fig. 29 which is a logical block diagram of the Read Status Control circuit. The read head 36 reads the signals recorded in the OD Status channel and delivers its signals through a read circuit 1400 to the conditioning input of a gate 1401. Gate 1401 is sampled by pulses on the conductor labeled OD—1 and therefore will produce a pulse on its output at OD—1 time whenever the read head 36 reads a binary One in the OD Status channel indicating that the drum register is full. Pulses passed by gate 1401 are applied to a gate 1402 and to another gate 1403. A conductor labeled positive 10 volts on read is provided as a control on the read status control circuit. This conductor may be under the control of a manual switch arrangement for delivering either positive 10 volts or negative 30 volts to that conductor. When that conductor has positive 10 volts applied thereto, gate 1402 is conditioned whereas when that conductor is at negative 30 volts, an inverter 1404 causes gate 1403 to be conditioned. If gate 1402 is conditioned and a binary One is read by read head 36, a pulse at substantially OD−1 time is delivered to conductor 40.

A flip-flop 1405 is set in its binary Zero state by pulses on the conductor labeled OD−4. Flip-flop 1405 will therefore always be in its Zero state at OD−1 time when a pulse will be delivered to conductor 40 if the drum register is full. Before the following OD−3 time, a pulse may be received on conductor 500. If a pulse is received on conductor 500, then flip-flop 1405 will be set in its binary One state through an OR circuit 1406, otherwise it will remain in its Zero state. Flip-flop 1405 conditions a drum writer 1407 which is sampled with a 1.7 μsec. duration pulse which begins at every OD−3 time. When flip-flop 1405 is in the binary One state it causes the drum writer 1407 to be conditioned such that in response to a pulse on the conductor labeled Status Write Sample, it will deliver a Write a One signal to the write head positioned adjacent the CD Status channel. Similarly, when flip-flop 1405 is in the Zero state, a Write a Zero signal is delivered to the write head of the CD Status channel.

When negative 30 volts is applied to the conductor labeled positive 10 volts on read, a pulse will be passed by gate 1403 through OR circuit 1406 to the One input of flip-flop 1405 each time a One is read in the OD Status channel. In this way signals recorded in the OD Status channel are merely transferred to the CD Status channel when the drum is not instructed to read.

When the drum is instructed to read, a pulse will be delivered to the conductor 40 each time a signal is read in the OD Status channel indicating that the drum register is full and signals will be delivered to the write head of the CD Status channel indicating that the register is empty unless a pulse is received on conductor 500, in which case a signal will be recorded in the CD Status channel indicating that the register is still full.

*Other basic circuits*

A detailed description of each of the following basic circuits will be found in copending application Serial Number 471,002 (IBM Docket 4592), entitled "Electronic Data Processing Machine," filed on November 24, 1954, by H. D. Ross et al.:

Gate Circuits
OR Circuits
AND Circuits
"A" Model Flip-Flop
Delay Units

A detailed description of each of the following basic circuits will be found in copending application Serial Number 494,982 (IBM Docket 4490), entitled "Magnetic Data Storage," filed by R. R. Everett et al. on March 17, 1955:

"C" Model Flip-Flop
Drum Read Circuits
Drum Writer Circuits

A detailed description of the "B" model flip-flop will be found in copending application Serial Number 473,874 (IBM Docket 4492), entitled "Electronic Ring Circuit," filed by R. E. Nienburg on December 8, 1954.

A detailed description of the Single Shot circuit will be found in copending application Serial Number 474,346, entitled "Mono-stable Multivibrator," filed by W. L. Jackman on December 10, 1954.

A detailed description of each of the following basic circuits will be found in copending application Serial Number 576,976 (IBM Docket 5111), entitled "Magnetic Memory," filed by H. K. Rising et al. on April 9, 1956:

Inverter
Reset Inhibit Driver
Set Driver

A detailed description of the "D" model flip-flop will be found in copending application Serial Number 569,999 (IBM Docket 4642), entitled "Radar Mapper," filed by M. J. Raffensperger on March 7, 1956.

A detailed description of the level setter will be found in copending application Serial Number 582,578 (IBM Docket 4910), entitled "Data Storage System," filed by J. S. Crosby et al. on May 3, 1956.

Throughout the above description and in the drawings, very little reference has been given with respect to passive circuits in component circuits. Passive circuits such as cathode followers, pulse amplifiers, level setters and the like, must obviously be included between various of the component circuits. However, the characteristics of those passive circuits will largely be determined not only by the load component circuits but also by the length of conductors coupling a given logical circuit to its load logical circuit. For example, the various core stages illustrated and described herein require that sufficient current be supplied to the shift windings of those cores for a length of time sufficient to transfer signals from one stage to the next or for reading out the information in a given stage. Since core circuits respond to four conditions, that is, (1) number of turns on the core, (2) the current through the winding, (3) the length of time that the current flows and (4) the rate of change of current, it will be obvious that in a specific design of an equipment constructed in accordance with the principles of this invention, the designer may use these variables in any way that he finds desirable. Furthermore, as described in the preceding section entitled "Conventions Employed" the various logical circuits respond to standard D.C. voltage levels of +10 and −30 volts and respond to pulse levels 20 to 40 volts in magnitude, and it will be obvious that various passive circuits will be required to attain these voltage requirements. These voltage requirements may be met by the use of conventional passive circuits such as level setters, cathode followers, current drivers and the like.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A digital data communications system comprising a transmission channel means for applying digital signals to said transmission channel, a plurality of signal receivers connected to said transmission channel, certain of said digital signals representing a code identifying which of said signal receivers should accept the digital signals, each of said signal receivers including means responsive to said digital signals representing a code for causing the digital signals to be rejected by said receiver if the digital signals representing a code indicate that said receiver should not accept the digital signals.

2. A digital data communications system comprising a transmission channel means for applying digital signals to said transmission channel, a plurality of signal receivers connected to said transmission channel, certain of said digital signals representing a code identifying which of said signal receivers should accept the digital signals, each of said signal receivers including signal storage means for temporarily storing said digital signals and means responsive to said digital signals representative of a code for clearing signals stored in said storage means when said signals identifying a code indicate that the signals should not be accepted.

3. A digital data communications system comprising a transmission channel means for applying digital signals to said transmission channel, said digital signals including a first sequence of serially related code signals, a plurality of signal receivers coupled to said transmission channel, each of said signal receivers including temporary storage for storing signals received from said transmission channel, selector means to selectively clear said storage and to read out signals stored in said storage, said selector means including a bistable device having first input signal responsive means for causing said bistable device to assume a predetermined stable state and a second input signal responsive means for causing said bistable device to assume a stable state which is opposite to its existing stable state, means to apply said first sequence of serially related code signals to one of said first and said second input signal responsive means and means to apply a second sequence of serially related code signals to the other of said first and said second input signal responsive means.

4. A circuit for comparing signals comprising a bistable device having a first input signal responsive means for causing the bistable device to assume a first predetermined stable state and a second input signal responsive means for causing the bistable device to assume a stable state which is opposite to its existing stable state, means to apply a first sequence of signals to one of said first and said second input signal responsive means, means to apply a second sequence of signals which is interleaved in time with said first sequence of signals to the other of said first and said second input signal responsive means and means to inspect the state of said bistable device whereby the results of a comparison between said first and said second sequence of pulses may be detected.

5. A circuit for comparing signals comprising a bistable device having a first input signal responsive means for causing the bistable device to assume a first predetermined stable state and a second input signal responsive means for causing the bistable device to assume a stable state which is opposite to its existing stable state, means to apply a first sequence of signals to one of said first and said second input signal responsive means, means to apply a second sequence of signals which is interleaved in time with said first sequence of signals to the other of said first and said second input signal responsive means and means to periodically inspect the state of said bistable device whereby the results of a comparison between said first and said second sequence of pulses may be detected.

6. A digital data communications system comprising a transmission channel means for applying digital signals to said transmission channel, a plurality of signal receivers connected to said transmission channel, certain of said digital signals representing a code identifying which of said signal receivers should accept the digital signals, each of said signal receivers including means responsive to said digital signals representative of a code for causing the signal receiver to reject the received digital signals when the digital signals representative of a code indicate that the receiver should not accept the signals and signal responsive means for causing the receiver to accept the digital signals irrespective of the code identified by the signals representative of the code.

7. A digital data communications sytem comprising a transmission channel means for applying digital signals to said transmission channel, said digital signals including a first sequence of signals representative of a code, a plurality of signal receivers connected to said transmission channel, each of said signal receivers including a circuit for comparing signals comprising a bistable device having a first input signal responsive means for causing the bistable device to assume a first predetermined state and a second input signal responsive means for causing the bistable device to assume a stable state which is opposite to its eixsting stable state, means to apply said first sequence of signals to one of said first and said second input signal responsive means, means to apply a second sequence of predetermined coded signals which is interleaved in time with said first sequence of signals to the other of said first and said second input signal responsive means and means to inspect the stable state of said bistable device.

8. A digital data communications system comprising a transmission channel means for applying digital signals to said transmission channel, said digital signals including a first sequence of signals representative of a code, a plurality of signal receivers connected to said transmission channel, each of said signal receivers including a circuit for comparing signals comprising a bistable device having a first input signal responsive means for causing the bistable device to assume a first predetermined state and a second input signal responsive means for causing the bistable device to assume a stable state which is opposite to its existing stable state, means to apply said first sequence of signals to one of said first and said second input signal responsive means, means to apply a second sequence of predetermined coded signals which is interleaved in time with said first sequence of signals to the other of said first and said second input signal responsive means, means to periodically inspect the stable state of said bistable device and means responsive to signals produced by said inspection for causing the receiver to reject the received digital signals when said comparison circuit indicates that a comparison does not exist.

9. A digital data communication system for transmitting data messages, each of which includes a data portion and an address portion, each said portion comprising a plurality of digital signals, comprising a transmission channel and a plurality of signal receivers connected to said transmission channel, each of said signal receivers having a predetermined unique address and including an address sensing means responsive to signals received from said channel for comparing the predetermined address associated with that receiver with the address portion of each received message, said address sensing means including a bistable device having a first input signal responsive means for causing said bistable device to assume a first predetermined state and a second input signal responsive means for causing said bistable device to assume a stable state opposite to its existing stable state, means to apply signals corresponding to said predetermined address to one of said first and second input signal responsive means, means to apply signals from the address portion of each message to the other of said first and second input signal responsive means and means to inspect the stable state of said bistable device and to accept each message if the address portion of the message properly corresponds with the receiver address as indicated by the state of said bistable device.

10. A digital data communication system for transmitting data messages, each of which includes a data portion and an address portion, each said portion comprising a plurality of binary signals, comprising a transmission channel and a plurality of signal receivers connected to said transmission channel, each of said signal receivers having a predetermined unique address and including temporary storage means for storing message signals received from said transmission channel and an address sensing means for comparing the predetermined address associated with said receiver with the address portion of each received message, said address sensing means including a bistable device having a first input signal responsive means for causing said bistable device to assume a first predetermined state and a second input signal responsive means for causing said bistable device to assume a stable state opposite to its existing stable state, means to apply signals corresponding to said predetermined address to one of said first and second input signal responsive means, means to apply signals from the address portion of each message to the other of said first and second input signal responsive means interleaved in time with said predetermined address signals and means to periodically inspect the stable state of said bistable device and to clear said message from said temporary storage means if the address portion of the message does not correspond with the receiver address as indicated by the state of said bistable device.

11. The communication system as claimed in claim 10 and further including sensing means for causing the receiver to accept a message irrespective of the signals in its address portion in response to a receiver address overriding signal associated with the message.

References Cited in the file of this patent

UNITED STATES PATENTS

| | | |
|---|---|---|
| 2,674,727 | Spielberg | Apr. 6, 1954 |
| 2,680,240 | Greenfield | June 1, 1954 |
| 2,706,215 | Van Duuren | Apr. 12, 1955 |
| 2,739,301 | Greenfield | Mar. 20, 1956 |

UNITED STATES PATENT OFFICE

CERTIFICATE OF CORRECTION

Patent No. 2,946,986 July 26, 1960

Donald A. Harrison

It is hereby certified that error appears in the printed specification of the above numbered patent requiring correction and that the said Letters Patent should read as corrected below.

Column 7, line 73, for "position" read -- positive --; column 10, line 51, for "passsed" read -- passed --; column 13, line 7, for "than" read -- that --; column 20, line 14, for "mentionad" read -- mentioned --; column 25, line 51, for "by" read -- to --; column 26, line 34, for "refeernce" read -- reference --; line 66, for "rescription" read -- description --; column 35, line 24, for "maner" read -- manner --; column 36, line 61, for "state" read -- stage --; column 41, line 72, for "1035" read -- 1005 --; column 48, line 25, for "or" read -- OR --.

Signed and sealed this 18th day of April 1961.

(SEAL)
Attest:

ERNEST W. SWIDER
Attesting Officer

DAVID L. LADD
Commissioner of Patents